United States Patent
Kawa et al.

(10) Patent No.: US 8,542,746 B2
(45) Date of Patent: *Sep. 24, 2013

(54) DECODING CONTROL APPARATUS WHICH DECODES THE FEWEST PICTURES (ALTHOUGH NOT DISPLAYED) PRIOR TO AN EDIT POINT

(75) Inventors: Seiji Kawa, Kanagawa (JP); Minoru Kawahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 13/374,631

(22) Filed: Jan. 4, 2012

(65) Prior Publication Data
US 2012/0121016 A1   May 17, 2012

Related U.S. Application Data

(60) Continuation of application No. 11/729,026, filed on Mar. 28, 2007, now Pat. No. 8,098,738, which is a division of application No. 10/650,336, filed on Aug. 28, 2003, now Pat. No. 7,263,129.

(30) Foreign Application Priority Data

Aug. 29, 2002 (JP) ................................. 2002-250137

(51) Int. Cl.
H04N 7/12 (2006.01)

(52) U.S. Cl.
USPC .................................................. 375/240.25

(58) Field of Classification Search
USPC .............. 375/240.01, 240.13, 240.25, 240.26
IPC ........................................................ H04N 7/12
See application file for complete search history.

(56) References Cited

U.S. PATENT DOCUMENTS

2002/0145702 A1   10/2002   Kato et al.
2003/0012550 A1   1/2003    Sakai et al.

FOREIGN PATENT DOCUMENTS

| JP | 10-50037 | 2/1998 |
| JP | 11 220695 | 8/1999 |
| JP | 2000 23099 | 1/2000 |
| JP | 2001 157145 | 6/2001 |
| JP | 2001 177801 | 6/2001 |
| JP | 2002-101379 | 4/2002 |

Primary Examiner — Young Lee
(74) Attorney, Agent, or Firm — Frommer Lawrence & Haug LLP; William S. Frommer

(57) ABSTRACT

Decoding control apparatus for decoding predictive encoded data. A picture detector determines the fewest possible pictures which must be decoded first before decoding a picture which are to be displayed after an edit point. A start-point finder for finds the start point for decoding the fewest possible pictures determined by said picture detector even though those fewest pictures are not to be displayed. A plurality of decoders decode the encoded data in picture units, on the basis of the start point. A picture obtained by the decoders is selected on the basis of the edit point and output.

6 Claims, 26 Drawing Sheets

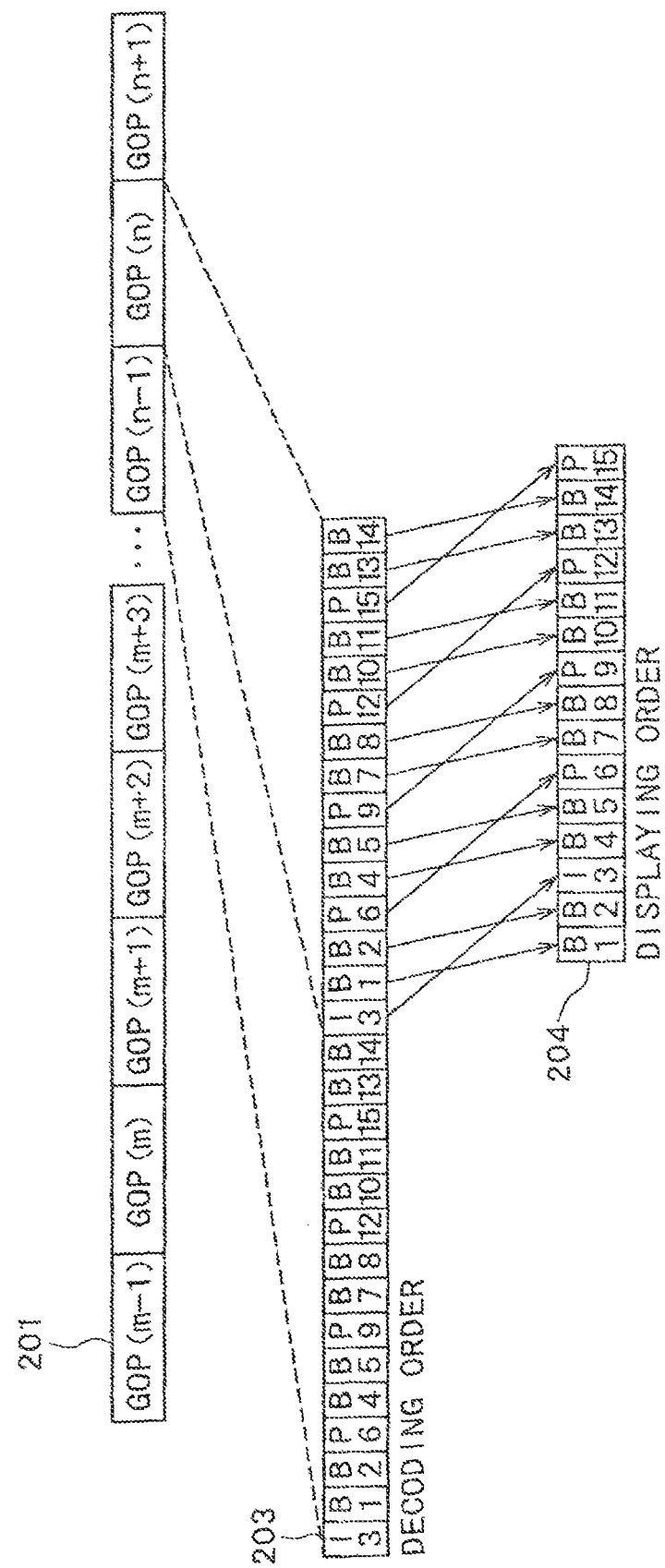

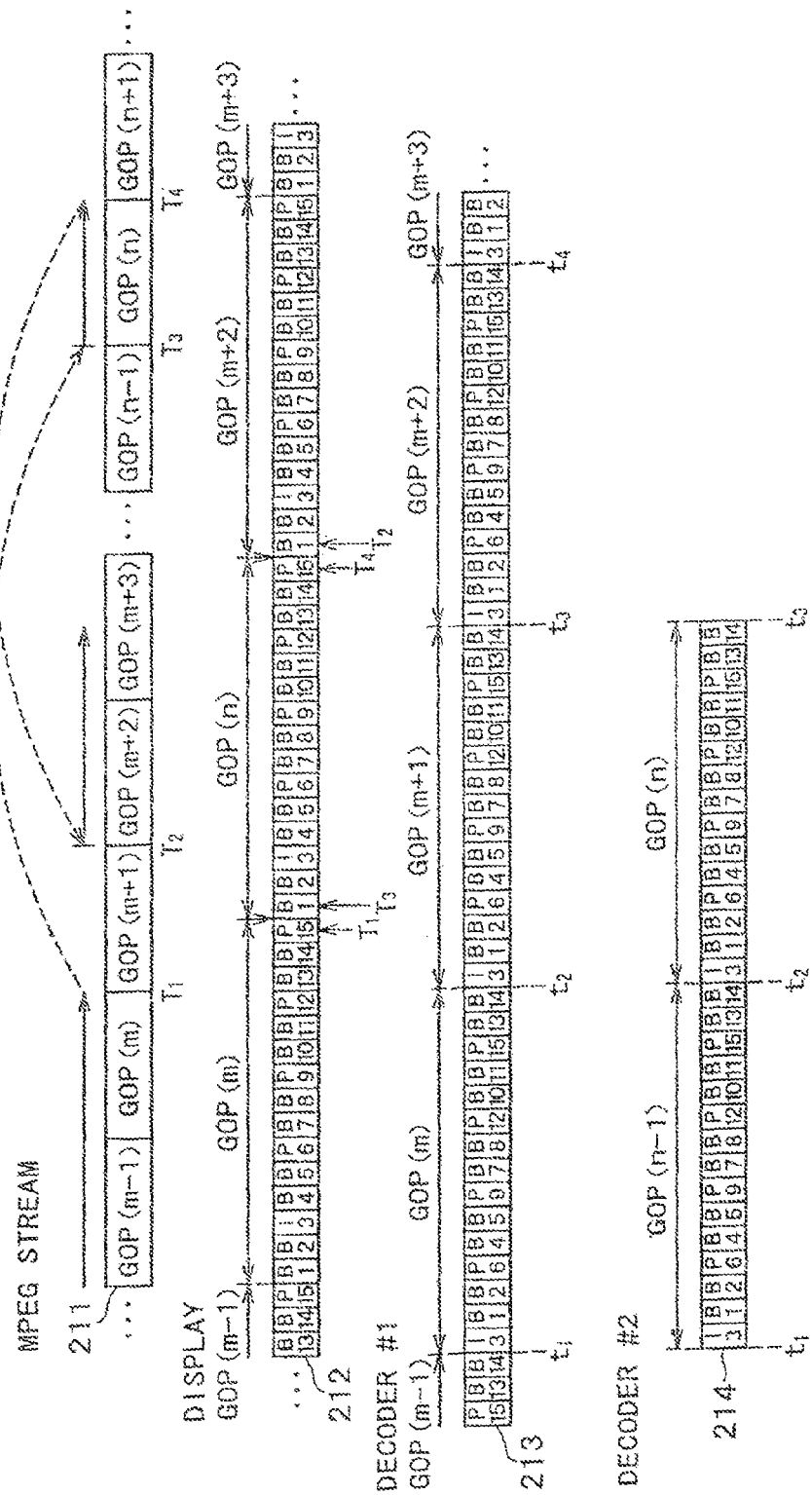

F I G. 7

| EDIT-POINT PICTURE | PICTURE SEQUENCES |
|---|---|
| B1 | GOP(n-1) {I3, P6, P9, P12, P15}, GOP(n) {I3, B1, B2, P6, B4...} |
| B2 | GOP(n-1) {I3, P6, P9, P12, P15}, GOP(n) {I3, B2, P6, B4...} |
| I3 | GOP(n) {I3, P6, B4, B5, P9, B7, B8, P12, B10,...}..... |
| B4 | GOP(n) {I3, P6, B4, B5, P9, B7, B8, P12, B10,...}..... |
| B5 | GOP(n) {I3, P6, B5, P9, B7, B8, P12, B10,...}..... |
| P6 | GOP(n) {I3, P6, P9, B7, B8, P12, B10,...}..... |
| B7 | GOP(n) {I3, P6, P9, B7, B8, P12, B10,...}..... |
| B8 | GOP(n) {I3, P6, P9, B8, P12, B10,...}..... |
| P9 | GOP(n) {I3, P6, P9, P12, B10,...}..... |
| B10 | GOP(n) {I3, P6, P9, P12, B10, B11, P15, B13, B14}..... |
| B11 | GOP(n) {I3, P6, P9, P12, B11, P15, B13, B14}..... |
| P12 | GOP(n) {I3, P6, P9, P12, P15, B13, B14}..... |
| B13 | GOP(n) {I3, P6, P9, P12, P15, B13, B14}..... |
| B14 | GOP(n) {I3, P6, P9, P12, P15, B14}..... |
| P15 | GOP(n) {I3, P6, P9, P12, P15}..... |

F I G. 2 1

```
 1: <body>
 2:   <par>
 3:     <!--Clip1-->
 4:     <ref src="../0001/video01.mpg" begin="smpte=00:00:00:00"
 5:          clipBegin="smpte=00:00:00" clipEnd="00:05:00:12"/>
 6:
 7:     <!--Clip2-->
 8:     <ref src="../0002/video02.mpg" begin="smpte=00:05:00:13"
 9:          clipBegin="smpte=00:10:00:03" clipEnd="00:15:00:00"/>
10:   </par>
11: </body>
```

FIG. 22

```
 1: <body>
 2:   <par>
 3:     <!--Clip1-->
 4:     <ref src="../0001/video01.mpg" begin="smpte=00:00:00:00"
 5:       clipBegin="smpte=00:00:00" clipEnd="00:05:00:12"/>
 6:
 7:     <!--Clip2-->
 8:     <ref src="../0002/video02.mpg" begin="smpte=00:05:00:12"
 9:       clipBegin="smpte=00:10:00:03" clipEnd="00:15:00:00"
10:       preDecBegin="smpte=00:09:59:29" preDecDur="4"/>
11:   </par>
12: </body>
```

F I G. 2 3
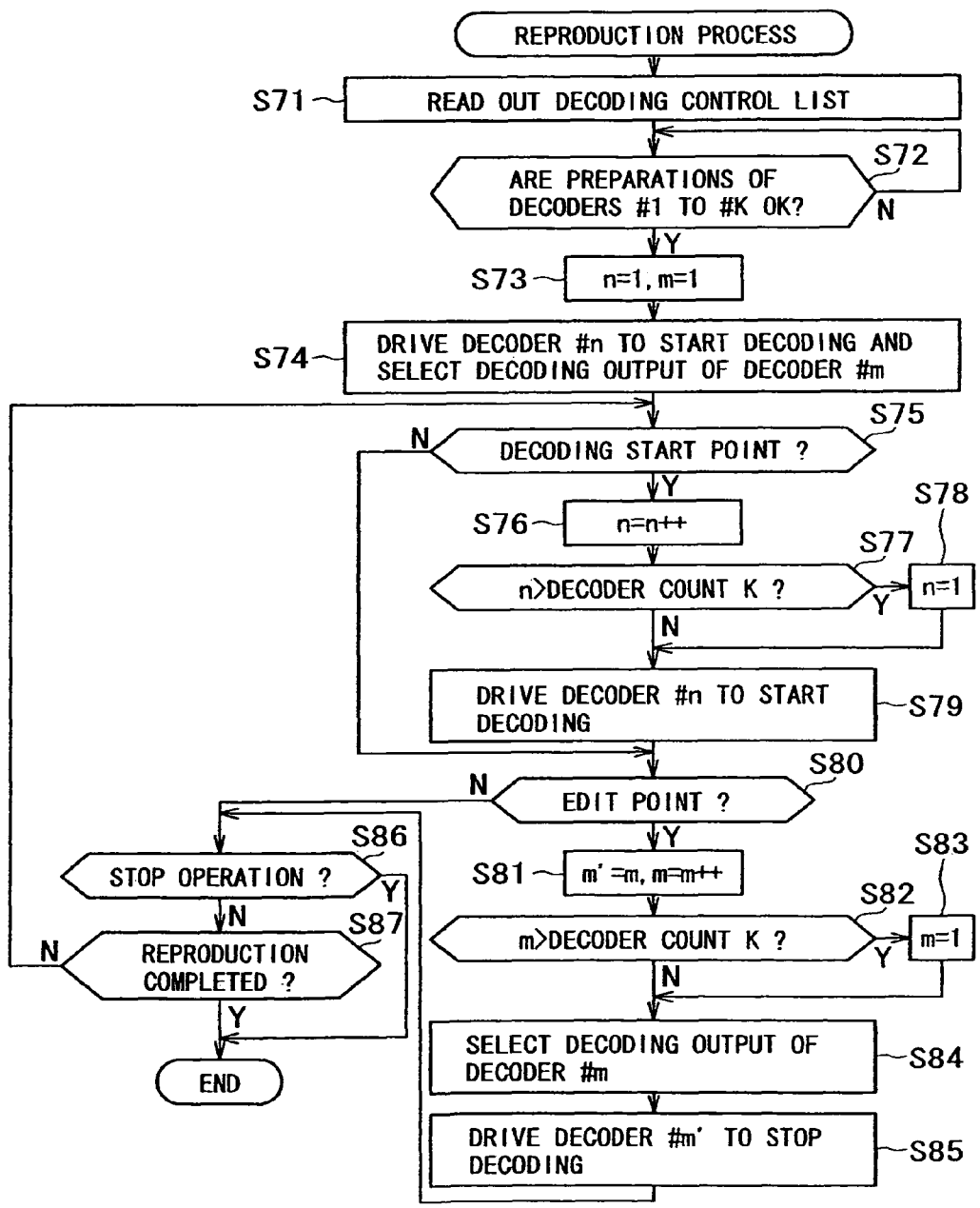

FIG. 24

```
1: <body>
2:   <par>
3:     <!--Clip1-->
4:     <ref src="../0001/video01.mpg" begin="smpte=00:00:00:00"
5:          clipBegin="smpte=00:00:00:00" clipEnd="00:05:00:12"
6:          decoder="0"/>
7:
8:     <!--Clip2-->
9:     <ref src="../0002/video02.mpg" begin="smpte=00:05:00:12"
10:         clipBegin="smpte=00:10:00:03" clipEnd="00:15:00:00"
11:         decoder="1"
12:         preDecBegin="smpte=00:09:59:29" preDecDur="4"/>
13:  </par>
14: </body>
```

DECODING CONTROL APPARATUS WHICH DECODES THE FEWEST PICTURES (ALTHOUGH NOT DISPLAYED) PRIOR TO AN EDIT POINT

This is a continuation of application Ser. No. 11/729,026, filed Mar. 28, 2007 now U.S. Pat. No. 8,098,738, which is a division of application Ser. No. 10/650,336, filed Aug. 28, 2003 now U.S. Pat. No. 7,263,129, which is entitled (under 35 USC 119) to the priority filing date of Japanese application(s) 2002-250137, filed on Aug. 29, 2002, the entirety of which is incorporated herein by reference.

BACKGROUND OF THE INVENTION

The present invention relates to decoding control for enhancing the freedom of a process to edit a moving picture.

An MPEG (Moving Picture Expert Group) technique is known as a typical method for compressing a moving picture, that is, for reducing the amount of data representing the moving picture, by carrying out a predictive encoding process on any specific one of frames, which compose the moving picture, with reference to frames other than the specific one.

In accordance with the MPEG technique, data is subjected to quantization processing in an encoding process and encoded data is subjected to inverse-quantization processing in a decoding process. Thus, if the encoding and decoding processes are carried out repeatedly, the quality of a picture obtained as a result of the last decoding process is poor.

In order to solve this problem, in an operation to edit a moving picture, which has been obtained as a result of an MPEG encoding process, the so-called edit points are set on an MPEG stream (or encoded data), which serves as an editing raw material representing the moving picture, without decoding the MPEG stream. The edit points are IN points and OUT points. Then, a list of edit points set on the MPEG stream is made. The list is referred to hereafter as an edit-point list. In an operation to reproduce a result of the editing operation, the MPEG stream is decoded in accordance with edit points shown on the edit-point list.

The aforementioned MPEG stream comprises GOPs each including a plurality of pictures. Symbol GOP (m) denotes an mth GOP as counted from the beginning of the MPEG stream. Assume for example that a start sequence of GOPs beginning with GOPi not shown in the figure and ending with GOP (m) on an MPEG stream 201 shown in FIG. 1 has been reproduced. Then, GOP (n) located after GOP (m) is reproduced. Finally, another sequence of GOPs beginning with GOP (m+2) located before GOP (n) and ending with GOPj not shown in the figure is reproduced. The operations to reproduce the start sequence, GOP (n) and the other sequence is referred to as reproduction processing based on the so-called cut editing process. In this cut editing process, an edit-point list 202 shown in FIG. 1 is made. It is to be noted that the edit-point list 202 is shown only in a conceptual manner focusing on edit points. Details of the edit-point list 202 will be explained later.

In the edit-point list 202 shown in FIG. 1, an edit point $T_i$ represents the start position of GOPi, which is reproduced as the first GOP. The edit point $T_1$ represents the end position of GOP (m) or the start position of GOP (m+1). By the same token, an edit point $T_2$ represents the end position of GOP (m+1) or the start position of GOP (m+2). In the same way, an edit point $T_3$ represents the end position of GOP (n−1) or the start position of GOP (n). Similarly, an edit point $T_4$ represents the end position of GOP (n) or the start position of GOP (n+1). In addition, an edit point $T_j$ represents the start position of GOPj, which is reproduced as the last GOP. It is to be noted that the edit points $T_1$ and $T_4$ are each an OUT point while the edit points $T_2$ and $T_3$ are each an IN point.

Notation '$T_i \rightarrow T_1$' on the first line of the edit-point list 202 shown in FIG. 1 indicates that the MPEG stream 201 is to be reproduced from the position (time code) $T_i$ on the MPEG stream 201 to the time code $T_1$. By the same token, notation '$T_3 \rightarrow T_4$' on the second line indicates that the MPEG stream 201 is to be reproduced the time code $T_3$ to the time code $T_4$. In the same way, notation '$T_2 \rightarrow T_j$' on the third line indicates that the MPEG stream 201 is to be reproduced the time code $T_2$ to the time code $T_j$.

Thus, in accordance with the edit-point list 202 shown in FIG. 1, the start sequence of GOPs beginning with GOPi and ending with GOP (m) on an MPEG stream 201 shown in FIG. 1 is first reproduced. Then, GOP (n) located after GOP (m+2) and GOPj is reproduced. Finally, the other sequence of GOPs beginning with GOP (m+2) and ending with GOPj is reproduced.

As described above, the edit-point list 202 is first made in an editing operation and the MPEG stream 201 is then reproduced in a reproduction operation. Thus, by carrying out an editing operation without decoding the MPEG stream 201, it is possible to implement a desired editing operation and, hence, obtain a desired result of editing.

FIG. 1 is a diagram showing an operation to edit only one MPEG stream as a raw editing material. It is to be noted, however, that a plurality of MPEG streams can also be used as a raw editing material to be edited in the same way as that shown in FIG. 1.

By the way, in an operation to reproduce an MPEG stream, which is obtained as a result to edit a raw MPEG stream by making an edit-point list as described above, it is necessary to decode the resulting MPEG stream, that is, to put the resulting MPEG stream in an MPEG decoding process. Assume that an MPEG decoder for decoding the MPEG stream has a decoding-process speed by one. In this case, by using only a unit of MPEG decoder having such a speed, it will be difficult to seamlessly reproduce an MPEG stream, which is obtained as a result of a process to edit a raw MPEG stream by making an edit-point list as described above.

In accordance with the MPEG technique, there are provided three picture types, namely, an Intra (I) picture, a Predictive (P) picture and a Bidirectionally predictive (B) picture. An I picture is a picture to be subjected to an intra encoding process without referencing other pictures. A P picture is a picture to be subjected to an intra encoding process or a predictive encoding process, which is an encoding process carried out by referencing an I picture or another P picture and using a predicted picture generated from the referenced picture. The referenced picture is a picture displayed at a time preceding the P picture being processed. A B picture is a picture to be subjected to an intra encoding process or a bidirectionally predictive encoding process, which is an encoding process carried out by referencing an I picture or another P picture and using a predicted picture generated from the referenced picture. The referenced picture in the bidirectionally predictive encoding process is a picture displayed at a time preceding or succeeding the P picture being processed. It is to be noted that, while an I or P picture can be used as a picture to be referenced in a predictive encoding process or a bidirectionally predictive encoding process, a B picture is never used as a picture to be referenced in any encoding process.

As an example, consider a long GOP with a structure consisting of 15 pictures (or 15 frames) wherein each of I and P pictures is placed as the last one of three consecutive pictures including two other B pictures.

Let alphabetical characters I, P and B denote respectively the I, P and B picture types of the pictures composing a GOP. In this case, an example of a GOP is represented by a list as follows:

B1, B2, I3, B4, B5, P6, B7, B8, P9, B10, B11, P12, B13, B14, P15 where a numerical subscript appended to each of the alphabetical characters I, P and B denotes an order number of an order along the time axis.

As described above, a B picture is a picture encoded by referencing not only a picture displayed at a time preceding the B picture, but also a picture displayed at a time succeeding the B picture. Thus, a B picture cannot be decoded unless the picture used as a referenced picture to be displayed at a time succeeding the B picture is decoded before the B picture in a decoding operation.

In accordance with the MPEG technique, a picture used as a referenced picture in an operation to encode a B picture is encoded before the B picture. By the same token, a picture used as a referenced picture in an operation to decode B picture is decoded before the B picture. In the case of the aforementioned list representing the GOP consisting of pictures ranging from B1 to P15, the pictures are encoded and decoded in the following order:

I3, B1, B2, P6, B4, B5, P9, B7, B8, P12, B10, B11, P15, B13, B14.

To put it in detail, pictures B1 and B2 are each encoded and decoded by referencing picture P15 displayed at a preceding time and picture I3 displayed at a succeeding time. Picture P15 is a picture pertaining to the immediately preceding GOP while picture I3 is a picture pertaining to the same GOP.

Picture I3 is encoded and decoded without referencing another picture.

Pictures B4 and B5 are each encoded and decoded by referencing picture I3 displayed at a preceding time and picture P6 displayed at a succeeding time. Pictures I3 and P6 are each a picture pertaining to the same GOP.

Picture P6 is encoded and decoded by referencing picture I3 displayed at a preceding time. Picture I3 is a picture pertaining to the same GOP.

Pictures B7 and B8 are each encoded and decoded by referencing picture P6 displayed at a preceding time and picture P9 displayed at a succeeding time. Pictures P6 and P9 are each a picture pertaining to the same GOP.

Picture P9 is encoded and decoded by referencing picture P6 displayed at a preceding time. Picture P6 is a picture pertaining to the same GOP.

Pictures B10 and B11 are each encoded and decoded by referencing picture P9 displayed at a preceding time and picture P12 displayed at a succeeding time. Pictures P9 and P12 are each a picture pertaining to the same GOP.

Picture P12 is encoded and decoded by referencing picture P9 displayed at a preceding time. Picture P9 is a picture pertaining to the same GOP.

Pictures B13 and B14 are each encoded and decoded by referencing picture P12 displayed at a preceding time and picture P15 displayed at a succeeding time. Pictures P12 and P15 are each a picture pertaining to the same GOP.

Picture P15 is encoded and decoded by referencing picture P12 displayed at a preceding time. Picture P12 is a picture pertaining to the same GOP.

As described above, pictures B1 and B2 of any GOP (n) are encoded and decoded by referencing an I or P picture displayed at a succeeding time and an I or P picture displayed at a preceding time. In this case, the picture displayed at the succeeding time is picture I3 pertaining to the same GOP (n) but the picture displayed at the preceding time is picture P15 pertaining to GOP (n−1) immediately preceding GOP (n).

Assume that the current edit point is set at the head of GOP (n). In this case, in order to carry out a reproduction process starting from the head of GOP (n), GOP (n) cannot be decoded unless GOP (n−1) immediately preceding GOP (n) is decoded first as is obvious from a picture-decoding order 203 shown in FIG. 2.

To put it concretely, in order to decode pictures B1 and B2 pertaining to GOP (n), it is necessary to reference picture P15 of GOP (n−1) immediately preceding GOP (n). In accordance with the conventional technology, an MPEG decoder is controlled in GOP units so that GOP (n) cannot be decoded unless GOP (n−1) immediately preceding GOP (n) is decoded first.

In accordance with the conventional technology, only the pictures composing GOP (n) are displayed without displaying the pictures composing GOP (n−1) as is obvious from a picture-decoding order 204 shown in FIG. 2 in spite of the fact that both GOP (n) and GOP (n−1) are decoded.

As described above, the MPEG decoder needs to decode GOP (n−1), which will not be displayed, in addition to GOP (n). Thus, in order to obtain editing results obtained earlier by referring to FIG. 1, GOP (n) is decoded after GOP (m) separated away from GOP (n) is decoded but, in order to decode GOP (n), it is necessary to decode GOP (n−1) immediately preceding GOP (n). Accordingly, by using only a unit of MPEG decoder having a 1-time decoding-process speed, there is no time margin to decode GOP (n−1) after decoding GOP (m) but before decoding GOP (n).

As a result, by using only a unit of MPEG decoder having a 1-time decoding-process speed, on the basis of an edit-point list, it is impossible to reproduce results of editing an MPEG screen.

Japanese Patent Laid-open No. 2002-101379 discloses a method to reproduce results of editing an MPEG screen by using two MPEG decoders on the basis of an edit-point list.

In accordance with the method disclosed in Japanese Patent Laid-open No. 2002-101379, a duration required between a start edit point and an end edit point must be at least the length of a GOP. By using two MPEG decoders to alternately decode an MPEG stream, which has been edited under such a condition, it is possible to reproduce results of editing the MPEG screen. The start and end edit points can each be an IN or OUT point. If the start edit point is an IN point, the end edit point is an OUT point. If the start edit point is an OUT point, on the other hand, the end edit point is an IN point. In the following description, the minimum duration is appropriately referred to as a shortest cut duration or a margin.

An MPEG stream 211 shown in FIG. 3 is the same as the MPEG stream 201 shown in FIG. 1. Assume that a start sequence of GOPs beginning with GOPi not shown in the figure and ending with GOP (m) on an MPEG stream 211 is to be reproduced. Then, GOP (n) located after GOP (m) is to be reproduced. Finally, another sequence of GOPs beginning with GOP (m+2) located before GOP (n) and ending with GOPj not shown in the figure is to be reproduced. In order to reproduce these GOPs, a cut editing process is carried out to set edit points $T_1$, $T_2$, $T_3$ and $T_4$.

In this case, in an operation to reproduce these results of the editing, the start sequence of GOPs ending with picture P15 at the tail of GOP (m) is first displayed to be followed by pictures B1 to P15 of GOP (n) before displaying the other sequence of GOPs beginning with picture B1 at the head of GOP (m+2) as is obvious from a picture-displaying order 212 shown in FIG. 3. At the tail of GOP (m), the edit point $T_1$ has been set as an OUT point. At pictures B1 and P15 of GOP (n), the edit points $T_3$ and $T_4$ have been set as IN and OUT points respectively. At the head of GOP (m+2), the edit point $T_2$ has been set as an IN point.

In order to obtain a picture-displaying order 212 shown in FIG. 3, in accordance with the method disclosed in Japanese Patent Laid-open No. 2002-101379, a specific one of 2 MPEG decoders #1 and #2, is used to decode all pictures ending with GOP (m) as shown in a picture-decoding order 213 of FIG. 3. For example, the specific MPEG decoder is MPEG decoder #1. It is to be noted that, in the process to decode GOP (m), the processing to decode picture B14 to be decoded last among the pictures composing GOP (m) must be completed by a time $t_2$, at which picture B14 is to be displayed. Thus, the process to decode GOP (m) must be started before a time leading ahead of the time $t_2$ by a period of time it takes to display pictures composing a GOP. In the picture-decoding order 213 shown in FIG. 3, a time $t_1$ is determined to be the time to start the process to decode GOP (m).

The edit point $T_1$ is reached after decoder #1 has decoded GOP (m) to be displayed. The process then is continued to processing to decode and display GOP (n). The processing to decode and display GOP (n) must start at the edit point $T_3$ and end at the edit point $T_4$.

In order to decode GOP (n), it is necessary to decode GOP (n−1) immediately preceding GOP (n) as described earlier. In the process to decode GOP (n), the processing to decode picture B14 to be decoded last among the pictures composing GOP (n) must be completed by a time $t_3$, at which picture B14 is to be displayed. Thus, the process to decode GOP (n) must be started before a time leading ahead of the time $t_3$ by a period of time it takes to display pictures composing a GOP. In a picture-decoding order 214 shown in FIG. 3, a time $t_2$ is determined to be the time to start the process to decode GOP (n). By the same token, the process to decode GOP (n−1) immediately preceding GOP (n) must be started before a time leading ahead of the time $t_2$ by a period of time it takes to display pictures composing a GOP in the picture-decoding order 214 shown in FIG. 3, a time $t_1$ is determined to be the time to start the process to decode GOP (n−1).

For the reason described above, MPEG decoder #2 starts decoding GOP (n−1) at the time $t_1$ and continues the process by decoding GOP (n) as shown in the picture-decoding order 214 of FIG. 3. MPEG decoder #2 is the other one of two decoders #1 and #2.

In the mean time, MPEG decoder #1 should naturally terminate the decoding process at the end of the processing to decode GOP (m). After GOP (n) is decoded by decoder #2 and displayed, however, the edit point $T_4$ is reached. Then, MPEG decoder #1 must decode the other sequence of GOPs beginning with GOP (m+2) at the edit point $T_2$ for a display.

In order to decode GOP (m+2), it is necessary to decode GOP (m+1) leading ahead of GOP (m+2) by a GOP as described earlier. In the process to decode GOP (m+2), the processing to decode picture B14 to be decoded last among the pictures composing GOP (m+2) must be completed by a time $t_4$, at which picture B14 is to be displayed, as shown in the picture-decoding order 213 of FIG. 3. Thus, the process to decode GOP (m+2) must be started before a time leading ahead of the time $t_4$ by a period of time it takes to display pictures composing a GOP. In the picture-decoding order 213 shown in FIG. 3, the time $t_3$ is determined to be the time to start the process to decode GOP (m+2). By the same token, the process to decode GOP (m+1) leading ahead of GOP (m+2) by a GOP must be started before a time leading ahead of the time $t_3$ by a period of time it takes to display pictures composing a GOP. In the picture-decoding order 213 shown in FIG. 3, the time $t_2$ is determined to be the time to start the process to decode GOP (m+1).

The time $t_2$ is a time at which MPEG decoder #1 ends the process to decode GOP (m). Thus, as soon as the process to decode GOP (m) is ended, the process to decode GOP (m+1) can be started immediately.

As described above, if the shortest cut duration is set at a period of time it takes to display a GOP, it is possible to reproduce results of editing an MPEG stream by using two MPEG recorders for carrying out the so-called alternate decoding process of GOPs between an edit point and the next edit point.

In accordance with the method disclosed in Japanese Patent Laid-open No. 2002-101379, however, the shortest cut duration, which is a minimum duration required between a start edit point and an end edit point, must be the period of time it takes to display a GOP, raising a problem of restricted freedom of editing.

SUMMARY OF THE INVENTION

It is an object of the present invention to make restrictions on the shortest cut duration lenient in a process to seamlessly reproduce a result of editing the stream in order to enhance the freedom of editing in carrying out a process of editing the stream.

In order to achieve the object described above, in accordance with an aspect of the present invention, there is provided a decoding control apparatus, which is used for controlling a process to decode encoded data obtained as a result of a predictive encoding process and is provided with: a picture detector for determining one or fewest possible pictures, which must be decoded first before decoding a picture to be displayed after an edit point set in the encoded data but are not to be displayed; a start-point finder for finding a start point representing a timing to start a process to decode the one or fewest possible pictures determined by the picture detector even though the one or fewest possible pictures are not to be displayed; a decoding controller for controlling processes, which are carried out by a plurality of decoders for decoding the encoded data in order to decode the encoded data, in picture units on the basis of the start point; and a selector for selecting one of pictures, which are obtained as results of the processes carried out by the decoders, on the basis of the edit point and for outputting the selected picture.

In accordance with another aspect of the present invention, there is provided a decoding control method, which is used for controlling a process to decode encoded data obtained as a result of a predictive encoding process and is provided with the steps of: determining one or fewest possible pictures, which must be decoded first before decoding a picture to be displayed after an edit point set in the encoded data but are not to be displayed; finding a start point representing a timing to start a process to decode the one or fewest possible pictures even though the one or fewest possible pictures are not to be displayed; controlling processes, which are carried out by a plurality of decoders for decoding the encoded data in order to decode the encoded data, in picture units, on the basis of the start point; and selecting one of pictures, which are obtained as results of the processes carried out by the decoders, on the basis of the edit point and outputting the selected picture.

In accordance with a further aspect of the present invention, there is provided a program for driving a computer to carry out a decoding control process to control a process of decoding encoded data obtained as a result of a predictive encoding process wherein the decoding control process includes the steps of: determining one or fewest possible pictures, which must be decoded first before decoding a picture to be displayed after an edit point set in the encoded data but are not to be displayed; finding a start point representing a timing to start a process to decode the one or fewest possible pictures even though the one or fewest possible pictures are not to be displayed; controlling processes, which are carried out by a plurality of decoders for decoding the encoded data in order to decode the encoded data, in picture units; and selecting one of pictures, which are obtained as results of the processes carried out by the decoders, on the basis of the edit point and outputting the selected picture.

In accordance with a still further aspect of the present invention, there is provided a information-processing apparatus including: a picture detector for determining one or fewest possible pictures, which are not to be displayed but must be decoded first before decoding a picture to be displayed after an edit point described on an edit-point list, that is, a list of the edit point set in encoded data obtained as a result of a predictive encoding process; a start-point finder for finding a start point representing a timing to start a process to decode the one or fewest possible pictures determined by the picture detector even though the one or fewest possible pictures are not to be displayed; and a decoding control list maker for making a decoding control list describing at least the edit point and the start point as decoding control information for controlling processes carried out by a plurality of decoders for decoding the encoded data in order to decode the encoded data.

In accordance with a still further aspect of the present invention, there is provided a information-processing method including the steps of: determining one or fewest possible pictures, which are not to be displayed but must be decoded first before decoding a picture to be displayed after an edit point described on an edit-point list, that is, a list of the edit point set in encoded data obtained as a result of a predictive encoding process; finding a start point each representing a timing to start a process to decode the one or fewest possible pictures determined by the picture detector even though the one or fewest possible pictures are not to be displayed; and making a decoding control list describing at least the edit point and the start point as decoding control information for controlling processes carried out by a plurality of decoders for decoding the encoded data in order to decode the encoded data.

In accordance with a still further aspect of the present invention, there is provided a program, which is used for driving a computer to carry out a predetermined process and is provided with the steps of: determining one or fewest possible pictures, which are not to be displayed but must be decoded first before decoding a picture to be displayed after an edit point described on an edit-point list, that is, a list of the edit point set in encoded data obtained as a result of a predictive encoding process; finding a start point each representing a timing to start a process to decode the one or fewest possible pictures determined by the picture detector even though the one or fewest possible pictures are not to be displayed; and making a decoding control list describing at least the edit point and the start point as decoding control information for controlling processes carried out by a plurality of decoders for decoding the encoded data in order to decode the encoded data.

In accordance with a still further aspect of the present invention, there is provided a decoding control apparatus, which is used for controlling a process to decode encoded data obtained as a result of a predictive encoding process and is provided with: a decoding controller for controlling processes carried out by a plurality of decoders for decoding the encoded data in order to decode the encoded data in picture units on the basis of a decoding control list describing at least an edit point set in the encoded data and a start point representing a timing to start a process to decode fewest possible pictures, which are not to be displayed but must be decoded first before decoding a picture to be displayed after the edit points, as decoding control information for controlling the processes carried out by the decoders for decoding the encoded data in order to decode the encoded data; and a selector for selecting one of pictures, which are obtained as results of the processes carried out by the decoders, on the basis of the decoding control list and for outputting the selected picture.

In accordance with a still further aspect of the present invention, there is provided a decoding control method, which is used for controlling a process to decode encoded data obtained as a result of a predictive encoding process and is provided with the steps of: controlling processes carried out by a plurality of decoders for decoding the encoded data in order to decode the encoded data in picture units on the basis of a decoding control list describing at least an edit point set in the encoded data and a start point representing a timing to start a process to decode fewest possible pictures, which are not to be displayed but must be decoded first before decoding a picture to be displayed after the edit point as decoding control information for controlling the processes carried out by the decoders for decoding the encoded data in order to decode the encoded data; and selecting one of pictures, which are obtained as results of the processes carried out by the decoders, on the basis of the decoding control list and outputting the selected picture.

In accordance with a still further aspect of the present invention, there is provided a program for driving a computer to carry out a decoding control process of decoding encoded data obtained as a result of a predictive encoding process wherein the decoding control process includes the steps of: controlling processes carried out by a plurality of decoders for decoding the encoded data in order to decode the encoded data in picture units on the basis of a decoding control list describing at least an edit point set in the encoded data and start point representing a timing to start a process to decode fewest possible pictures, which are not to be displayed but must be decoded first before decoding a picture to be displayed after the edit point as decoding control information for controlling the processes carried out by the decoders for decoding the encoded data in order to decode the encoded data; and selecting one of pictures, which are obtained as results of the processes carried out by the decoders, on the basis of the decoding control list and outputting the selected picture.

BRIEF DESCRIPTION OF THE DRAWINGS

FIG. 2 is an explanatory diagram to be referred to in describing a process to decode and then display an MPEG stream;

FIG. 3 is an explanatory diagram to be referred to in describing a study case in which it is possible to seamlessly reproduce an MPEG stream;

FIG. 7 is a diagram showing a sequence of pictures to be decoded sequentially by a decoding unit 4;

FIG. 21 is a diagram showing a typical edit-point list;

FIG. 22 is a diagram showing a typical decoding control list;

FIG. 23 shows a flowchart to be referred to in explaining a reproduction process carried out by the disc system;

FIG. 24 is a diagram showing another typical decoding control list;

PREFERRED EMBODIMENTS OF THE INVENTION

Before explaining preferred embodiments of the present invention, the shortest cut duration is explained. Consider a process to reproduce results of editing in the same way as that described above. In the results of editing, an edit point $T_4$ is not set at picture P15 to be displayed last among the pictures composing GOP (n) as shown in a picture-displaying order 221 of FIG. 4, but set at picture B14 to be displayed immediately before picture P15 as shown in a picture-displaying order 222 of the same figure. In this process, the duration from an edit point $T_3$ set at picture B1 at the beginning of GOP (n) to the next edit point, which is the edit point $T_4$ set at picture B14 of same GOP (n), is smaller that the duration of a GOP, resulting in a state of an unsatisfied requirement of the shortest cut duration.

Figure 1:
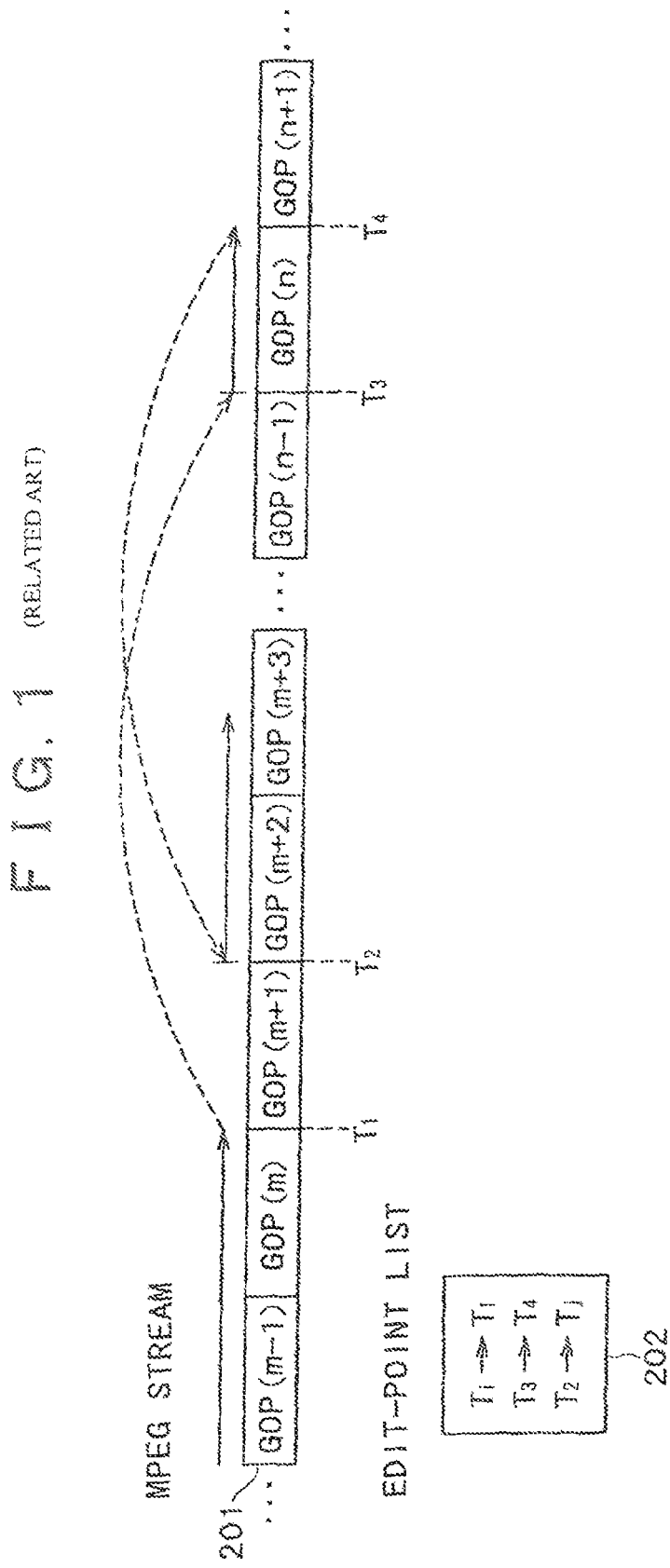
FIG. 1 is an explanatory diagram to be referred to in describing a process to reproduce an MPEG stream on the basis of an edit-point list.
Figure 4:
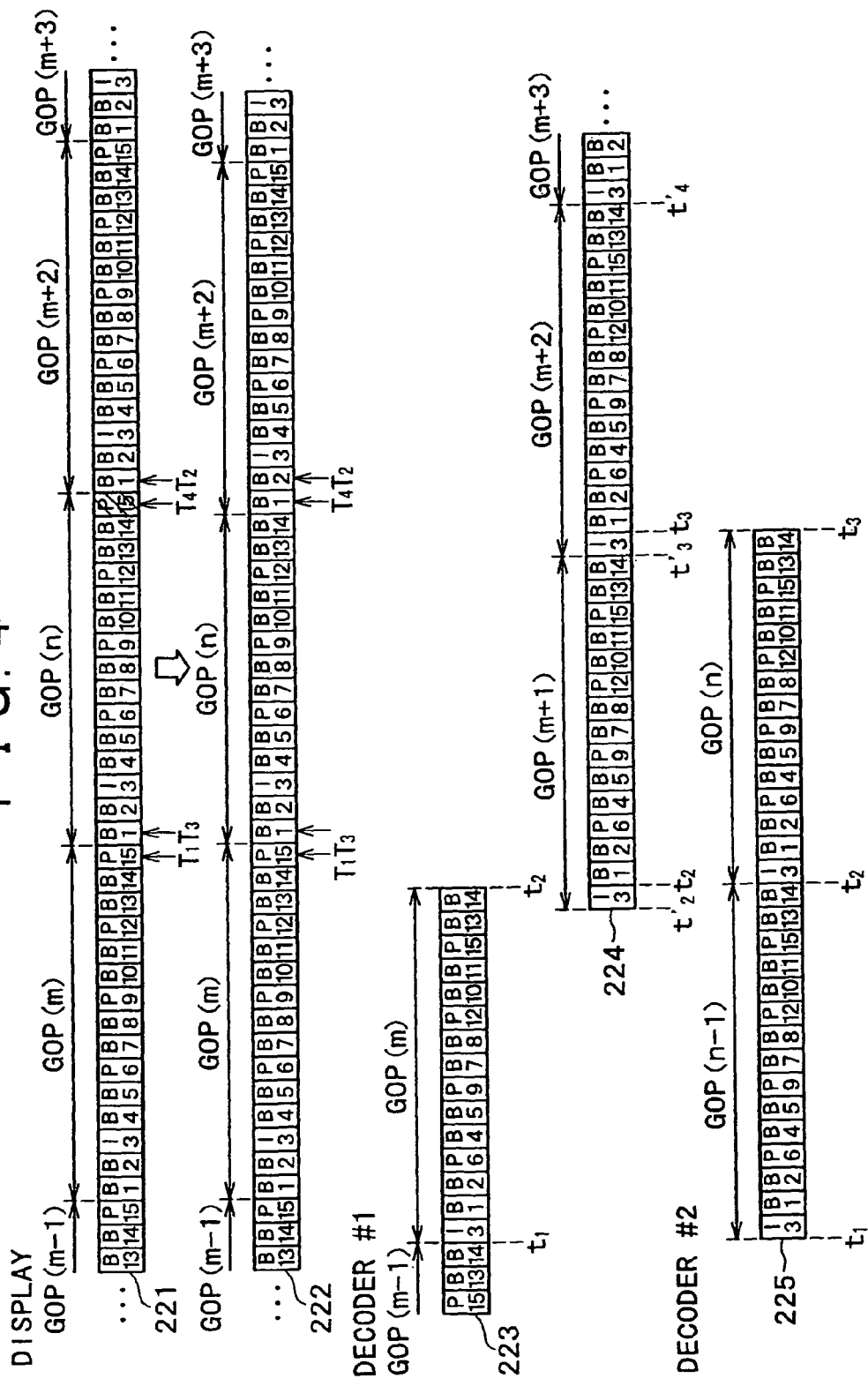
FIG. 4 is an explanatory diagram to be referred to in describing another study case in which it is not possible to seamlessly reproduce an MPEG stream.

In this case, in an operation to reproduce these results of the editing, the start sequence of GOPs ending with picture P15 at the tail of GOP (m) needs to be first displayed to be followed by pictures B1 to B14 of GOP (n) before displaying the other sequence of GOPs beginning with picture B1 at the head of GOP (m+2) as is obvious from a picture-displaying order 222 shown in FIG. 4. At the tail of GOP (m), the edit point $T_1$ has been set. At pictures B1 and B14 of GOP (n), the edit points $T_3$ and $T_4$ have been set respectively. At the head of GOP (m+2), the edit point $T_2$ has been set.

In the operation to reproduce these results of editing, a specific one of two MPEG decoders #1 and #2 is used to decode all pictures ending with GOP (m) as shown in a picture-decoding order 223 of FIG. 4. For example, the specific MPEG decoder is MPEG decoder #1. It is to be noted that, in the process to decode GOP (m), the processing to decode picture B14 to be decoded last among the pictures composing GOP (m) must be completed by a time $t_2$, at which picture B14 is to be displayed, as is the case with the afore described picture-decoding order 213 of FIG. 3. Thus, the process to decode GOP (m) must be started before a time leading ahead of the time $t_2$ by a period of time it takes to display pictures composing a GOP. In the picture-decoding order 213 shown in FIG. 3, a time $t_1$ is determined to be the time to start the process to decode GOP (m).

The edit point $T_1$ is reached after decoder #1 has decoded GOP (m) to be displayed. The process is then continued to processing to decode and display pictures B1 to B14 of GOP (n). The processing to decode and display GOP (n) must start at the edit point $T_3$ and end at the edit point $T_4$.

In order to decode GOP (n), it is necessary to first decode GOP (n−1) immediately preceding GOP (n) as described earlier. In the process to decode GOP (n), the processing to decode picture B14 to be decoded last among the pictures composing GOP (n) must be completed by a time $t_3$, at which picture B14 is to be displayed. Thus, the process to decode GOP (n) must be started before a time leading ahead of the time $t_3$ by a period of time it takes to display pictures composing a GOP. In a picture-decoding order 225 shown in FIG. 4, a time $t_2$ is determined to be the time to start the process to decode GOP (n). By the same token, the process to decode GOP (n−1) immediately preceding GOP (n) must be started before a time leading ahead of the time $t_2$ by a period of time it takes to display pictures composing a GOP. In the picture-decoding order 225 shown in FIG. 4, a time $t_1$ is determined to be the time to start the process to decode GOP (n−1).

For the reason described above, MPEG decoder #2 starts decoding GOP (n−1) at the time $t_1$ and continues the process by decoding GOP (n) as shown in the picture-decoding order 225 of FIG. 4. MPEG decoder #2 is the other one of 2 decoders #1 and #2.

In the mean time, MPEG decoder #1 should naturally terminate the decoding process at the end of the processing to decode GOP (m). After GOP (n) is decoded by decoder #2 and displayed, however, the edit point $T_4$ is reached. Then, MPEG decoder #1 must decode the other sequence of GOPs beginning with GOP (m+2) at the edit point $T_2$ for a display.

In order to decode GOP (m+2), it is necessary to first decode GOP (m+1) leading ahead of GOP (m+2) by a GOP as described earlier. In the process to decode GOP (m+2), the processing to decode picture B14 to be decoded last among the pictures composing GOP (m+2) must be completed by a time $t_4'$, at which picture B14 is to be displayed, as shown in a picture-decoding order 224 of FIG. 4.

In this case, the edit point $T_4$ has been set at picture B14 immediately preceding picture P15, which is the last picture in the display order of GOP (n), as shown the picture-displaying order 222 shown in FIG. 4. Thus, picture P15 pertaining to GOP (n) is not displayed. That is to say, after picture B14 pertaining to GOP (n) has been displayed, picture B1 of GOP (m+2), at which the edit point $T_2$ has been set, is displayed without displaying picture P15 pertaining to GOP (n). Picture B1 pertaining to GOP (m+2) is the first picture in the display order of GOP (m+2). In the case of the case study shown in FIG. 4, the display time of GOP (m+2) is thus earlier than that of the conventional method shown in FIG. 3 by a period of time it takes to decode one picture.

For the reason described above, in the process to decode GOP (m+2) in accordance with the case study shown in FIG. 4, the processing to decode picture B14 to be decoded last among the pictures composing GOP (m+2) must be completed by the time $t_4'$ leading ahead of the time $t_4$ of the conventional method shown in FIG. 3 by a period of time it takes to decode one picture.

As is the case with the conventional method shown in FIG. 3, the process to decode GOP (m+2) must be started before a time leading ahead of the time $t_4'$ by a period of time it takes to decode pictures composing a GOP. In the picture-decoding order 224 shown in FIG. 4, a time $t_3'$ is determined to be the time to start the process to decode GOP (m+2). By the same token, the process to decode GOP (m+1) leading ahead of GOP (m+2) by a GOP must be started before a time leading ahead of the time $t_3'$ by a period of time it takes to decode pictures composing a GOP. In the picture-decoding order 224 shown in FIG. 4, a time $t_2'$ is determined to be the time to start the process to decode GOP (m+1).

The time $t_2'$ leads ahead of the time $t_2$, at which MPEG decoder #1 completes the processing to decode GOP (m), by a period of time it takes to decode one picture. At the time $t_2$, MPEG decoder #1 starts an operation to decode picture B14 of GOP (m) as shown in the picture-decoding order 223 of FIG. 4.

Thus, when the duration between the edit point $T_3$ and the next edit point $T_4$ does not satisfy the requirement of the shortest cut duration as shown in the picture-displaying order 222 of FIG. 4, MPEG decoder #1 is not capable of starting an operation to decode GOP (m+1) at the time $t_2'$ so that it is impossible to seamlessly reproduce the results of editing in accordance with the edit-point list.

If the shortest cut duration is limited to a GOP, on the other hand, there is raised a problem of restricted freedom of editing.

In accordance with the present invention, however, it is possible to make the limitation imposed on the shortest cut duration more lenient while enhancing the freedom of editing.

Figure 5:
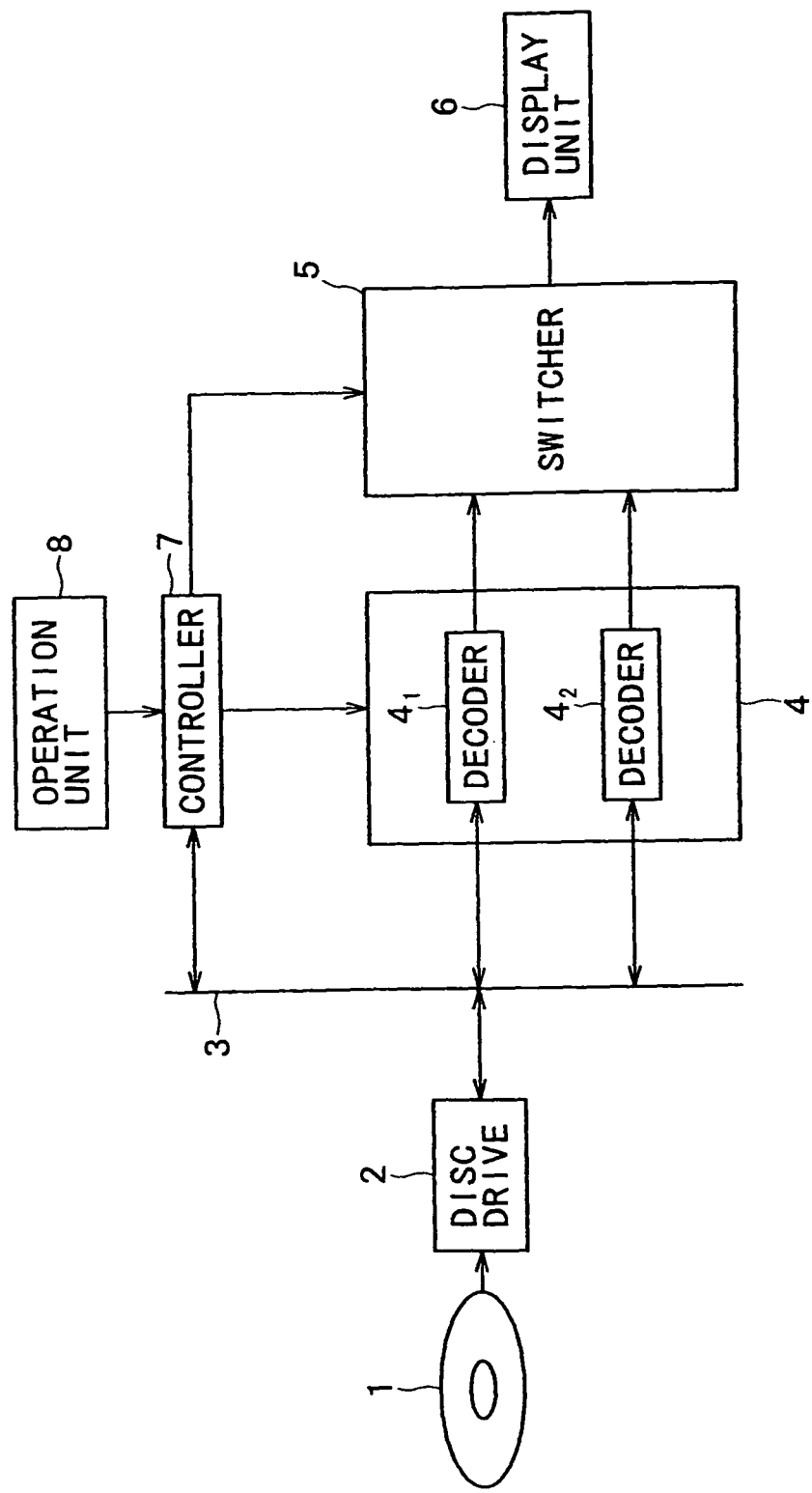
FIG. 5 is a block diagram showing a typical configuration of an embodiment implementing a disc system to which the present invention is applied.

FIG. 5 is a diagram showing a typical configuration of an embodiment implementing a disc system provided by the present invention. In this context, the technical term 'system' means a set of a plurality of apparatus logically combined with each other without regard to whether or not the apparatus composing the set is put in the same box.

An optical disc 1 typically contains a recorded MPEG stream obtained as a result of carrying out an MPEG encoding process on a moving picture. In addition, the optical disc 1 also includes an edit-point list made as another result of editing the recorded MPEG stream as a raw editing material.

A disc drive 2 has a configuration allowing the optical disc 1 to be mounted on and demounted from the disc drive 2. The disc drive 2 is a component for reading out the MPEG stream as well as the edit-point list from the optical disc 1 and outputting the MPEG stream as well as the edit-point list to a bus 3.

A decoding unit 4 includes a plurality of decoders. For example, the decoding unit 4 has two decoders, namely decoders $4_1$ and $4_2$. The decoders $4_1$ and $4_2$ each issue a request for a portion of the MPEG stream to the disc drive 2 by way of the bus 3. Portions of the MPEG stream, which are output by the disc drive 2 at such a request, are supplied to the decoders $4_1$ and $4_2$ by way of the bus 3. In addition, the decoders $4_1$ and $4_2$ each carry out an MPEG decoding process on the received portions of the MPEG stream in accordance with control executed by a controller 7, and output pictures obtained as a result of the MPEG decoding process to a switcher 5.

It is to be noted that the decoders $4_1$ and $4_2$ composing the decoding unit 4 are assumed to operate at a 1-time decoding process speed even though the decoders $4_1$ and $4_2$ can each be a decoder operating at a speed other than the one-time decoding process speed. In addition, the disc drive 2 reads out an MPEG stream from the optical disc 1 at a read-out speed (or a transfer band) large enough for an operation to supply the MPEG stream to the decoders $4_1$ and $4_2$.

The switcher 5 is a component for selecting either a picture decoded by the decoder $4_1$ or a picture decoded by the decoder $4_2$ in accordance with control executed by the controller 7, and outputting a selected picture to a display unit 6. The display unit 6 is a component for displaying a picture output by the switcher 5. Thus, the display unit 6 displays whichever picture the switcher 5 selects among a picture decoded by the decoder $4_1$ and a picture decoded by the decoder $4_2$. It is to be noted that the display unit 6 can be an external component connected to the disc system shown in FIG. 5.

The controller 7 is a component for controlling the disc drive 2, the decoding unit 4 and the switcher 5 in accordance with an operation signal received from an operation unit 8. To put it in detail, when receiving an operation signal requesting the disc system to reproduce a result of an operation to edit an MPEG stream in accordance with an edit-point list from the operation unit 8, the controller 7 issues a request for the edit-point list to the disc drive 2. The controller 7 then receives the edit-point list, which has been read out by the disc drive 2 from the optical disc 1 at the request, from the disc drive 2 by way of the bus 3. Subsequently, the controller 7 detects edit points included on the edit-point list. In addition, for each of the edit points detected from the edit-point list, the controller 7 identifies fewest possible pictures, which are not to be displayed after the edit point but must be decoded first in order to decode pictures to be displayed after the edit point. Then, the controller 7 computes a start point representing a timing to start an operation to decode the one or fewest possible pictures not to be displayed after the edit point. Furthermore, the controller 7 controls operations, which are carried out by the decoders $4_1$ and $4_2$ to decode the MPEG stream in picture units, on the basis of the start point. Moreover, for each of the edit points detected from the edit-point list, the controller 7 controls the switcher 5, driving the switcher 5 to select either a picture decoded by the decoder $4_1$ or a picture decoded by the decoder $4_2$ and output the selected picture.

The operation unit 8 is a component operated by the user to output an operation signal representing an operation carried out by the user on the operation unit 8 to the controller 7.

The disc system with the configuration described above carries out a reproduction process to reproduce an MPEG stream from the optical disc 1 in accordance with an edit-point list, which has also been recorded on the same optical disc 1.

Figure 6:
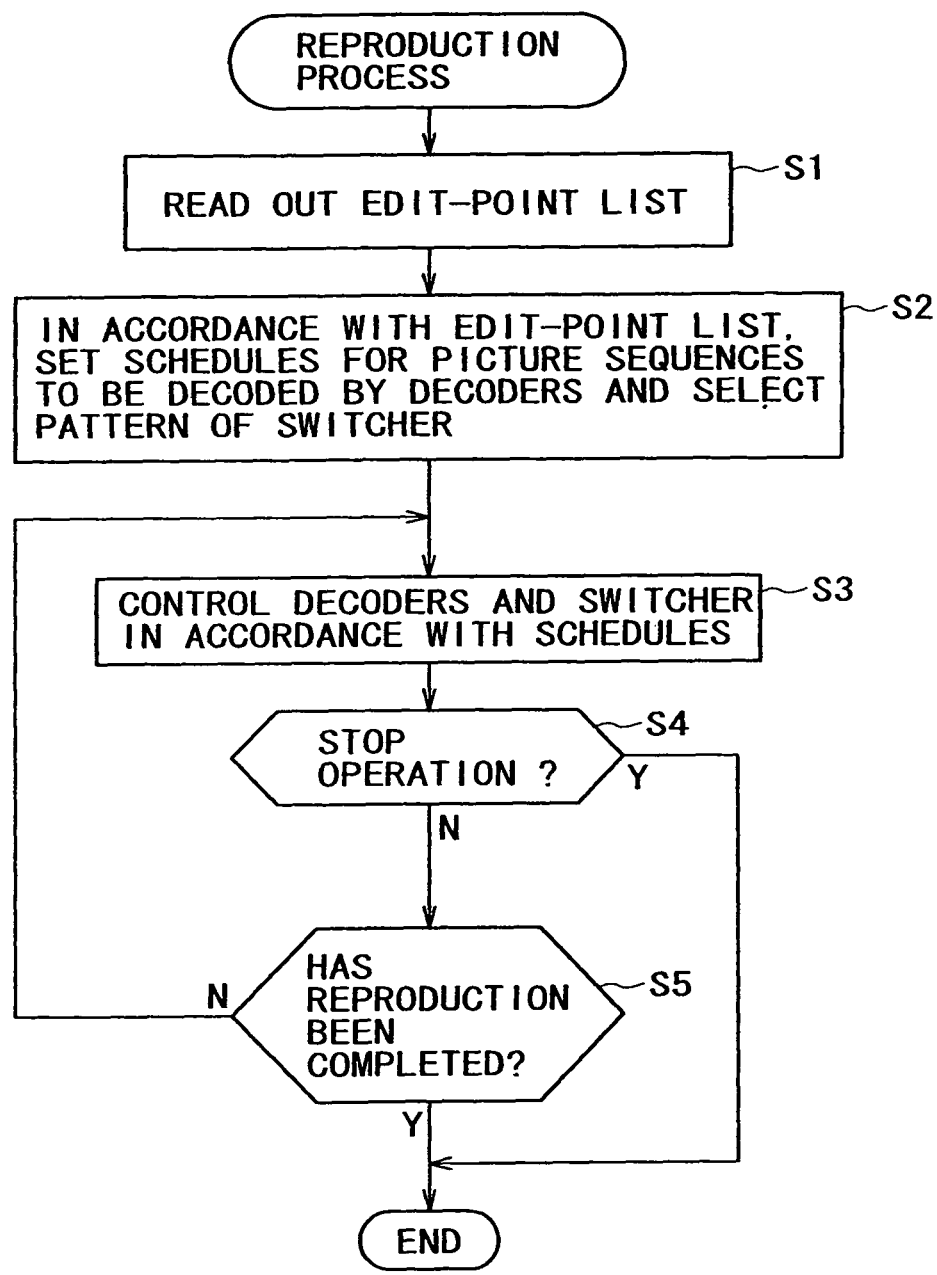
FIG. 6 shows a flowchart to be referred to in explaining a reproduction process carried out by the disc system.

FIG. 6 shows a flowchart representing the reproduction process carried out by the disc system shown in FIG. 5.

When the user operates the operation unit 8 to start a process to reproduce a result of an operation to edit an MPEG stream in accordance with an edit-point list, the operation unit 8 outputs an operation signal to start the reproduction process to the controller 7. The operation signal to start the reproduction process is properly referred to hereafter as a reproduction start operation signal.

Receiving the reproduction start operation signal from the operation unit 8 at a step S1, the controller 7 issues a request for the edit-point list to the disc drive 2. At this request, the disc drive 2 reads out the edit-point list from the optical disc 1 and then outputs the list to the bus 3. The controller 7 then receives the edit-point list from the bus 3. Then, at the next step S2, the controller 7 sets schedules of sequences of pictures to be decoded by the decoders $4_1$ and $4_2$ and a schedule of a select pattern for driving the switcher 5 to select the output of either the decoder $4_1$ or the decoder $4_2$.

Subsequently, at the next step S3, the controller 7 controls the decoders $4_1$ and $4_2$ as well as the switcher 5 in accordance with the schedules set at the step S2.

In accordance with the control executed by the controller 7, the decoders $4_1$ and $4_2$ issue a request for portions of an MPEG stream to the disc drive 2 by way of the bus 3. Then, the decoders $4_1$ and $4_2$ decode the requested portions of the MPEG stream, which are supplied by the disc drive 2 by way of the bus 3. The decoders $4_1$ and $4_2$ then output pictures obtained as a result of decoding to the switcher 5. Subsequently, the switcher 5 selects a decoded picture output by either the decoder 1 or the decoder 2 and outputs the selected picture to the display unit 6.

Then, at the next step S4, the controller 7 forms a judgment as to whether or not the user has operated the operation unit 8 to stop the reproduction process. If the outcome of the judgment formed at the step S4 indicates that the user has operated the operation unit 8 to stop the reproduction process, that is, if the controller 7 has received an operation signal to stop the reproduction process from the operation unit 8, the reproduction process is ended. The operation signal to stop the reproduction process is properly referred to hereafter as a reproduction stop operation signal.

If the outcome of the judgment formed at the step S4 indicates that the user has not operated the operation unit 8 to stop the reproduction process, on the other hand, the flow of the reproduction process goes on to a step S5 at which the controller 7 forms a judgment as to whether or not the process to reproduce the result of an operation to edit the MPEG stream in accordance with an edit-point list read out at the step S1 has been completed. If the outcome of the judgment formed at the step S5 indicates that the process to reproduce the result of an operation to edit the MPEG stream in accordance with an edit-point list has not been completed, the flow of the reproduction process goes back to the step S3 to repeat the same processing. If the outcome of the judgment formed at the step S5 indicates that the process to reproduce the result of an operation to edit the MPEG stream in accordance with an edit-point list has been completed, on the other hand, the execution of the reproduction process is ended.

The following description explains the processing carried out by the controller 7 at the step S2 of the flowchart shown in FIG. 6 to set schedules of sequences of pictures to be decoded by the decoders $4_1$ and $4_2$. It is to be noted that, in this embodiment, a GOP typically includes pictures arranged in a sequence of B1, B2, I3, B4, B5, P6, B7, B8, P9, B10, B11, P12, B13, B14, P15 and encoded/decoded in an order of I3, B1, B2, P6, B4, B5, P9, B7, B8, P12, B10, B11, P15, B13, B14. It is also worth noting, however, that the configuration of a GOP is not limited to the above sequence.

The controller 7 specifies pictures to be decoded by the decoder $4_1$ or $4_2$ in processing to decode the MPEG stream, and requests the decoders $4_1$ and $4_2$ to decode only fewest possible pictures, which are not to be displayed after an edit point but must be first decoded in order to decode pictures to be displayed after the edit point. In this way, the requirement of the shortest cut duration can be made more lenient.

That is to say, it may be necessary to decode GOP (n-1) immediately preceding GOP (n) in order to decode GOP (n) itself as described before.

To put it concretely, in order to decode pictures B1 and B2 pertaining to GOP (n), it is necessary to reference picture P15 pertaining to GOP (n-1) immediately preceding GOP (n). Furthermore, in order to decode picture P12 pertaining to GOP (n-1), it is necessary to reference picture P9 pertaining to GOP (n-1). In the same way, for other pictures pertaining to GOP (n-1), in order to decode picture P9, it is necessary to reference picture P6 and, in order to decode picture P6, it is necessary to reference picture I3.

In accordance with the conventional technology, the processing to decode pictures is controlled in GOP units. Thus, in order to decode pictures B1 and B2 pertaining to GOP (n), it is necessary to first decode all pictures pertaining to GOP (n-1) immediately preceding GOP (n).

Accordingly, if an edit point is set at picture B1 or B2 pertaining to GOP (n), in order to start a display operation beginning with picture B1 or B2, it is necessary to first decode all pictures pertaining to GOP (n-1) even though these pictures are not to be displayed before pictures B1 and B2 in the case studies explained before.

In addition, for pictures pertaining to GOP (n), in order to decode a picture other than pictures B1 and B2, it is necessary to reference a picture pertaining to the same GOP (n) even though it is not necessary to reference picture pertaining to GOP (n-1) immediately preceding GOP (n). In order to decode picture B4 pertaining to GOP (n), for example, it is necessary to first reference pictures I3 and P6, which also pertain to GOP (n). Thus, in order to decode picture B4 pertaining to GOP (n), it is necessary to first decode all pictures I3, B1, B2 and P6, which precede picture B4 in the decoding order of GOP (n). Otherwise, picture B4 cannot be decoded.

Thus, if an edit point is set at picture B4 pertaining to GOP (n), it is necessary to first decode all pictures I3, B1, B2 and P6, which also pertain to GOP (n) and not to be displayed, in order to start a display operation beginning with picture B4.

In order to implement the above scheme, the controller 7 controls the decoders $4_1$ and $4_2$ by specifying objects of decoding in picture units in place of GOP units. In this way, only pictures that have been displayed are referenced in case such pictures are required for decoding another picture to be displayed. On the other hand, pictures that have not been displayed are, if possible, not referenced in decoding a specific picture to be displayed with the exception of as fewest such pictures as possible.

That is to say, if objects of decoding are specified in GOP units, with an edit point set at picture B1 or B2 pertaining to GOP (n), in order to start a display operation beginning with picture B1 or B2, as described above, it is necessary to first decode all pictures pertaining to GOP (n-1) even though these pictures are not to be displayed before pictures B1 and B2 in the case studies explained before. However, only picture P15 pertaining to GOP (n−1) is actually referenced in decoding pictures B1 and B2 pertaining to GOP (n) and only picture P12 pertaining to GOP (n−1) is actually referenced in decoding picture P15 pertaining to GOP (n−1). By the same token, for other pictures pertaining to GOP (n−1), only picture P9 is actually referenced in decoding picture P12, only picture P6 is actually referenced in decoding picture P9, and only picture I3 is actually referenced in decoding picture P6.

Thus, the fewest possible specific pictures of GOP (n−1), which need to be decoded first before decoding pictures B1 and B2 pertaining to GOP (n) even though these specific pictures are not to be displayed before pictures B1 and B2 in the case studies explained before, are only 5 pictures, namely, I3, P6, P9, P12 and P15. Pictures of GOP (n−1), which do not need to be referenced in decoding pictures B1 and B2 pertaining to GOP (n), are B1, B2, B4, B5, B7, B8, B10, B11, B13 and B14. It is thus unnecessary to decode the pictures of GOP (n−1), which are not referenced. A picture not to be displayed is not supplied to the display unit 6 shown in FIG. 5.

By the same token, if an edit point has been set at picture B4 pertaining to GOP (n), for example, fewest possible specific pictures of GOP (n), which need to be decoded first before decoding picture B4 even though these specific pictures are not to be displayed due to the location of the edit point, are reduced to only picture I3 pertaining to GOP (n). Since pictures B1 and B2 pertaining to GOP (n) are not referenced in decoding picture B4 pertaining to GOP (n), it is not necessary to decode pictures B1 and B2.

As described earlier, in accordance with the MPEG technique, while an I or P picture can be used as a picture to be referenced in decoding another picture, a B picture is never used as a picture to be referenced in decoding another picture. Thus, only pictures I and P can be categorized as fewest possible specific pictures, which need to be decoded first before decoding other pictures even though these specific pictures are not to be displayed.

As described earlier, at the step S2 of the flowchart shown in FIG. 6, the controller 7 sets schedules of sequences of pictures, which are to be decoded by the decoders 4$_1$ and 4$_2$, in accordance with the edit-point list. Typically, the schedule is set as shown in FIG. 7.

To put it in detail, the controller 7 detects first edit points from the edit-point list. For each detected edit point set as an IN point, the controller 7 then sets a schedule of a sequence of pictures to be decoded by the decoder 4$_1$ or 4$_2$ in accordance with a picture at which the detected edit point is set.

To put it concretely, If a detected edit point has been set as an IN point at picture B1 pertaining to GOP (n) as indicated by the first line of the schedules shown in FIG. 7, for example, the fewest possible specific pictures of GOP (n−1), which need to be decoded first before decoding picture B1 pertaining to GOP (n) even though these specific pictures are not to be displayed before picture B1 in the case studies explained before, are only 5 pictures, namely, I3, P6, P9, P12 and P15 as described earlier. Thus, the controller 7 sets a schedule to first decode these pictures I3, P6, P9, P12 and P15 pertaining to GOP (n−1). Then, thereafter, subsequent pictures pertaining to GOP (n) need to be sequentially decoded. That is to say, the schedule includes decoding of subsequent pictures of GOP (n) in the normal decoding order of (I3, B1, B2, P6, B4 and so on) after decoding pictures I3, P6, P9, P12 and P15 pertaining to GOP (n−1).

If a detected edit point has been set as an IN point at picture B2 pertaining to GOP (n) as indicated by the second line of the schedules shown in FIG. 7, the fewest possible specific pictures of GOP (n−1), which need to be decoded first before decoding picture B2 pertaining to GOP (n) even though these specific pictures are not to be displayed before picture B2 in the case studies explained before, are only 5 pictures, namely, I3, P6, P9, P12 and P15 as described earlier. Thus, the controller 7 sets a schedule to first decode these pictures I3, P6, P9, P12 and P15 pertaining to GOP (n−1). Then, thereafter, pictures I3, B1, B2, P6, B4 and so on pertaining to GOP (n) would naturally need to be sequentially decoded. However, picture B1 supposed to be displayed before picture B2, at which a detected edit point has been set as an IN point, need to be neither referenced because picture B1 is a B picture, nor displayed because the detected edit point has been set at picture B2 following picture B1 in the display order. Thus, it is not necessary to decode picture B1. That is to say, the schedule includes decoding of subsequent pictures of GOP (n) in a decoding order of (I3, B2, P6, B4 and so on) after decoding pictures I3, P6, P9, P12 and P15 pertaining to GOP (n−1). That is to say, picture B2 pertaining to GOP (n) is decoded after picture I3 to be followed by decoding of pictures P6, B4 and so on.

If a detected edit point has been set as an IN point at picture I3 pertaining to GOP (n) as indicated by the third line of the schedules shown in FIG. 7, no other pictures need to be referenced in order to decode picture I3. Thus, pictures I3, B1, B2, P6, B4 and so on pertaining to GOP (n) would naturally need to be sequentially decoded. Since a detected edit point is set as an IN point at picture I3, however, it is not necessary to display pictures B1 and B2, which are supposed to be displayed before picture I3 following pictures B1 and B2 in the display order, and it is also unnecessary to reference pictures B1 and B2 because pictures B1 and B2 are each a B picture. Thus, it is not necessary to decode pictures B1 and B2. For this reason, the controller 7 sets a schedule to decode picture P6 after picture I3 without decoding pictures B1 and B2. After decoding picture P6, the pictures remaining in the original decoding sequence are decoded sequentially in the normal order.

If a detected edit point has been set as an IN point at picture B4 pertaining to GOP (n) as indicated by the fourth line of the schedules shown in FIG. 7, the fewest possible specific pictures, which need to be decoded first before decoding picture B4 even though these specific pictures are not to be displayed before picture B4 because of the position of the detected edit point, are reduced to only picture I3 pertaining to GOP (n). Thus, the controller 7 sets a schedule to first decode picture I3 pertaining to GOP (n). Then, thereafter, pictures B1, B2, P6, B4, B5 and so on of GOP (n), which follow picture I3 in accordance with the normal decoding order, would naturally need to be sequentially decoded. However, pictures B1 and B2 supposed to be displayed before picture B4, at which a detected edit point has been set as an IN point, need to be neither referenced because pictures B1 and B2 are each a B picture, nor displayed because the detected edit point has been set at picture B4 following pictures B1 and B2 in the display order. Thus, it is not necessary to decode pictures B1 and B2. For this reason, the controller 7 sets a schedule to decode picture P6 pertaining to GOP (n) after picture I3 without decoding pictures B1 and B2. After decoding picture P6, the pictures remaining in the original decoding sequence are decoded sequentially in the normal order.

If a detected edit point has been set as an IN point at picture B5 pertaining to GOP (n) as indicated by the fifth line of the schedules shown in FIG. 7, the fewest possible specific pictures, which need to be decoded first before decoding picture B5 even though these specific pictures are not to be displayed before picture B5 because of the position of the detected edit point, are reduced to only picture I3 pertaining to GOP (n).

Thus, the controller 7 sets a schedule to first decode picture I3 pertaining to GOP (n). Then, thereafter, pictures B1, B2, P6, B4, B5 and so on of GOP (n), which follow picture I3 in accordance with the normal decoding order, would naturally need to be sequentially decoded. However, pictures B1, B2 and B4 supposed to be displayed before picture B5, at which a detected edit point has been set as an IN point, need to be neither referenced because pictures B1, B2 and B4 are each a B picture, nor displayed because the detected edit point has been set at picture B5 following pictures B1, B2 and B4 in the display order. Thus, it is not necessary to decode pictures B1, B2 and B4. For this reason, the controller 7 sets a schedule to decode picture P6 pertaining to GOP (n) after picture I3 without decoding pictures B1 and B2. Then, after decoding picture P6, picture B5 is decoded without decoding picture B4. Thereafter, the pictures remaining in the original decoding sequence are decoded sequentially in the normal order.

If a detected edit point has been set as an IN point at picture P6 pertaining to GOP (n) as indicated by the sixth line of the schedules shown in FIG. 7, the fewest possible specific pictures, which need to be decoded first before decoding picture P6 even though these specific pictures are not to be displayed before picture P6 because of the position of the detected edit point, are reduced to only picture I3 pertaining to GOP (n). Thus, the controller 7 sets a schedule to first decode picture I3 pertaining to GOP (n). Then, thereafter, pictures B1, B2, P6, B4, B5, P9 and so on of GOP (n), which follow picture I3 in accordance with the normal decoding order, would naturally need to be sequentially decoded. However, pictures B1, B2, B4 and B5 supposed to be displayed before picture P6, at which a detected edit point has been set as an IN point, need to be neither referenced because pictures B1, B2, B4 and B5 are each a B picture, nor displayed because the detected edit point has been set at picture P6 following pictures B1, B2, B4 and B5 in the display order. Thus, it is not necessary to decode pictures B1, B2, B4 and B5. For this reason, the controller 7 sets a schedule to decode picture P6 pertaining to GOP (n) after picture I3 without decoding pictures B1 and B2. Then, after decoding picture P6, picture P9 is decoded without decoding pictures B4 and B5. Thereafter, the pictures remaining in the original decoding sequence are decoded sequentially in the normal order.

If a detected edit point has been set as an IN point at picture B7 pertaining to GOP (n) as indicated by the seventh line of the schedules shown in FIG. 7, the fewest possible specific pictures, which need to be decoded first before decoding picture B7 even though these specific pictures are not to be displayed before picture B7 because of the position of the detected edit point, are reduced to only pictures I3 and P6 pertaining to GOP (n). Thus, the controller 7 sets a schedule to first decode pictures I3 and P6 pertaining to GOP (n). Then, thereafter, pictures B4, B5, P9, B7, B8 and so on of GOP (n), which follow picture P6 in accordance with the normal decoding order, would naturally need to be sequentially decoded. However, pictures B4 and B5 supposed to be displayed before picture B7, at which a detected edit point has been set as an IN point, need to be neither referenced because pictures B4 and B5 are each a B picture, nor displayed because the detected edit point has been set at picture B7 following pictures B4 and B5 in the display order. Thus, it is not necessary to decode pictures B4 and B5. For this reason, the controller 7 sets a schedule to decode picture P9 pertaining to GOP (n) after picture P6 without decoding pictures B4 and B5. Thereafter, the pictures remaining in the original decoding sequence are decoded sequentially in the normal order.

If a detected edit point has been set as an IN point at picture B8 pertaining to GOP (n) as indicated by the eighth line of the schedules shown in FIG. 7, the fewest possible specific pictures, which need to be decoded first before decoding picture B8 even though these specific pictures are not to be displayed before picture B8 because of the position of the detected edit point, are reduced to only pictures I3 and P6 pertaining to GOP (n). Thus, the controller 7 sets a schedule to first decode pictures I3 and P6 pertaining to GOP (n). Then, thereafter, pictures B4, B5, P9, B7, B8 and so on of GOP (n), which follow picture P6 in accordance with the normal decoding order, would naturally need to be sequentially decoded. However, pictures B4, B5 and B7 supposed to be displayed before picture B8, at which a detected edit point has been set as an IN point, need to be neither referenced because pictures B4, B5 and B7 are each a B picture, nor displayed because the detected edit point has been set at picture B8 following pictures B4, B5 and B7 in the display order. Thus, it is not necessary to decode pictures B4, B5 and B7. For this reason, the controller 7 sets a schedule to decode picture P9 pertaining to GOP (n) after picture P6 without decoding pictures B4 and B5. Then, after decoding picture P9, picture B8 is decoded without decoding picture B7. Thereafter, the pictures remaining in the original decoding sequence are decoded sequentially in the normal order.

If a detected edit point has been set as an IN point at picture P9 pertaining to GOP (n) as indicated by the ninth line of the schedules shown in FIG. 7, the fewest possible specific pictures, which need to be decoded first before decoding picture P9 even though these specific pictures are not to be displayed before picture P9 because of the position of the detected edit point, are reduced to only pictures I3 and P6 pertaining to GOP (n). Thus, the controller 7 sets a schedule to first decode pictures I3 and P6 pertaining to GOP (n). Then, thereafter, pictures B4, B5, P9, B7, B8, P12, B10, B11 and so on of GOP (n), which follow picture P6 in accordance with the normal decoding order, would naturally need to be sequentially decoded. However, pictures B4, B5, B7 and B8 supposed to be displayed before picture P9, at which a detected edit point has been set as an IN point, need to be neither referenced because pictures B4, B5, B7 and B8 are each a B picture, nor displayed because the detected edit point has been set at picture P9 following pictures B4, B5, B7 and B8 in the display order. Thus, it is not necessary to decode pictures B4, B5, B7 and B8. For this reason, the controller 7 sets a schedule to decode picture P9 pertaining to GOP (n) after picture P6 without decoding pictures B4 and B5. Then, after decoding picture P9, picture P12 is decoded without decoding pictures B7 and B8. Thereafter, the pictures remaining in the original decoding sequence are decoded sequentially in the normal order.

If a detected edit point has been set as an IN point at picture B10 pertaining to GOP (n) as indicated by the tenth line of the schedules shown in FIG. 7, the fewest possible specific pictures, which need to be decoded first before decoding picture B10 even though these specific pictures are not to be displayed before picture B10 because of the position of the detected edit point, are reduced to only pictures I3, P6 and P9 pertaining to GOP (n). Thus, the controller 7 sets a schedule to first decode pictures I3, P6 and P9 pertaining to GOP (n). Then, thereafter, pictures B7, B8, P12, B10, B11 and so on of GOP (n), which follow picture P9 in accordance with the normal decoding order, would naturally need to be sequentially decoded. However, pictures B7 and B8 supposed to be displayed before picture B10, at which a detected edit point has been set as an IN point, need to be neither referenced because pictures B7 and B8 are each a B picture, nor displayed because the detected edit point has been set at picture B10 following pictures B7 and B8 in the display order. Thus, it is not necessary to decode pictures B7 and B8. For this reason, the controller 7 sets a schedule to decode picture P12 pertaining to GOP (n) after picture P9 without decoding pictures B7 and B8. Thereafter, the pictures remaining in the original decoding sequence are decoded sequentially in the normal order.

If a detected edit point has been set as an IN point at picture B11 pertaining to GOP (n) as indicated by the eleventh line of the schedules shown in FIG. 7, the fewest possible specific pictures, which need to be decoded first before decoding picture B11 even though these specific pictures are not to be displayed before picture B11 because of the position of the detected edit point, are reduced to only pictures I3, P6 and P9 pertaining to GOP (n). Thus, the controller 7 sets a schedule to first decode pictures I3, P6 and P9 pertaining to GOP (n). Then, thereafter, pictures B7, B8, P12, B10, B11 and so on of GOP (n), which follow picture P9 in accordance with the normal decoding order, would naturally need to be sequentially decoded. However, pictures B7, B8 and B10 supposed to be displayed before picture B11, at which a detected edit point has been set as an IN point, need to be neither referenced because pictures B7, B8 and B10 are each a B picture, nor displayed because the detected edit point has been set at picture B11 following pictures B7, B8 and B10 in the display order. Thus, it is not necessary to decode pictures B7, B8 and B10. For this reason, the controller 7 sets a schedule to decode picture P12 pertaining to GOP (n) after picture P9 without decoding pictures B7 and B8. Then, after decoding picture P12, picture B11 is decoded without decoding picture B10. Thereafter, the pictures remaining in the original decoding sequence are decoded sequentially in the normal order.

If a detected edit point has been set as an IN point at picture P12 pertaining to GOP (n) as indicated by the twelfth line of the schedules shown in FIG. 7, the fewest possible specific pictures, which need to be decoded first before decoding picture P12 even though these specific pictures are not to be displayed before picture P12 because of the position of the detected edit point, are reduced to only pictures I3, P6 and P9 pertaining to GOP (n). Thus, the controller 7 sets a schedule to first decode pictures I3, P6 and P9 pertaining to GOP (n). Then, thereafter, pictures B7, B8, P12, B10, B11, P15, B13, B14 and so on of GOP (n), which follow picture P9 in accordance with the normal decoding order, would naturally need to be sequentially decoded. However, pictures B7, B8, B10 and B11 supposed to be displayed before picture P12, at which a detected edit point has been set as an IN point, need to be neither referenced because pictures B7, B8, B10 and B11 are each a B picture, nor displayed because the detected edit point has been set at picture B12 following pictures B7, B8, B10 and B11 in the display order. Thus, it is not necessary to decode pictures B7, B8, B10 and B11. For this reason, the controller 7 sets a schedule to decode picture P12 pertaining to GOP (n) after picture P9 without decoding pictures B7 and B8. Then, after decoding picture P12, picture P15 is decoded without decoding pictures B10 and B11. Thereafter, the pictures remaining in the original decoding sequence are decoded sequentially in the normal order.

If a detected edit point has been set as an IN point at picture B13 pertaining to GOP (n) as indicated by the thirteenth line of the schedules shown in FIG. 7, the fewest possible specific pictures, which need to be decoded first before decoding picture B13 even though these specific pictures are not to be displayed before picture B13 because of the position of the detected edit point, are reduced to only pictures I3, P6, P9 and P12 pertaining to GOP (n). Thus, the controller 7 sets a schedule to first decode pictures I3, P6, P9 and P12 pertaining to GOP (n). Then, thereafter, pictures B10, B11, P15, B13, B14 and so on of GOP (n), which follow picture P12 in accordance with the normal decoding order, would naturally need to be sequentially decoded. However, pictures B10 and B11 supposed to be displayed before picture B13, at which a detected edit point has been set as an IN point, need to be neither referenced because pictures B10 and B11 are each a B picture, nor displayed because the detected edit point has been set at picture B13 following pictures B10 and B11 in the display order. Thus, it is not necessary to decode pictures B10 and B11. For this reason, the controller 7 sets a schedule to decode picture P15 pertaining to GOP (n) after picture P12 without decoding pictures B10 and B11. Thereafter, the pictures remaining in the original decoding sequence are decoded sequentially in the normal order.

If a detected edit point has been set as an IN point at picture B14 pertaining to GOP (n) as indicated by the fourteenth line of the schedules shown in FIG. 7, the fewest possible specific pictures, which need to be decoded first before decoding picture B14 even though these specific pictures are not to be displayed before picture B14 because of the position of the detected edit point, are reduced to only pictures I3, P6, P9 and P12 pertaining to GOP (n). Thus, the controller 7 sets a schedule to first decode pictures I3, P6, P9 and P12 pertaining to GOP (n). Then, thereafter, pictures B10, B11, P15, B13, B14 and so on of GOP (n), which follow picture P12 in accordance with the normal decoding order, would naturally need to be sequentially decoded. However, pictures B10, B11 and B13 supposed to be displayed before picture B14, at which a detected edit point has been set as an IN point, need to be neither referenced because pictures B10, B11 and B13 are each a B picture, nor displayed because the detected edit point has been set at picture B14 following pictures B10, B11 and B13 in the display order. Thus, it is not necessary to decode pictures B10, B11 and B13. For this reason, the controller 7 sets a schedule to decode picture P15 pertaining to GOP (n) after picture P12 without decoding pictures B10 and B11. Then, after decoding picture P15, picture B14 is decoded without decoding pictures B13. Thereafter, the pictures remaining in the original decoding sequence are decoded sequentially in the normal order.

If a detected edit point has been set as an IN point at picture P15 pertaining to GOP (n) as indicated by the fifteenth line of the schedules shown in FIG. 7, the fewest possible specific pictures, which need to be decoded first before decoding picture P15 even though these specific pictures are not to be displayed before picture P15 because of the position of the detected edit point, are reduced to only pictures I3, P6, P9 and P12 pertaining to GOP (n). Thus, the controller 7 sets a schedule to first decode pictures I3, P6, P9 and P12 pertaining to GOP (n). Then, thereafter, pictures B10, B11, P15, B13, B14 and so on of GOP (n), which follow picture P12 in accordance with the normal decoding order, would naturally need to be sequentially decoded. However, pictures B10, B11, B13 and B14 supposed to be displayed before picture P15, at which a detected edit point has been set as an IN point, need to be neither referenced because pictures B10, B11, B13 and B14 are each a B picture, nor displayed because the detected edit point has been set at picture P15 following pictures B10, B11, B13 and B14 in the display order. Thus, it is not necessary to decode pictures B10, B11, B13 and B14. For this reason, the controller 7 sets a schedule to decode picture P15 pertaining to GOP (n) after picture P12 without decoding pictures B10 and B11. Then, after decoding picture P15, picture I3 pertaining to the next GOP is decoded without decoding pictures B13 and B14. Thereafter, subsequent pictures are decoded sequentially in the normal decoding order.

Figure 8:
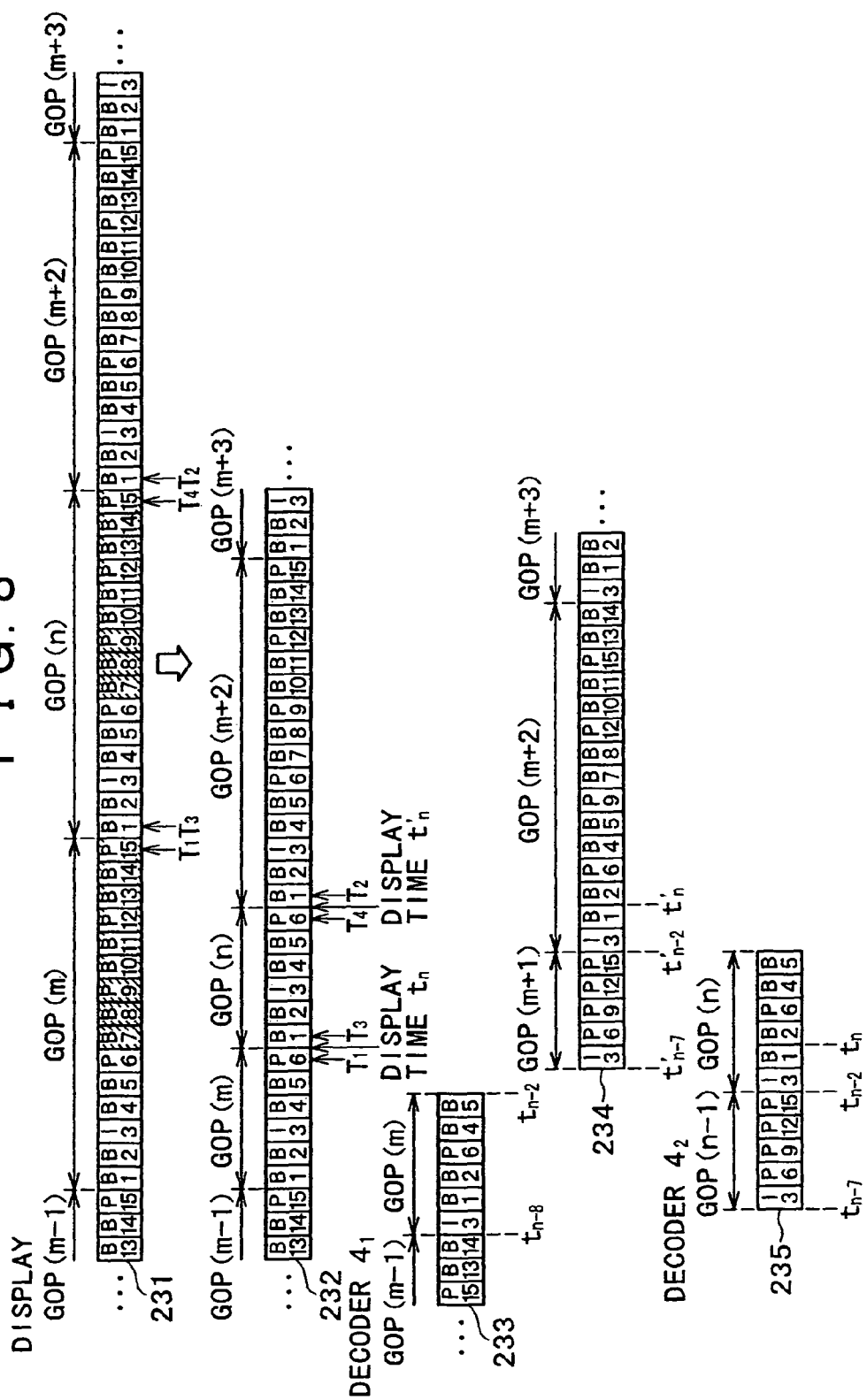
FIG. 8 is an explanatory diagram to be referred to in describing a further study case in which it is possible to seamlessly reproduce an MPEG stream.

By setting schedules as described above, the disc system shown in FIG. 5 is capable of decoding an MPEG stream at a shortest cut duration of 6 frames (or 6 pictures) as shown in FIG. 8.

To put it in detail, in the case study shown in FIG. 3, the edit point $T_1$ is set at picture P15 pertaining to GOP (m) as an OUT point, the edit point $T_3$ is set at picture B1 pertaining to GOP (n) as an IN point, the edit point $T_4$ is set at picture P15 pertaining to GOP (n) as an OUT point and the edit point $T_2$ is set at picture B1 pertaining to GOP (m+2) as an IN point as indicated by a picture-displaying order 231 shown in FIG. 8. Now, the picture-displaying order 231 is changed to a picture-displaying order 232 also shown in FIG. 8. In accordance with the picture-displaying order 232, the edit point T1 is set at picture P6 pertaining to GOP (m) instead of being set at picture P15 as an OUT point and the edit point $T_4$ is set at picture P6 pertaining to GOP (n) instead of being set at picture P15 as an OUT point.

As a result of such a change, the duration between the edit point $T_3$ set at picture B1 pertaining to GOP (n) as an IN point and the edit point $T_4$ set at picture P6 pertaining to GOP (n) as an OUT point is a shortest cut duration, which is six frames in this case.

In this case, in a process to reproduce a result of editing in accordance with the picture-displaying order 232 shown in FIG. 8, a start sequence of GOPs is first reproduced to be followed by a middle sequence of GOPs before finally displaying an end sequence of GOPs. The start sequence of GOPs ends at the edit point $T_1$ set at picture P6 pertaining to GOP (m) as an OUT point. The middle sequence of GOPs begins at the edit point $T_3$ set at picture B1 pertaining to GOP (n) as an IN point and ends at the edit point $T_4$ set at picture P6 pertaining to GOP (n) as an OUT point. The end sequence of GOPs begins at the edit point $T_2$ set at picture B1 pertaining to GOP (m+2) as an IN point.

In order to carry out the process to reproduce a result of editing in accordance with the picture-displaying order 232 as described above, the controller 7 controls one of the two decoders $4_1$ and $4_2$ such as the decoder $4_1$ to decode pictures I3, B1, B2, P6, B4 and B5 to be displayed as pictures pertaining to GOP (m) as shown in a picture-decoding order 233 of FIG. 8. It is to be noted that, in the process to decode pictures I3, B1, B2, P6, B4 and B5 pertaining to GOP (m), the processing to decode picture B5 to be decoded last among the pictures composing GOP (m) must be completed by a time $t_{n-2}$, at which picture B5 is to be displayed. Thus, the process to decode GOP (m) must be started before a time leading ahead of the time $t_{n-2}$ by a period of time it takes to display six pictures, namely, pictures B1 to P6. In the picture-decoding order 233 shown in FIG. 8, a time $t_{n-8}$ is determined to be the time to start the process to decode GOP (m).

In the case study shown in FIG. 8, reference symbol $t_n$ denotes a time at which the display of the first picture B1 pertaining to GOP (n) is started and the display of picture P6 pertaining to GOP (m) is ended. Reference symbol $t_{n-i}$ denotes a time leading ahead of the time $t_n$ by a period of time it takes to display i frames.

After the decoder $4_1$ decodes and displays pictures B1 to P6 pertaining to GOP (m), the edit point $T_1$ is reached as shown in the picture-displaying order 232 of FIG. 8. The process is then continued to processing to decode and display pictures B1 to P6 pertaining to GOP (n). The processing to decode and display GOP (n) must start at the edit point $T_3$ and end at the edit point $T_4$.

Since picture B1 pertaining to group GOP (n) is a picture at which the edit point $T_3$ has been set, as shown in a picture-decoding order 235 of FIG. 8, the controller 7 controls the other one of the decoders $4_1$ and $4_2$ (that is, the decoder $4_2$ in this case) to decode pictures I3, P6, P9, P12 and P15 pertaining to GOP (n−1) immediately preceding GOP (n) and then pictures I3, B1, B2, P6, B4 and B5 pertaining to GOP (n) in accordance with the schedule shown on the first line explained earlier by referring to FIG. 7. It is to be noted that, in the process to decode pictures I3, B1, B2, P6, B4 and B5 pertaining to GOP (n), the processing to decode picture B1 at which the edit point $T_3$ has been set must be completed by a time $t_n$, that is, a point of time picture B1 is to be displayed. Thus, the process to decode picture I3 pertaining to GOP (n−1) must be started before a time leading ahead of the time $t_n$ by a period of time it takes to display seven pictures because the start of the processing to decode picture I3 pertaining to GOP (n−1) leads ahead of the end of the processing to decode picture B1 pertaining to GOP (n) by a period of time it takes to display seven pictures. In the picture-decoding order 235 shown in FIG. 8, a time $t_{n-7}$ is determined to be the time to start the processing to decode I3 pertaining to GOP (n−1).

In the mean time, the decoder $4_1$ ends the decoding process after the processing to decode pictures I3, B1, B2, P6, B4 and B5 pertaining to GOP (m) is completed. When the decoder $4_1$ ends the decoding process, the decoding process in the decoder $4_2$ is going on till picture B5 pertaining to GOP (n) is decoded. After picture B5 pertaining to GOP (n) is decoded, the next picture pertaining to GOP (n), namely, picture P6 decoded earlier than picture B5, is displayed. Then, the edit point $T_4$ is reached as shown in the picture-displaying order 232 of FIG. 8. Thereafter, GOP (m+2) starting at the edit point $T_2$ and subsequent GOPs must be decoded and displayed.

Since picture B1 pertaining to group GOP (m+2) is a picture at which the edit point $T_2$ has been set, as shown in a picture-decoding order 234 of FIG. 8, the controller 7 controls the decoder $4_1$ to decode pictures I3, P6, P9, P12 and P15 pertaining to GOP (m+1) immediately preceding GOP (m+2) and then pictures I3, B1, B2, P6, B4, B5 and so on pertaining to GOP (m+2) in accordance with the schedule shown on the first line explained earlier by referring to FIG. 7.

In the process to decode pictures I3, B1, B2, P6, B4, B5 and so on pertaining to GOP (m+2), the processing to decode picture B1 at which the edit point $T_2$ has been set must be completed by a time $t_n'$, that is, a point of time picture B1 is to be displayed. Thus, the process to decode picture I3 pertaining to GOP (m+1) must be started before a time leading ahead of the time $t_n'$ by a period of time it takes to display seven pictures because the start of the processing to decode picture I3 pertaining to GOP (m+1) leads ahead of the end of the processing to decode picture B1 pertaining to GOP (m+2) by a period of time it takes to display seven pictures. In the picture-decoding order 234 shown in FIG. 8, a time $t_{n-7}'$ is determined to be the time to start the processing to decode I3 pertaining to GOP (m+1).

In the case study shown in FIG. 8, reference symbol $t_n'$ denotes a time at which the display of the first picture B1 pertaining to GOP (m+2) is started and the display of picture P6 pertaining to GOP (n) is ended. Reference symbol $t_{n-i}'$ denotes a time leading ahead of the time $t_n'$ by a period of time it takes to display i frames.

In the case study shown in FIG. 8, the time $t_{n-2}$ is a time at which the processing carried out by the decoder $4_1$ to decode picture B5 pertaining to GOP (m) is ended. On the other hand, the time $t_{n-7}'$ is a time at which the processing carried out by the decoder $4_1$ to decode GOP (m+1) is started. Thus, the decoding process carried out by the decoder $4_1$ does not fail as long as the difference $(t_{n-7}'-t_{n-2})$ is at least 0.

Let the unity (or 1) represent a period of time it takes to display one frame (or one picture). In this case, the times $t_{n-2}$ and $t_{n-7}'$ can be represented by expressions $(t_{n-2})$ and $(t_n'-7)$ respectively. Thus, the difference $(t_{n-7}'-t_{n-2})$ can be represented by an expression $\{(t_n'-7)-(t_n-2)\}=(t_n'-t_n-5)$.

On the other hand, in the case study shown in FIG. 8, the time $t_n$ is a time to start an operation to display picture B1 pertaining to GOP (n) as a picture at which the edit point $T_3$ has been set as an IN point whereas the time $t_n'$ is a time to end an operation to display picture P6 pertaining to GOP (n) as a picture at which the edit point $T_4$ has been set as the OUT point following the IN point. The difference $(t_n'-t_n)$ is the shortest cut duration, which is 6.

Accordingly, the difference $(t_{n-7}'-t_{n-2})$ is 1 so that the decoding process carried out by the decoder $4_1$ does not fail.

Since the disc system shown in FIG. 5 allows the shortest cut duration to be reduced to as small as a period of time it takes to display six frames as described above, the freedom of editing can be improved.

If the period between the edit point $T_3$ set as an IN point and the edit point $T_4$ set as the OUT point following the IN point is shorter than the shortest cut duration, the decoder $4_1$ will fail.

Figure 9:
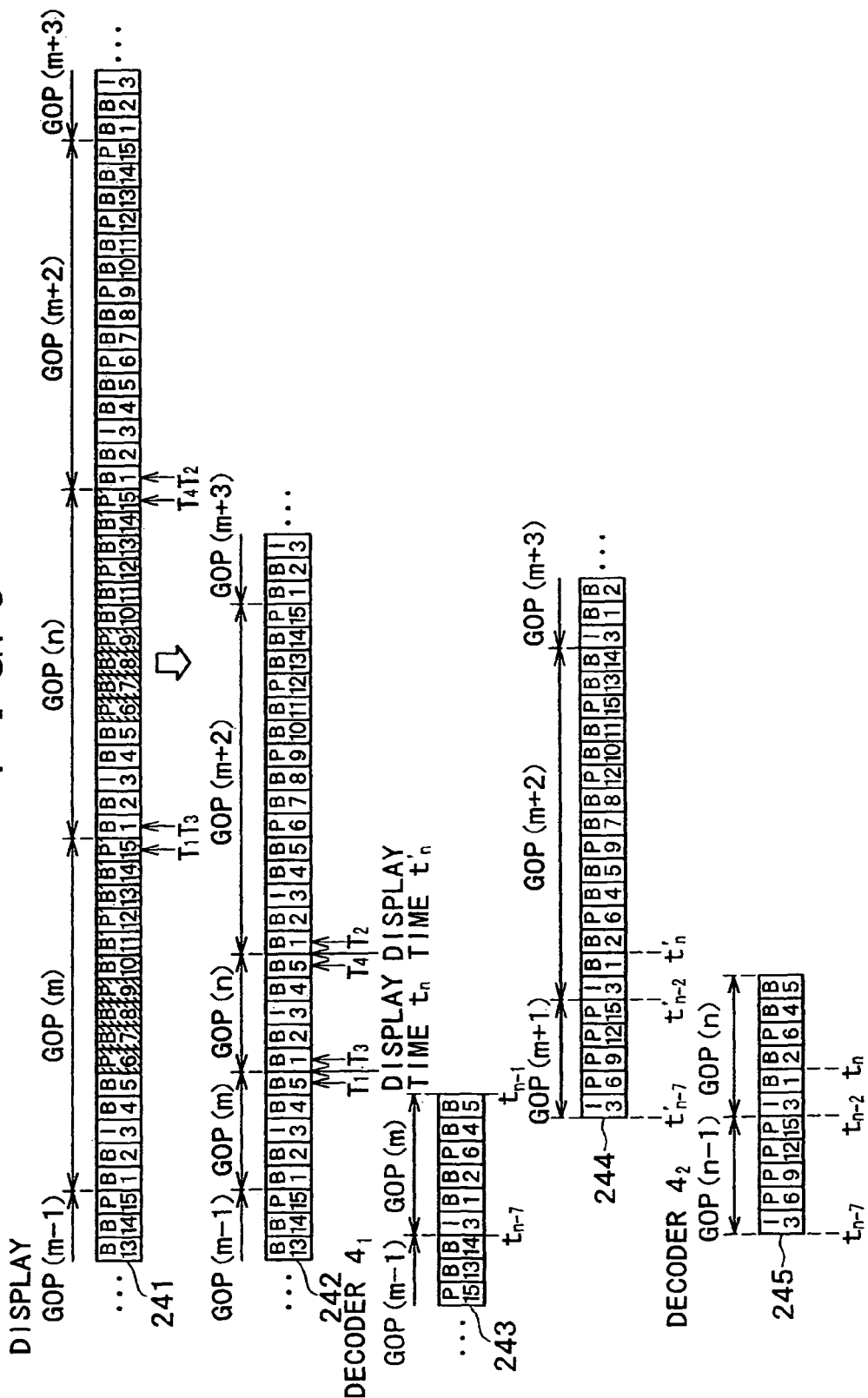
FIG. 9 is an explanatory diagram to be referred to in describing a still further study case in which it is not possible to seamlessly reproduce an MPEG stream.

Now, consider a reproduction process identical with the reproduction process explained above by referring to FIG. 8 except that the picture-displaying order 232 shown in FIG. 8 is changed to a picture-displaying order 242 shown in FIG. 9. In accordance with the picture-displaying order 242, the edit point $T_1$ is set as an OUT point at picture B5 pertaining to GOP (m) instead of being set at picture P6 immediately following picture B5 and the edit point $T_4$ is set as an OUT point at picture B5 pertaining to GOP (n) instead of being set at picture P6 immediately following picture B5. As a result of such a change, the duration between the edit point $T_3$ set at picture B1 pertaining to GOP (n) as an IN point and the edit point $T_4$ set at picture B5 pertaining to GOP (n) as an OUT point is equal to a period of only five frames, which is shorter than the shortest cut duration of six frames.

In this case, in a process to reproduce a result of editing in accordance with the picture-displaying order 242 shown in FIG. 9, a start sequence of GOPs is first reproduced to be followed by a middle sequence of GOPs before finally displaying an end sequence of GOPs. The start sequence of GOPs ends at the edit point $T_1$ set at picture B5 pertaining to GOP (m) as an OUT point. The middle sequence of GOPs begins at the edit point $T_3$ set at picture B1 pertaining to GOP (n) as an IN point and ends at the edit point $T_4$ set at picture B5 pertaining to GOP (n) as an OUT point. The end sequence of GOPs begins at the edit point $T_2$ set at picture B1 pertaining to GOP (m+2) as an IN point.

In order to carry out the process to reproduce a result of editing in accordance with the picture-displaying order 242 as described above, the controller 7 controls one of the two decoders $4_1$ and $4_2$ such as the decoder $4_1$ to decode pictures I3, B1, B2, P6, B4 and B5 to be displayed as pictures pertaining to GOP (m) as shown in a picture-decoding order 243 of FIG. 9. In the case study shown in FIG. 9, picture P6 pertaining to GOP (m) is not displayed. In decoding pictures B4 and B5 pertaining to GOP (m), however, picture P6 is referenced. Thus, picture P6 pertaining to GOP (m) must be decoded first before pictures B4 and B5.

It is to be noted that, in the process to decode pictures I3, B1, B2, P6, B4 and B5 pertaining to GOP (m), the processing to decode picture B5 to be decoded last among the pictures composing GOP (m) must be completed by a time $t_{n-1}$, at which picture B5 is to be displayed. Thus, the process to decode GOP (m) must be started before a time leading ahead of the time $t_{n-1}$ by a period of time it takes to display six pictures, namely, pictures B1 to P6. In the picture-decoding order 243 shown in FIG. 9, a time $t_{n-7}$ is determined to be the time to start the process to decode GOP (m).

In the case study shown in FIG. 9, reference symbol $t_n$ denotes a time at which the display of the first picture B1 pertaining to GOP (n) is started and the display of picture B5 pertaining to GOP (m) is ended.

After the decoder $4_1$ decodes pictures B1 to P6 pertaining to GOP (m) and displays only some of the pictures, namely, pictures B1 to B5, the edit point $T_1$ is reached as shown in the picture-displaying order 242 of FIG. 9. The process then is continued to processing to decode pictures B1 to P6 pertaining to GOP (n) and display only some of the pictures, namely, pictures B1 to B5. This is because picture P6 pertaining to GOP (n) is not displayed. In decoding pictures B4 and B5 pertaining to GOP (n), however, picture P6 pertaining to GOP (n) is referenced. Thus, picture P6 pertaining to GOP (n) must be decoded first before pictures B4 and B5. By the way, the processing to decode and display GOP (n) must start at the edit point $T_3$ and end at the edit point $T_4$.

Since picture B1 pertaining to group GOP (n) is a picture at which the edit point $T_3$ has been set, as shown in a picture-decoding order 245 of FIG. 9, the controller 7 controls the other one of the two decoders $4_1$ and $4_2$ (that is, the decoder $4_2$ in this case) to decode pictures I3, P6, P9, P12 and P15 pertaining to GOP (n−1) immediately preceding GOP (n) and then pictures I3, B1, B2, P6, B4 and B5 pertaining to GOP (n) in accordance with the schedule shown on the first line explained earlier by referring to FIG. 7. It is to be noted that, in the process to decode pictures I3, B1, B2, P6, B4 and B5 pertaining to GOP (n), the processing to decode picture B1 at which the edit point $T_3$ has been set must be completed by a time $t_n$, that is, a point of time picture B1 is to be displayed. Thus, the process to decode picture I3 pertaining to GOP (n−1) must be started before a time leading ahead of the time $t_n$ by a period of time it takes to display seven pictures because the start of the processing to decode picture I3 pertaining to GOP (n−1) leads ahead of the end of the processing to decode picture B1 pertaining to GOP (n) by a period of time it takes to display seven pictures. In the picture-decoding order 245 shown in FIG. 9, a time $t_{n-7}$ is determined to be the time to start the processing to decode I3 pertaining to GOP (n−1).

In the mean time, the decoder $4_1$ ends the decoding process after the processing to decode pictures I3, B1, B2, P6, B4 and B5 pertaining to GOP (m) is completed. When the decoder $4_1$ ends the decoding process, the decoding process in the decoder $4_2$ is going on till picture B5 pertaining to GOP (n) is decoded. After picture B5 pertaining to GOP (n) is displayed, the edit point $T_4$ is reached as shown in the picture-displaying order 242 shown in FIG. 9. Thereafter, GOP (m+2) starting at the edit point $T_2$ and subsequent GOPs must be decoded and displayed.

Since picture B1 pertaining to group GOP (m+2) is a picture at which the edit point $T_2$ has been set, as shown in a picture-decoding order 244 of FIG. 9, the controller 7 controls the decoder $4_1$ to decode pictures I3, P6, P9, P12 and P15 pertaining to GOP (m+1) immediately preceding GOP (m+2) and then pictures I3, B1, B2, P6, B4, B5 and so on pertaining to GOP (m+2) in accordance with the schedule shown on the first line explained earlier by referring to FIG. 7.

In the process to decode pictures I3, B1, B2, P6, B4, B5 and so on pertaining to GOP (m+2), the processing to decode picture B1 at which the edit point $T_2$ has been set must be completed by a time $t_n'$, that is, a point of time picture B1 is to be displayed. Thus, the process to decode picture I3 pertaining to GOP (m+1) must be started before a time leading ahead of the time $t_n'$ by a period of time it takes to display seven pictures because the start of the processing to decode picture I3 pertaining to GOP (m+1) leads ahead of the end of the processing to decode picture B1 pertaining to GOP (m+2) by a period of time it takes to display seven pictures. In the picture-decoding order 244 shown in FIG. 9, a time $t_{n-7}'$ is determined to be the time to start the processing to decode I3 pertaining to GOP (m+1).

In the case study shown in FIG. 9, reference symbol $t_n'$ denotes a time at which the display of the first picture B1 pertaining to GOP (m+2) is started and the display of the last picture B5 pertaining to GOP (n) is ended.

In the picture-decoding orders 243 and 244 shown in FIG. 9, the time $t_{n-1}$ is a time at which the processing carried out by the decoder $4_1$ to decode picture B5 pertaining to GOP (m) is ended. On the other hand, the time $t_{n-7}'$ is a time at which the processing carried out by the decoder $4_1$ to decode GOP (m+1) is started. Thus, the decoding process carried out by the decoder $4_1$ does not fail as long as the difference $(t_{n-7}'-t_{n-1})$ is at least 0.

Let the unity (or 1) represent a period of time it takes to display one frame (or one picture). In this case, the times $t_{n-1}$ and $t_{n-7}'$ can be represented by expressions $(t_n-1)$ and $(t_n'-7)$ respectively. Thus, the difference $(t_{n-7}'-t_{n-1})$ can be represented by an expression $\{(t_n'-7)-(t_n-1)\}=(t_n'-t_n-6)$.

On the other hand, in the case study shown in FIG. 9, the time $t_n$ is a time to start an operation to display picture B1 pertaining to GOP (n) as a picture at which the edit point $T_3$ has been set as an IN point whereas the time $t_n'$ is a time to end an operation to display picture B5 pertaining to GOP (n) as a picture at which the edit point $T_4$ has been set as the OUT point following the IN point. The difference $(t_n'-t_n)$ is the shortest cut duration, which is only 5 smaller than 6.

Accordingly, the difference $(t_{n-7}'-t_{n-1})$ is −1 so that the decoding process carried out by the decoder $4_1$ does fail.

To put it in detail, in the decoding process carried out by the decoder $4_1$, a timing to decode picture B5 pertaining to GOP (m) as shown in the picture-decoding order 243 of FIG. 9 coincides with a timing to decode picture I3 pertaining to GOP (m+1) as shown in the picture-decoding order 244 of the same figure. As a result, a seamless reproduction operation cannot be carried out.

Figure 10:
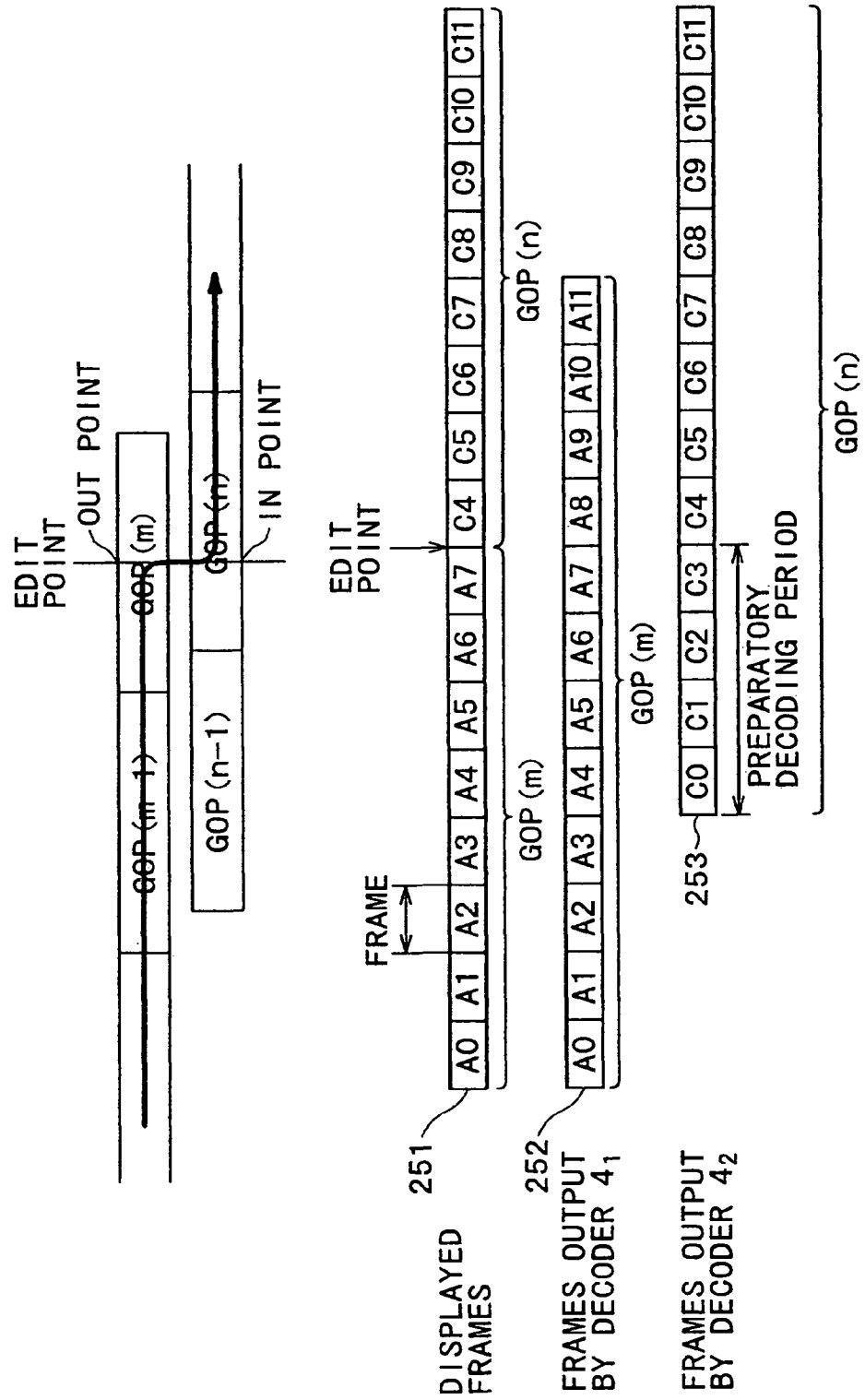
FIG. 10 is an explanatory diagram to be referred to in describing preparatorily decoded pictures and preparatory decoding times.

Next, consider a case in which an edit point is set at a picture pertaining to GOP (m) as an OUT point and another edit point is set at a picture pertaining to GOP (n) as an IN point as shown in FIG. 10. In this case, after displaying frame A7, the operation to display frame C4 shown in FIG. 10 must be started as shown in a picture-displaying order 251 of FIG. 10. Frame A7 pertaining to GOP (m) as shown in FIG. 10 is the picture at which the aforementioned OUT point is set. On the other hand, frame C4 pertaining to GOP (n) as shown in FIG. 10 is the picture at which the aforementioned IN point is set.

Reference numeral 252 shown in FIG. 10 denotes a sequence of pictures output by the decoder $4_1$, which is employed in the disc system shown in FIG. 5, as a result of decoding. On the other hand, reference numeral 253 shown in FIG. 10 denotes a sequence of pictures output by the decoder $4_2$ as a result of decoding. Thus, the switcher 5 selects the pictures output by the decoder $4_1$, ending with the picture at which the OUT point has been set. Thereafter, the switcher 5 selects the pictures output by the decoder $4_2$, starting with the picture at which the IN point has been set.

The decoder $4_2$ must thus decode and output the pictures to be selected by the switcher 5, starting with frame C4 at which the IN point has been set. In order for the decoder $4_2$ to decode the pictures to be selected by the switcher 5, fewest possible specific pictures, which are referenced in decoding the pictures to be selected by the switcher 5 even though the specific pictures themselves are not to be displayed, must have been decoded before the processing to decode frame C4 serving as an IN-point picture is decoded as described earlier.

Let the fewest possible specific pictures, which are referenced in decoding the picture to be selected by the switcher 5 even though the specific pictures themselves are not to be displayed, be referred to as preparatorily decoded pictures. Also, let a period of time it takes to decode the preparatorily decoded pictures be referred to as a preparatory decoding time. In the processing to set schedules at the step S2 of the flowchart shown in FIG. 6, the controller 7 carries out preparatory-picture computation processing to determine the preparatorily decoded pictures and find the preparatory decoding time. Then, on the basis of the preparatorily decoded pictures and the preparatory decoding time, the controller 7 sets schedules of picture sequences to be decoded by the decoders $4_1$ and $4_2$.

The preparatory-picture computation processing carried out by the controller 7 is explained by referring to a flowchart shown in FIG. 11 as follows.

In the preparatory-picture computation processing, the controller 7 picks one of edit points that are each described on the edit-point list as an IN point as an STP. An STP is an IN point that has not been processed before in the preparatory-picture computation processing and must thus be chosen as an object of processing. At a step S11, the controller 7 forms a judgment as to whether or not the specific GOP (n) picture, at which the picked observed edit point STP has been set, is picture B1 or B2.

If the outcome of the judgment formed at the step S11 indicates that the specific picture, at which the picked observed edit point STP has been set, is picture B1 or B2, the flow of the processing goes on to a step S12 at which the controller 7 determines pictures I3, P6, P9, P12 and P15 pertaining to GOP (n−1) immediately preceding GOP (n) to be the preparatorily decoded pictures for the observed edit point STP. Then, the flow of the processing goes on to a step S13.

The controller 7 determines pictures I3, P6, P9, P12 and P15 pertaining to GOP (n−1) immediately preceding GOP (n) to be the preparatorily decoded pictures for the observed edit point STP as follows.

The controller 7 searches pictures along the sequence of displayed pictures starting with the picture, at which the observed edit point STP has been set, in an upstream direction for a first I picture. Then, the controller 7 makes a list of I and P pictures on the sequence in the downstream direction, between the first I picture and the picture, at which the observed edit point STP has been set. The list including the first I picture but excluding the picture, at which the observed edit point STP has been set, is a list of the preparatorily decoded pictures.

At the step S13, the controller 7 computes the picture count of the list of the preparatorily decoded pictures, namely, pictures I3, P6, P9, P12 and P15 which have been determined at the step S12. Since the picture count is five, which is the number of pictures on the list of preparatorily decoded pictures I3, P6, P9, P12 ad P15, the controller 7 finds out that the preparatory decoding time is equal to a period of time it takes to decode five frames. Then, the flow of the processing goes back to the step S11 to repeat the processing described above. To be more specific, at this step S11, the controller 7 picks one of edit points that are each described on the edit-point list as an IN point as a new edit point STP not processed yet in the preparatory-picture computation processing.

If the outcome of the judgment formed at the step S11 indicates that the specific picture, at which the picked observed edit point STP has been set, is neither picture B1 nor B2, on the other hand, the flow of the processing goes on to a step S14. At the step S14, the controller 7 forms a judgment as to whether or not the specific GOP (n) picture, at which the picked observed edit point STP has been set, is picture I3.

If the outcome of the judgment formed at the step S14 indicates that the specific GOP (n) picture, at which the picked observed edit point STP has been set, is picture I3, the flow of the processing goes on to a step S15 at which the controller 7 confirms that this specific picture pertaining to GOP (n) does not have pictures to be preparatorily decoded for this specific picture. In this case, the flow of the processing goes on to a step S16. At the step S16, the controller 7 computes the picture count of the list of the preparatorily decoded pictures. In this case, the picture count is zero. Since the picture count is zero, which is the number of pictures on the list of preparatorily decoded pictures, the controller 7 finds out that the preparatory decoding time is equal to a period of time it takes to decode 0 frames. That is to say, the preparatory decoding time is 0. Then, the flow of the processing goes back to the step S11 to repeat the processing described above. To be more specific, at this step S11, the controller 7 picks one of edit points that are each described on the edit-point list as an IN point as a new edit point STP not processed yet in the preparatory-picture computation processing.

If the outcome of the judgment formed at the step S14 indicates that the specific GOP (n) picture, at which the picked observed edit point STP has been set, is not picture I3, on the other hand, the flow of the processing goes on to a step S17 at which the controller 7 forms a judgment as to whether or not the specific GOP (n) picture, at which the picked observed edit point STP has been set, is picture B4, B5 or P6.

If the outcome of the judgment formed at the step S17 indicates that the specific GOP (n) picture, at which the picked observed edit point STP has been set, is picture B4, B5 or P6, the flow of the processing goes on to a step S18 at which the controller 7 determines picture I3 pertaining to GOP (n) to be the preparatorily decoded picture for the observed edit point STP. Then, the flow of the processing goes on to a step S19. At the step S19, the controller 7 computes the picture count of the list of the preparatorily decoded pictures. In this case, the picture count is one. Since the picture count is one, which is the number of pictures on the list of preparatorily decoded picture I3, the controller 7 finds out that the preparatory decoding time is equal to a period of time it takes to decode one frame. Then, the flow of the processing goes back to the step S11 to repeat the processing described above. To be more specific, at this step S11, the controller 7 picks one of edit points that are each described on the edit-point list as an IN point as a new edit point STP not processed yet in the preparatory-picture computation processing.

If the outcome of the judgment formed at the step S17 indicates that the specific GOP (n) picture, at which the picked observed edit point STP has been set, is not picture B4, B5 or P6, on the other hand, the flow of the processing goes on to a step S20 at which the controller 7 forms a judgment as to whether or not the specific GOP (n) picture, at which the picked observed edit point STP has been set, is picture B7, B8 or P9.

If the outcome of the judgment formed at the step S20 indicates that the specific GOP (n) picture, at which the picked observed edit point STP has been set, is picture B7, B8 or P9, the flow of the processing goes on to a step S21 at which the controller 7 determines pictures I3 and P6 pertaining to GOP (n) to be the preparatorily decoded pictures for the observed edit point STP. Then, the flow of the processing goes on to a step S22. At the step S22, the controller 7 computes the picture count of the list of the preparatorily decoded pictures. In this case, the picture count is two. Since the picture count is two, which is the number of pictures on the list of preparatorily decoded pictures I3 and P6, the controller 7 finds out that the preparatory decoding time is equal to a period of time it takes to decode two frames. Then, the flow of the processing goes back to the step S11 to repeat the processing described above. To be more specific, at this step S11, the controller 7 picks one of edit points that are each described on the edit-point list as an IN point as a new edit point STP not processed yet in the preparatory-picture computation processing.

If the outcome of the judgment formed at the step S20 indicates that the specific GOP (n) picture, at which the picked observed edit point STP has been set, is not picture B7, B8 or P9, on the other hand, the flow of the processing goes on to a step S23 at which the controller 7 forms a judgment as to whether or not the specific GOP (n) picture, at which the picked observed edit point STP has been set, is picture B10, B11 or P12.

If the outcome of the judgment formed at the step S23 indicates that the specific GOP (n) picture, at which the picked observed edit point STP has been set, is picture B10, B11 or P12, the flow of the processing goes on to a step S24 at which the controller 7 determines pictures I3, P6 and P9 pertaining to GOP (n) to be the preparatorily decoded pictures for the observed edit point STP. Then, the flow of the processing goes on to a step S25. At the step S25, the controller 7 computes the picture count of the list of the preparatorily decoded pictures. In this case, the picture count is three. Since the picture count is three, which is the number of pictures on the list of preparatorily decoded pictures I3, P6 and P9, the controller 7 finds out that the preparatory decoding time is equal to a period of time it takes to decode three frames. Then, the flow of the processing goes back to the step S11 to repeat the processing described above. To be more specific, at this step S11, the controller 7 picks one of edit points that are each described on the edit-point list as an IN point as a new edit point STP not processed yet in the preparatory-picture computation processing.

If the outcome of the judgment formed at the step S23 indicates that the specific GOP (n) picture, at which the picked observed edit point STP has been set, is not picture B10, B11 or P12, on the other hand, the flow of the processing goes on to a step S26 at which the controller 7 determines pictures I3, P6, P9 and P12 pertaining to GOP (n) to be the preparatorily decoded pictures for the observed edit point STP. Then, the flow of the processing goes on to a step S27. At the step S27, the controller 7 computes the picture count of the list of the preparatorily decoded pictures. In this case, the picture count is four. Since the picture count is four, which is the number of pictures on the list of preparatorily decoded pictures I3, P6, P9 and P12, the controller 7 finds out that the preparatory decoding time is equal to a period of time it takes to decode four frames. Then, the flow of the processing goes back to the step S11 to repeat the processing described above. To be more specific, at this step S11, the controller 7 picks one of edit points that are each described on the edit-point list as an IN point as a new edit point STP not processed yet in the preparatory-picture computation processing.

Figure 11:
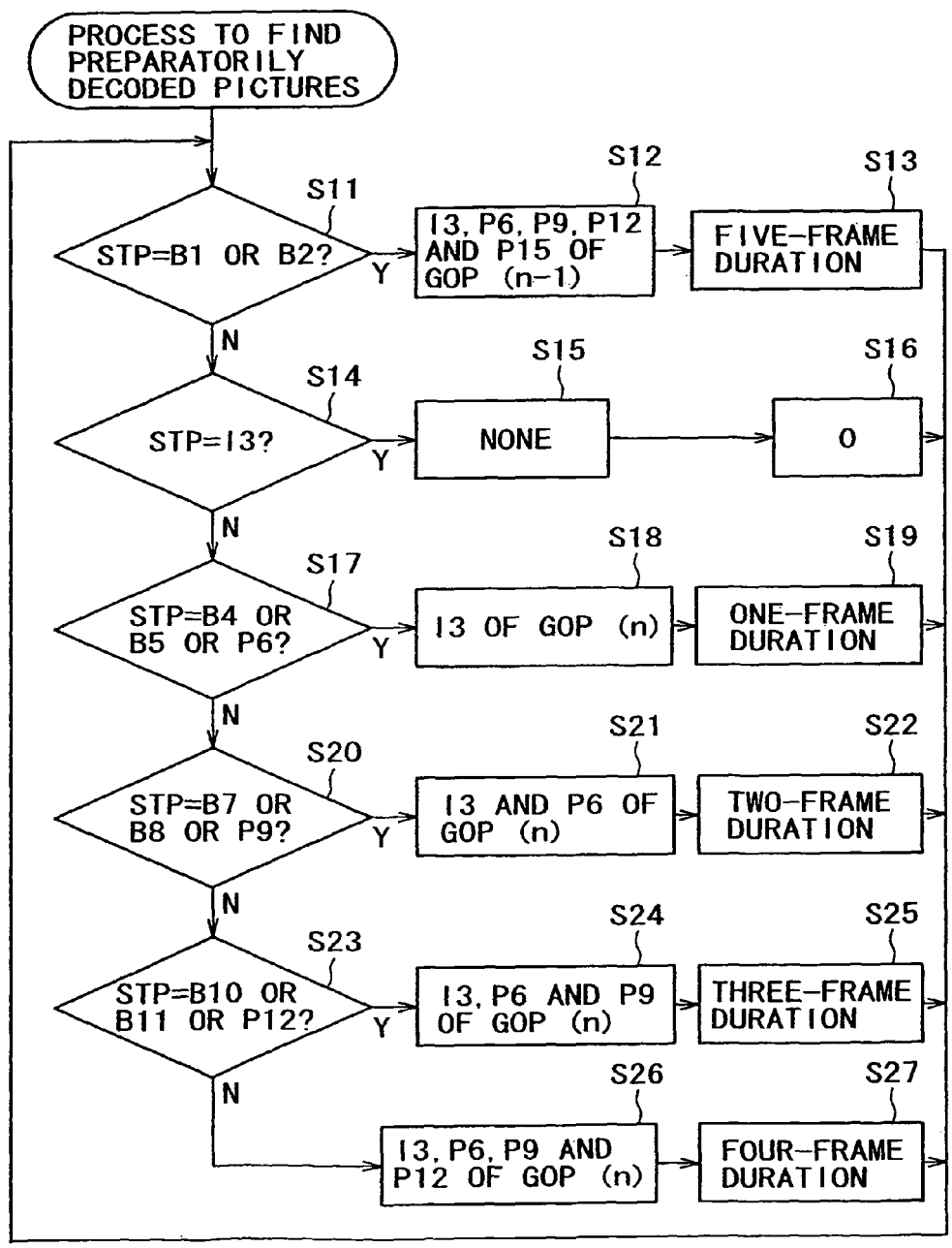
FIG. 11 shows a flowchart to be referred to in explaining a process to determine preparatorily decoded pictures.

It is to be noted that the execution of the preparatory-picture computation processing represented by the flowchart shown in FIG. 11 is ended when the controller 7 no longer finds one of edit points that are each described on the edit-point list as an IN point as a new edit point STP not processed yet in the preparatory-picture computation processing.

Figure 12:
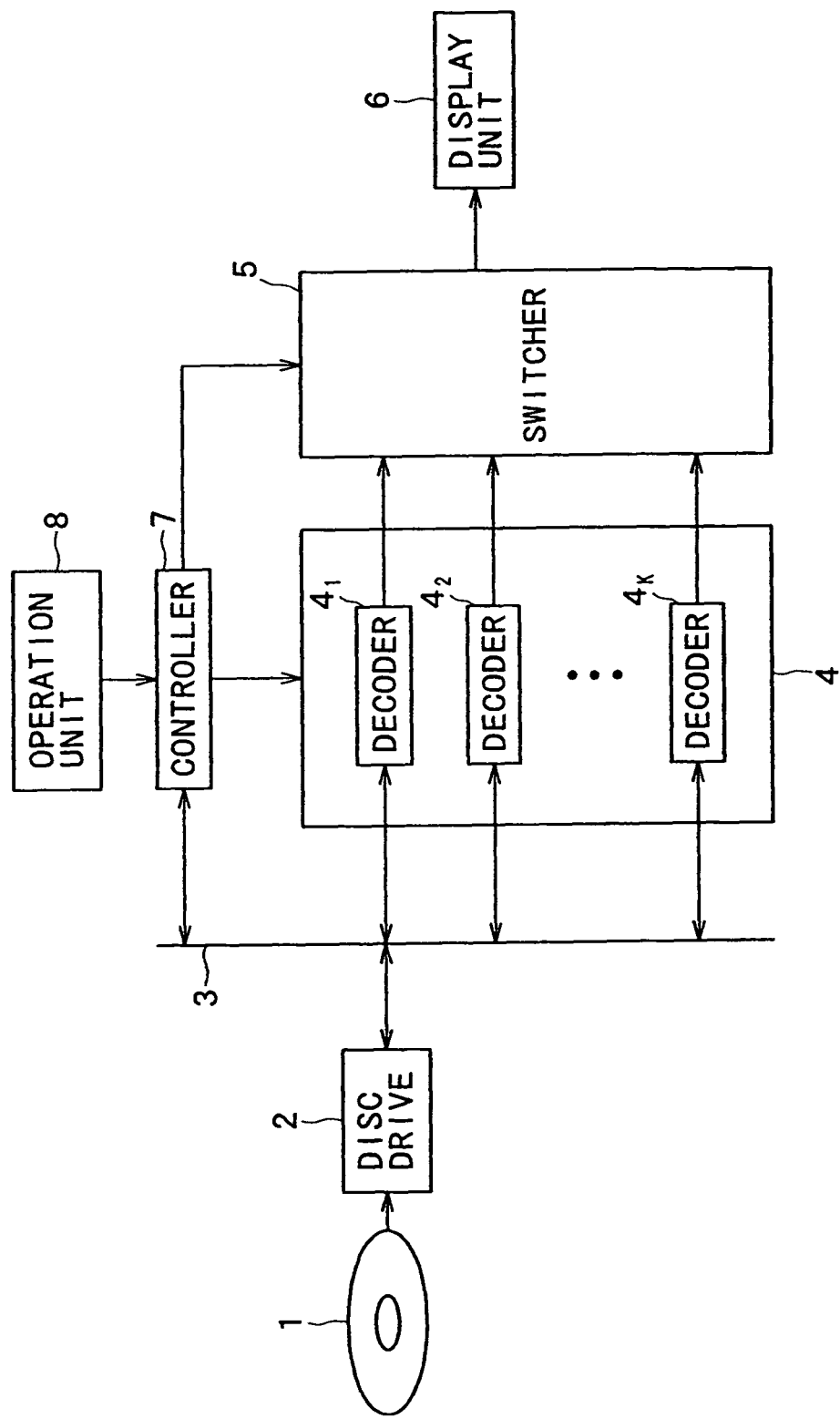
FIG. 12 is a block diagram showing a typical configuration of another embodiment implementing a disc system to which the present invention is applied.

FIG. 12 is a diagram showing a typical configuration of another embodiment implementing the disc system, to which the present invention is applied. Components of the other embodiment, which are identical with their respective counterparts employed in the embodiment shown in FIG. 5, are denoted by the same reference numerals as the counterparts. Explanations of the components identical with their counterparts are omitted if unnecessary. In the case of the disc system shown in FIG. 2, the number of decoders employed in the decoding unit 4 is not limited to two, namely, the decoders $4_1$ and $4_2$. Instead, the decoding unit 4 includes k decoders $4_1$, $4_2$, - - - and $4_k$. The rest is the same as the embodiment shown in FIG. 5. It is to be noted that, typically, the decoders $4_k$ (where k=1, 2, - - - and K) shown in FIG. 12 each have a one-time decoding process speed as is the case with the decoders $4_1$ and $4_2$ shown in FIG. 5.

The disc system shown in FIG. 5 is identical with the disc system shown in FIG. 12 for K=2. As described above, the shortest cut duration of the embodiment shown in FIG. 5 is equal to the period of time it takes to display six frames. In the case of the embodiment shown in FIG. 12, by increasing the number of decoders $4_1$ to $4_k$ composing the decoding unit 4, that is, by setting K at a number greater than 2, the shortest cut duration can be made shorter than the period of time it takes to display six frames.

To put it concretely, for example, K is set at 3, that is, the decoding unit 4 includes three decoders $4_1$, $4_2$ and $4_3$. In this case, the shortest cut duration can be reduced to a period of time it takes to display three frames.

Figure 13:
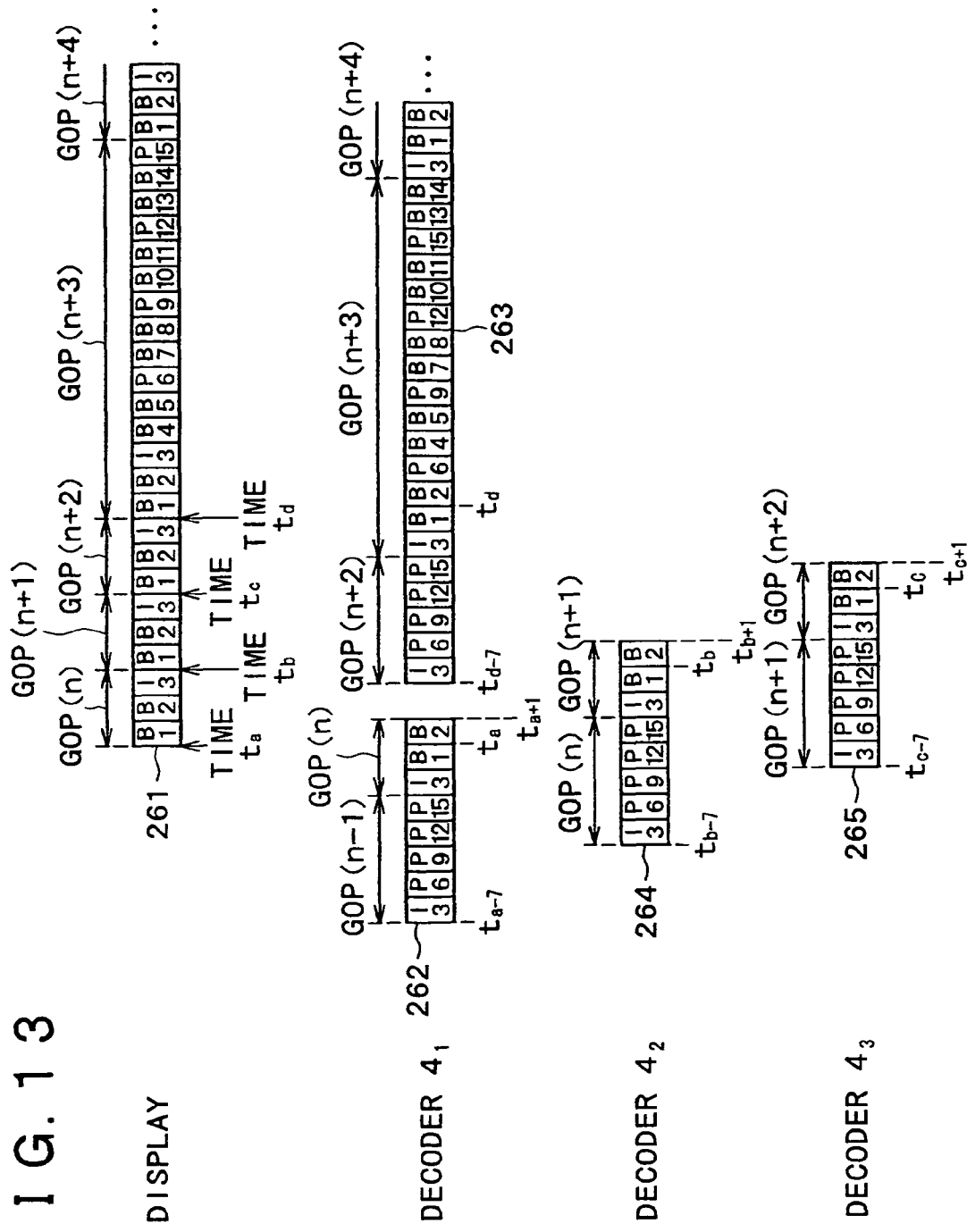
FIG. 13 is an explanatory diagram to be referred to in describing a reproduction process using a decoding unit 4 comprising decoders $4_1$ to $4_3$.

Now, assume that an editing process has been carried out to display pictures B1, B2 and I3 pertaining to GOP (n) beginning at a time $t_a$, then pictures B1, B2 and I3 pertaining to GOP (n+1) beginning at a time $t_b$, then pictures B1, B2 and I3 pertaining to GOP (n+2) beginning at a time $t_c$ and, finally, pictures pertaining to GOP (n+3) and subsequent GOPs beginning at a time $t_d$ as shown in a picture-displaying order 261 of FIG. 13. In this case, as IN points, edit points are set at picture B1 pertaining to GOP (n) to be displayed at the time $t_a$, picture B1 pertaining to GOP (n+1) to be displayed at the time $t_b$, picture B1 pertaining to GOP (n+2) to be displayed at the time $t_c$ and picture B1 pertaining to GOP (n+3) to be displayed at the time $t_d$.

It is to be noted that, in this case, the time $t_b$ lags behind the time $t_a$ by a period of time it takes to display three frames, the time $t_c$ lags behind the time $t_b$ by a period of time it takes to display three frames and the time $t_d$ lags behind the time $t_c$ by a period of time it takes to display three frames. Thus, in the picture-displaying order 261 shown in FIG. 13, the shortest cut duration is a period of time it takes to display the three frames between the times $t_a$ and $t_b$ (or the three frames between the times $t_b$ and $t_c$ or the three frames between the times $t_c$ and $t_d$).

In this case, first of all, pictures B1, B2 and I3 pertaining to GOP (n) must be displayed beginning at the time $t_a$ with picture B1 at which an edit point has been set as an IN point. Thus, as described earlier, the controller 7 drives a specific one of the three decoders $4_1$ to $4_3$ to decode pictures I3, P6, P9, P12 and P15 pertaining to GOP (n-1) immediately preceding GOP (n) and, then, pictures I3, B1 and B2 pertaining to GOP (n) in accordance with the schedule shown on the first line of FIG. 7 as shown in a picture-decoding order 262 of FIG. 13. The specific decoder is a decoder that is not carrying out a decoding process at the present time. For example, the decoder $4_1$ is selected as the specific decoder.

It is to be noted that, in the process to decode pictures I3, B1 and B2 pertaining to GOP (n), the processing to decode picture B1, at which an edit point has been set as an IN point, must be completed by the display time $t_a$ of picture B1. Thus, the process to decode picture I3 pertaining to GOP (n-1) and leading ahead of picture B1 pertaining to GOP (n) by seven pictures must be started before a time leading ahead of the time $t_a$ by a period of time it takes to display seven pictures. In the picture-decoding order 262 shown in FIG. 13, a time $t_{a-7}$ is determined to be the time to start the process to decode picture I3 pertaining to GOP (n-1). Thus, the process to decode picture I3 pertaining to GOP (n-1) is started at the time $t_{a-7}$ whereas the process to decode picture B2 pertaining to GOP (n) is completed by a time $t_{a+1}$ lagging behind the time $t_a$ by a period of time it takes to display one picture. Picture B2 pertaining to GOP (n) is a picture to be decoded last among pictures I3, B1 and B2 pertaining to GOP (n).

After the decoder $4_1$ displays decoded pictures B1, B2 and I3 pertaining to GOP (n), the time $t_b$ is reached as shown in the picture-displaying order 261 of FIG. 13. Thus, pictures B1, B2 and I3 pertaining to GOP (n+1), which are to be displayed starting at the time $t_b$, must be decoded and displayed since an edit point has been set at picture B1 pertaining to GOP (n+1) as an IN point.

For the reason described above, as described earlier, the controller 7 drives a specific one of the three decoders $4_1$ to $4_3$ to decode pictures I3, P6, P9, P12 and P15 pertaining to GOP (n) immediately preceding GOP (n+1) and, then, pictures I3, B1 and B2 pertaining to GOP (n) in accordance with the schedule shown on the first line of FIG. 7 as shown in a picture-decoding order 264 of FIG. 13. The specific decoder is a decoder that is not carrying out a decoding process at the present time. For example, the decoder $4_2$ is selected as the specific decoder.

It is to be noted that, in the process to decode pictures I3, B1 and B2 pertaining to GOP (n+1), the processing to decode picture B1, at which an edit point has been set as an IN point, must be completed by the display time $t_b$ of picture B1. Thus, the process to decode picture I3 pertaining to GOP (n) and leading ahead of picture B1 pertaining to GOP (n+1) by seven pictures must be started before a time leading ahead of the time $t_b$ by a period of time it takes to display seven pictures. In the picture-decoding order 264 shown in FIG. 13, a time $t_{b-7}$ is determined to be the time to start the process to decode picture I3 pertaining to GOP (n). Thus, the process to decode picture I3 pertaining to GOP (n) is started at the time $t_{b-7}$ whereas the process to decode picture B2 pertaining to GOP (n+1) is completed by a time $t_{b+1}$ lagging behind the time $t_b$ by a period of time it takes to display one picture. Picture B2 pertaining to GOP (n+1) is a picture to be decoded last among pictures I3, B1 and B2 pertaining to GOP (n+1).

After the decoder $4_2$ displays decoded pictures B1, B2 and I3 pertaining to GOP (n+1), the time $t_c$ is reached as shown in the picture-displaying order 261 of FIG. 13. Thus, pictures B1, B2 and I3 pertaining to GOP (n+2), which are to be displayed starting at the time $t_c$, must be decoded and displayed since an edit point has been set at picture B1 pertaining to GOP (n+2) as an IN point.

For the reason described above, as described earlier, the controller 7 drives a specific one of the three decoders $4_1$ to $4_3$ to decode pictures I3, P6, P9, P12 and P15 pertaining to GOP (n+1) immediately preceding GOP (n+2) and, then, pictures I3, B1 and B2 pertaining to GOP (n+2) in accordance with the schedule shown on the first line of FIG. 7 as shown in a picture-decoding order 265 of FIG. 13. The specific decoder is a decoder that is not carrying out a decoding process at the present time. In this case, the only remaining decoder $4_3$ is selected as the specific decoder.

It is to be noted that, in the process to decode pictures I3, B1 and B2 pertaining to GOP (n+2), the processing to decode picture B1, at which an edit point has been set as an IN point, must be completed by the display time $t_c$ of picture B1. Thus, the process to decode picture I3 pertaining to GOP (n+1) and leading ahead of picture B1 pertaining to GOP (n+2) by seven pictures must be started before a time leading ahead of the time $t_c$ by a period of time it takes to display seven pictures. In the picture-decoding order 265 shown in FIG. 13, a time $t_{c-7}$ is determined to be the time to start the process to decode picture I3 pertaining to GOP (n+1). Thus, the process to decode picture I3 pertaining to GOP (n+1) is started at the time $t_{c-7}$ whereas the process to decode picture B2 pertaining to GOP (n+2) is completed by a time $t_{c+1}$ lagging behind the time $t_c$ by a period of time it takes to display one picture. Picture B2 pertaining to GOP (n+2) is a picture to be decoded last among pictures I3, B1 and B2 pertaining to GOP (n+2).

After the decoder $4_3$ displays decoded pictures B1, B2 and I3 pertaining to GOP (n+2), the time $t_d$ is reached as shown in the picture-displaying order 261 of FIG. 13. Thus, pictures B1, B2 and I3 pertaining to GOP (n+3), which are to be displayed starting at the time td, and the subsequent pictures, must be decoded and displayed since an edit point has been set at picture B1 pertaining to GOP (n+3) as an IN point.

For the reason described above, as described earlier, the controller 7 drives a specific one of the 3 decoders $4_1$ to $4_3$ to decode pictures I3, P6, P9, P12 and P15 pertaining to GOP (n+2) immediately preceding GOP (n+3) in order to decode picture B1 pertaining to GOP (n+3) in accordance with the schedule shown on the first line of FIG. 7 as shown in a picture-decoding order 263 of FIG. 13.

It is to be noted that, in the process to decode pictures pertaining to GOP (n+3), the processing to decode picture B1, at which an edit point has been set as an IN point, must be completed by the display time $t_d$ of picture B1. Thus, the process to decode picture I3 pertaining to GOP (n+2) and leading ahead of picture B1 pertaining to GOP (n+3) by seven pictures must be started before a time leading ahead of the time $t_d$ by a period of time it takes to display seven pictures. In the picture-decoding order 263 shown in FIG. 13, a time $t_{d-7}$ is determined to be the time to start the process to decode picture I3 pertaining to GOP (n+2).

By the way, with the timing of the time $t_{d-7}$, while the decoders $4_2$ and $4_3$ are each still carrying out a decoding process as is obvious from respectively the picture-decoding orders 264 and 265 shown in FIG. 13, the decoder $4_1$ has completed its decoding process at the time $t_{a+1}$ leading ahead of the time $t_{d-7}$ by a period of time it takes to display one picture as shown in the picture-decoding orders 262 and 263 of FIG. 13. Thus, at the time $t_{d-7}$, the decoder $4_1$ is available for a decoding process. For this reason, the controller 7 drives the decoder $4_1$ to decode pictures I3, P6, P9, P12 and P15 pertaining to GOP (n+2) and, then, pictures I3, B1 and B2 pertaining to GOP (n+3).

As is obvious from the above description, if the shortest cut duration is equal to a period of time it takes to display three frames, there is no case in which the decoders $4_1$, $4_2$ and $4_3$ must decode a plurality of pictures at the same time.

Thus, by designing the decoding unit 4 to include the three decoders $4_1$, $4_2$ and $4_3$, the shortest cut duration can be reduced to a period of time it takes to display three frames. That is to say, the embodiment employing three decoders allows the shortest cut duration to be reduced to a period shorter than the embodiment wherein the decoding unit 4 includes only the two decoders $4_1$ and $4_2$ as shown in FIG. 5. As a result, the freedom of editing can be further improved.

The following description explains an implementation of the embodiment realizing the disc system as shown in FIG. 12 wherein the shortest cut duration can be further reduced to a period of time it takes to display two frames by designing the decoding unit 4 to include four decoders $4_1$, $4_2$, $4_3$ and $4_4$, that is, by setting the value of K at 4.

Figure 14:
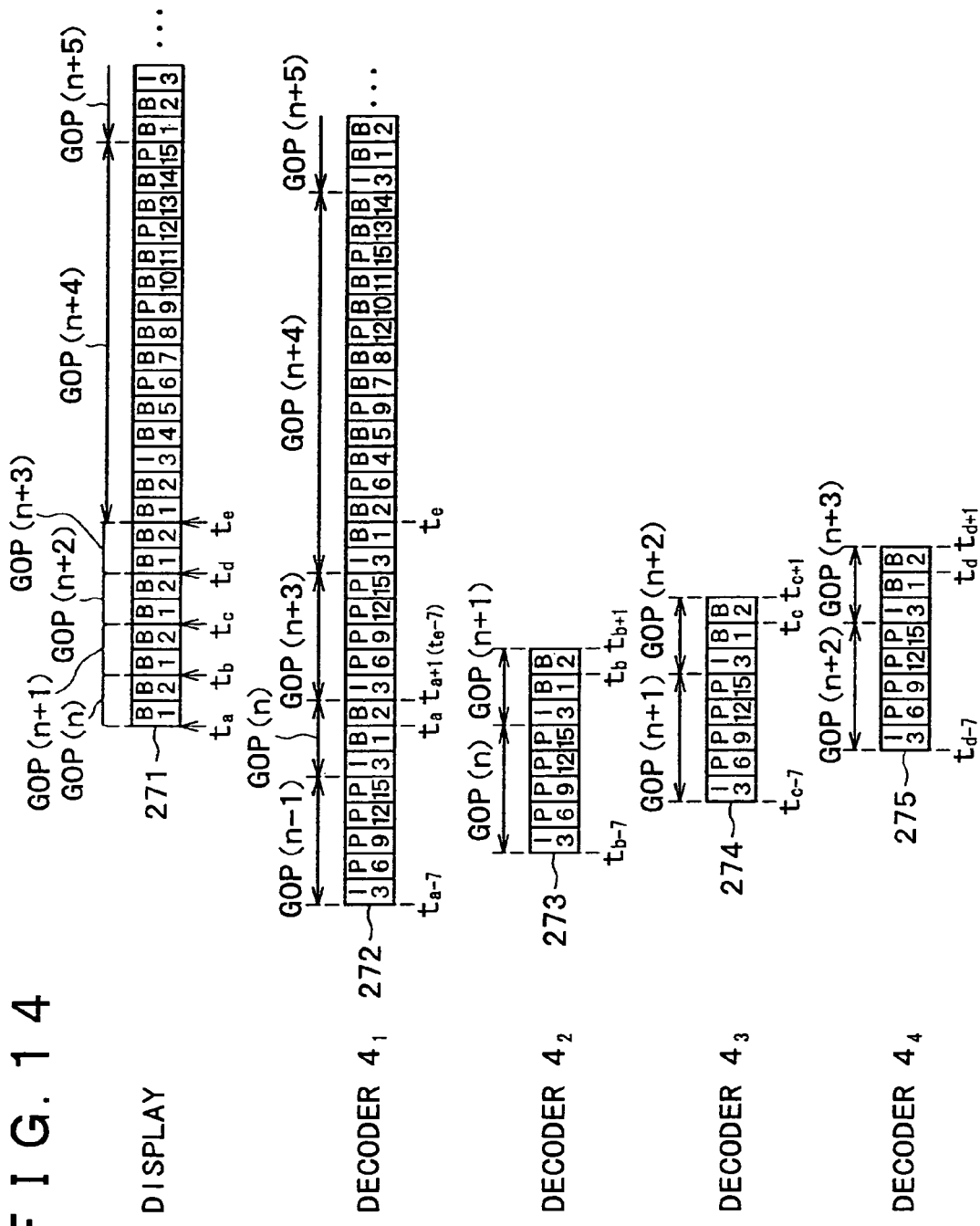
FIG. 14 is an explanatory diagram to be referred to in describing a reproduction process using a decoding unit 4 comprising decoders $4_1$ to $4_4$.

To put it in detail, now, assume that an editing process has been carried out to display pictures B1 and B2 pertaining to GOP (n) beginning at a time $t_a$, then pictures B1 and B2 pertaining to GOP (n+1) beginning at a time $t_b$, then pictures B1 and B2 pertaining to GOP (n+2) beginning at a time $t_c$, then pictures B1 and B2 pertaining to GOP (n+3) beginning at a time $t_d$ and, finally, pictures pertaining to GOP (n+4) and subsequent GOPs beginning at a time $t_e$ as shown in a picture-displaying order 271 of FIG. 14. In this case, as IN points, edit points are set at picture B1 pertaining to GOP (n) to be displayed at the time $t_a$, picture B1 pertaining to GOP (n+1) to be displayed at the time $t_b$, picture B1 pertaining to GOP (n+2) to be displayed at the time $t_c$, picture B1 pertaining to GOP (n+3) to be displayed at the time $t_d$ and picture B1 pertaining to GOP (n+4) to be displayed at the time $t_e$.

It is to be noted that, in this case, the time $t_b$ lags behind the time $t_a$ by a period of time it takes to display two frames, the time $t_c$ lags behind the time $t_b$ by a period of time it takes to display two frames, the time $t_d$ lags behind the time $t_c$ by a period of time it takes to display two frames and the time $t_e$ lags behind the time $t_d$ by a period of time it takes to display two frames. Thus, in the picture-displaying order 271 shown in FIG. 14, the shortest cut duration is a period of time it takes to display the two frames between the times $t_a$ and $t_b$ (or the two frames between the times $t_b$ and $t_c$, the two frames between the times $t_c$ and $t_d$ or the two frames between the times $t_d$ and $t_e$).

In this case, first of all, pictures B1 and B2 pertaining to GOP (n) must be displayed beginning at the time $t_a$ with picture B1 at which an edit point has been set as an IN point. Thus, as described earlier, the controller 7 drives a specific one of the four decoders $4_1$ to $4_4$ to decode pictures I3, P6, P9, P12 and P15 pertaining to GOP (n−1) immediately preceding GOP (n) and, then, pictures I3, B1 and B2 pertaining to GOP (n) in accordance with the schedule shown on the first line of FIG. 7 as shown in a picture-decoding order 272 of FIG. 14. Even though picture I3 pertaining to GOP (n) is not to be displayed, picture I3 is referenced in decoding pictures B1 and B2 pertaining to the same group. Thus, picture I3 pertaining to GOP (n) must also be decoded. The specific decoder is a decoder that is not carrying out a decoding process at the present time. For example, the decoder $4_1$ is selected as the specific decoder.

It is to be noted that, in the process to decode pictures I3, B1 and B2 pertaining to GOP (n), the processing to decode picture B1, at which an edit point has been set as an IN point, must be completed by the display time $t_a$ of picture B1. Thus, the process to decode picture I3 pertaining to GOP (n−1) and leading ahead of picture B1 pertaining to GOP (n) by seven pictures must be started before a time leading ahead of the time $t_a$ by a period of time it takes to display seven pictures. In the picture-decoding order 272 shown in FIG. 14, a time $t_{a-7}$ is determined to be the time to start the process to decode picture I3 pertaining to GOP (n−1). Thus, the process to decode picture I3 pertaining to GOP (n−1) is started at the time $t_{a-7}$ whereas the process to decode picture B2 pertaining to GOP (n) is completed by a time $t_{a+1}$ lagging behind the time $t_a$ by a period of time it takes to display one picture. Picture B2 pertaining to GOP (n) is a picture to be decoded last among pictures I3, B1 and B2 pertaining to GOP (n).

After the decoder $4_1$ decodes pictures I3, B1, and B2 pertaining to GOP (n) and displays only pictures B1 and B2 pertaining to the same group, the time $t_b$ is reached as shown in the picture-displaying order 271 of FIG. 14. Thus, pictures B1, B2 and I3 pertaining to GOP (n+1) must be decoded in order to display pictures B1 and B2 pertaining to the same group, starting at the display time $t_b$ of picture B1 pertaining to the same group since an edit point has been set at picture B1 as an IN point. Even though picture I3 pertaining to GOP (n+1) is not to be displayed, picture I3 is referenced in decoding pictures B1 and B2 pertaining to the same group. Thus, picture I3 pertaining to GOP (n+1) must also be decoded.

For the reason described above, as described earlier, the controller 7 drives a specific one of the four decoders $4_1$ to $4_4$ to decode pictures I3, P6, P9, P12 and P15 pertaining to GOP (n) immediately preceding GOP (n+1) and, then, pictures I3, B1 and B2 pertaining to GOP (n+1) in accordance with the schedule shown on the first line of FIG. 7 as shown in a picture-decoding order 273 of FIG. 14. The specific decoder is a decoder that is not carrying out a decoding process at the present time. For example, the decoder $4_2$ is selected as the specific decoder.

It is to be noted that, in the process to decode pictures I3, B1 and B2 pertaining to GOP (n+1), the processing to decode picture B1, at which an edit point has been set as an IN point, must be completed by the display time $t_b$ of picture B1. Thus, the process to decode picture I3 pertaining to GOP (n) and leading ahead of picture B1 pertaining to GOP (n+1) by seven pictures must be started before a time leading ahead of the time $t_b$ by a period of time it takes to display seven pictures. In the picture-decoding order 274 shown in FIG. 14, a time $t_{b-7}$ is determined to be the time to start the process to decode picture I3 pertaining to GOP (n). Thus, the process to decode picture I3 pertaining to GOP (n) is started at the time $t_{b-7}$ whereas the process to decode picture B2 pertaining to GOP (n+1) is completed by a time $t_{b+1}$ lagging behind the time $t_b$ by a period of time it takes to display one picture. Picture B2 pertaining to GOP (n+1) is a picture to be decoded last among pictures I3, B1 and B2 pertaining to GOP (n+1).

After the decoder $4_2$ decodes pictures I3, B1 and B2 pertaining to GOP (n) and displays only pictures B1 and B2 pertaining to the same group, the time $t_c$ is reached as shown in the picture-displaying order 271 of FIG. 14. Thus, pictures B1, B2 and I3 pertaining to GOP (n+2) must be decoded in order to display pictures B1 and B2 pertaining to the same group, starting at the display time $t_c$ of picture B1 pertaining to the same group since an edit point has been set at picture B1 pertaining to GOP (n+2) as an IN point. Even though picture I3 pertaining to GOP (n+2) is not to be displayed, picture I3 is referenced in decoding pictures B1 and B2 pertaining to the same group. Thus, picture I3 pertaining to GOP (n+2) must also be decoded.

For the reason described above, as described earlier, the controller 7 drives a specific one of the four decoders $4_1$ to $4_4$ to decode pictures I3, P6, P9, P12 and P15 pertaining to GOP (n+1) immediately preceding GOP (n+2) and, then, pictures I3, B1 and B2 pertaining to GOP (n+2) in accordance with the schedule shown on the first line of FIG. 7 as shown in a picture-decoding order 274 of FIG. 14. The specific decoder is a decoder that is not carrying out a decoding process at the present time. For example, the decoder $4_3$ is selected as the specific decoder.

It is to be noted that, in the process to decode pictures I3, B1 and B2 pertaining to GOP (n+2), the processing to decode picture B1, at which an edit point has been set as an IN point, must be completed by the display time $t_c$ of picture B1. Thus, the process to decode picture I3 pertaining to GOP (n+1) and leading ahead of picture B1 pertaining to GOP (n+2) by seven pictures must be started before a time leading ahead of the time $t_c$ by a period of time it takes to display seven pictures. In the picture-decoding order 274 shown in FIG. 14, a time $t_{c-7}$ is determined to be the time to start the process to decode picture I3 pertaining to GOP (n+1). Thus, the process to decode picture I3 pertaining to GOP (n+1) is started at the time $t_{c-7}$ whereas the process to decode picture B2 pertaining to GOP (n+2) is completed by a time $t_{c+1}$ lagging behind the time $t_c$ by a period of time it takes to display one picture. Picture B2 pertaining to GOP (n+2) is a picture to be decoded last among pictures I3, B1 and B2 pertaining to GOP (n+2).

After the decoder $4_3$ decodes pictures I3, B1 and B2 pertaining to GOP (n+2) and displays only pictures B1 and B2 pertaining to the same group, the time $t_d$ is reached as shown in the picture-displaying order 271 of FIG. 14. Thus, pictures B1, B2 and I3 pertaining to GOP (n+3) must be decoded in order to display pictures B1 and B2 pertaining to the same group, starting at the display time $t_d$ of picture B1 pertaining to the same group since an edit point has been set at picture B1 as an IN point. Even though picture I3 pertaining to GOP (n+3) is not to be displayed, picture I3 is referenced in decoding pictures B1 and B2 pertaining to the same group. Thus, picture I3 pertaining to GOP (n+3) must also be decoded.

For the reason described above, as described earlier, the controller 7 drives a specific one of the four decoders $4_1$ to $4_4$ to decode pictures I3, P6, P9, P12 and P15 pertaining to GOP (n+2) immediately preceding GOP (n+3) and, then, pictures I3, B1 and B2 pertaining to GOP (n+3) in accordance with the schedule shown on the first line of FIG. 7 as shown in a picture-decoding order 275 of FIG. 14. The specific decoder is a decoder that is not carrying out a decoding process at the present time. In this case, the only remaining decoder $4_4$ is selected as the specific decoder.

It is to be noted that, in the process to decode pictures I3, B1 and B2 pertaining to GOP (n+3), the processing to decode picture B1, at which an edit point has been set as an IN point, must be completed by the display time $t_d$ of picture B1. Thus, the process to decode picture I3 pertaining to GOP (n+2) and leading ahead of picture B1 pertaining to GOP (n+3) by seven pictures must be started before a time leading ahead of the time $t_d$ by a period of time it takes to display seven pictures. In the picture-decoding order 275 shown in FIG. 14, a time $t_{d-7}$ is determined to be the time to start the process to decode picture I3 pertaining to GOP (n+2). Thus, the process to decode picture I3 pertaining to GOP (n+2) is started at the time $t_{d-7}$ whereas the process to decode picture B2 pertaining to GOP (n+3) is completed by a time $t_{d+1}$ lagging behind the time $t_d$ by a period of time it takes to display one picture. Picture B2 pertaining to GOP (n+3) is a picture to be decoded last among pictures I3, B1 and B2 pertaining to GOP (n+3).

After the decoder $4_4$ decodes pictures I3, B1 and B2 pertaining to GOP (n+3) and displays only pictures B1 and B2 pertaining to the same group, the time $t_e$ is reached as shown in the picture-displaying order 271 of FIG. 14. Thus, pictures B1, B2 and I3 pertaining to GOP (n+4) and subsequent pictures must be decoded, starting at the display time $t_e$ of picture B1 pertaining to the same group since an edit point has been set at picture B1 pertaining to GOP (n+4) as an IN point.

For the reason described above, as described earlier, the controller 7 drives a specific one of the four decoders $4_1$ to $4_4$ to decode pictures I3, P6, P9, P12 and P15 pertaining to GOP (n+3) immediately preceding GOP (n+4) in order to decode picture B1 pertaining to GOP (n+4) in accordance with the schedule shown on the first line of FIG. 7 as shown in the picture-decoding order 272 of FIG. 14.

It is to be noted that, in the process to decode pictures pertaining to GOP (n+4), the processing to decode picture B1, at which an edit point has been set as an IN point, must be completed by the display time $t_e$ of picture B1. Thus, the process to decode picture I3 pertaining to GOP (n+3) and leading ahead of picture B1 pertaining to GOP (n+4) by seven pictures must be started before a time leading ahead of the time $t_e$ by a period of time it takes to display seven pictures. In the picture-decoding order 272 shown in FIG. 14, a time $t_{e-7}$ is determined to be the time to start the process to decode picture I3 pertaining to GOP (n+3).

By the way, with the timing of the time $t_{e-7}$, while the decoders $4_2$, $4_3$ and $4_4$ are each still carrying out a decoding process as is obvious from respectively the picture-decoding orders 273, 274 and 275 shown in FIG. 14, the decoder $4_1$ has completed its decoding process at the time $t_{a+1}$ coinciding with the time $t_{e-7}$ as shown in the picture-decoding order 272 of FIG. 14. Thus, at the time $t_{e-7}$, the decoder $4_1$ is available for a decoding process.

For this reason, the controller 7 drives the decoder $4_1$ to decode pictures I3, P6, P9, P12 and P15 pertaining to GOP (n+3) and, then, pictures I3, B1 and B2 pertaining to GOP (n+4) as shown in the picture-decoding order 272 of FIG. 14.

As is obvious from the above description, even the shortest cut duration is equal to a period of time it takes to display two frames, there is no case in which the decoders $4_1$, $4_2$, $4_3$ and $4_4$ must decode a plurality of pictures at the same time. Thus, by designing the decoding unit 4 to include the four decoders $4_1$, $4_2$, $4_3$ and $4_4$, the shortest cut duration can be reduced to a period of time it takes to display two frames. That is to say, the embodiment employing four decoders allows the shortest cut duration to be reduced to a period shorter than the embodiment wherein the decoding unit 4 includes only the three decoders $4_1$, $4_2$ and $4_3$ as described earlier by referring to FIG. 13. As a result, the freedom of editing can be further improved.

The following description explains an implementation of the embodiment realizing the disc system as shown in FIG. 12 wherein the shortest cut duration can be further reduced to a period of time it takes to display one frame by designing the decoding unit 4 to comprise seven decoders $4_1$, $4_2$, $4_3$, $4_4$, $4_5$, $4_6$ and $4_7$, that is, by setting the value of K at 7.

Figure 15:
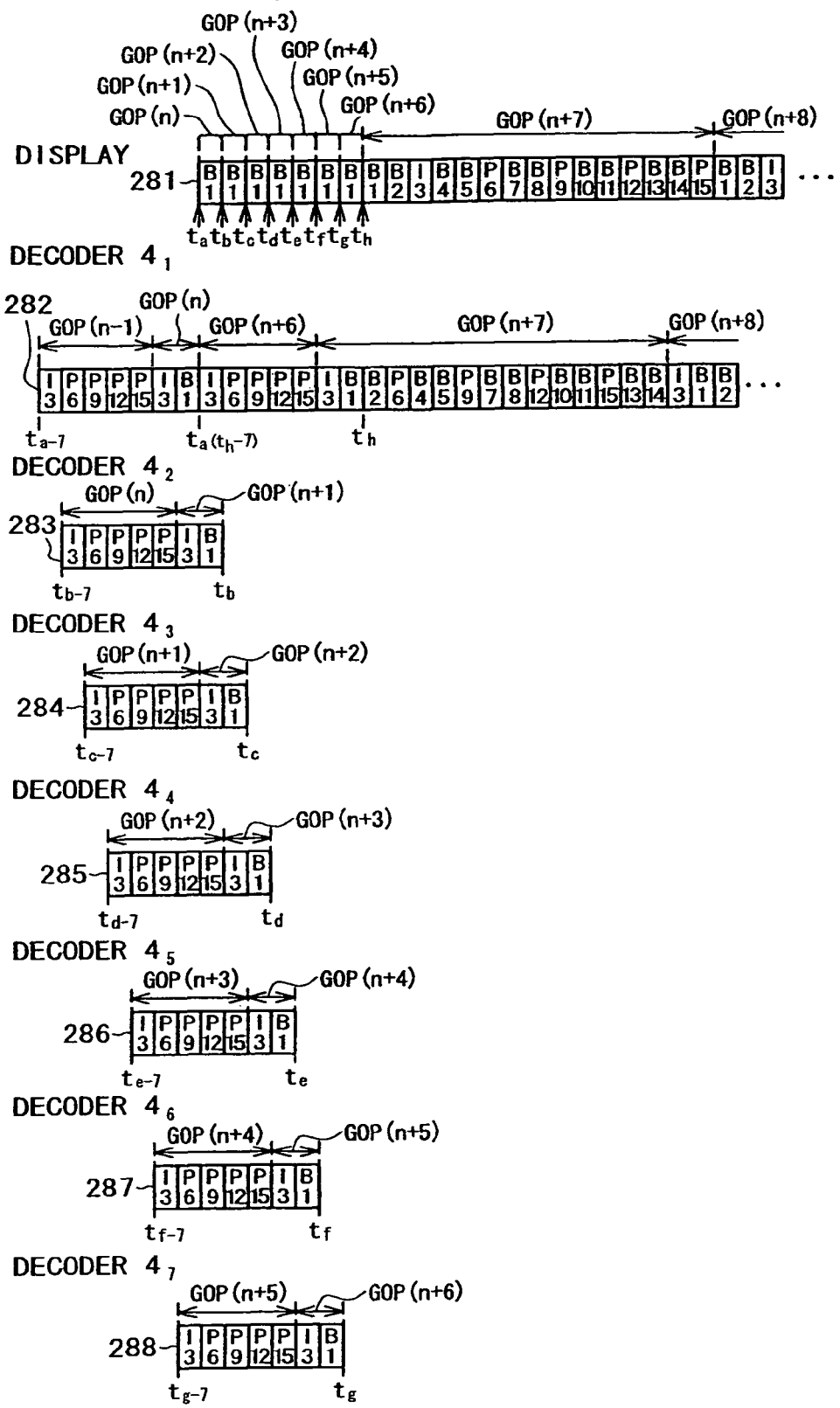
FIG. 15 is an explanatory diagram to be referred to in describing a reproduction process using a decoding unit 4 comprising decoders $4_1$ to $4_7$.

To put it in detail, now, assume that an editing process has been carried out to display picture B1 pertaining to GOP (n) beginning at a time $t_a$, then picture B1 pertaining to GOP (n+1) beginning at a time $t_b$, then picture B1 pertaining to GOP (n+2) beginning at a time $t_c$, then pictures B1 and B2 pertaining to GOP (n+3) beginning at a time $t_d$, then pictures B1 and B2 pertaining to GOP (n+4) beginning at a time $t_e$, then pictures B1 and B2 pertaining to GOP (n+5) beginning at a time $t_f$, then pictures B1 and B2 pertaining to GOP (n+6) beginning at a time $t_g$ and, finally, pictures pertaining to GOP (n+7) and subsequent GOPs beginning at a time $t_h$ as shown in a picture-displaying order 281 of FIG. 15. In this case, as IN points, edit points are set at picture B1 pertaining to GOP (n) to be displayed at the time $t_a$, picture B1 pertaining to GOP (n+1) to be displayed at the time $t_b$, picture B1 pertaining to GOP (n+2) to be displayed at the time $t_c$, picture B1 pertaining to GOP (n+3) to be displayed at the time $t_d$, B1 pertaining to GOP (n+4) to be displayed at the time $t_e$, B1 pertaining to GOP (n+5) to be displayed at the time $t_f$, B1 pertaining to GOP (n+6) to be displayed at the time $t_g$ and picture B1 pertaining to GOP (n+7) to be displayed at the time $t_h$.

It is to be noted that, in this case, the time $t_b$ lags behind the time $t_a$ by a period of time it takes to display one frame, the time $t_c$ lags behind the time $t_b$ by a period of time it takes to display one frame, the time $t_d$ lags behind the time $t_c$ by a period of time it takes to display one frame, the time $t_e$ lags behind the time $t_d$ by a period of time it takes to display one frame, the time $t_f$ lags behind the time $t_e$ by a period of time it takes to display one frame, the time $t_g$ lags behind the time $t_f$ by a period of time it takes to display one frame and the time $t_h$ lags behind the time $t_g$ by a period of time it takes to display one frame. Thus, in the picture-displaying order 281 shown in FIG. 15, the shortest cut duration is a period of time it takes to display the one frame between the times $t_a$ and $t_b$ (or the one frame between the times $t_b$ and $t_c$, the one frame between the times $t_c$ and td, the one frame between the times td and $t_e$, the one frame between the times $t_e$ and $t_f$, the one frame between the times $t_f$ and $t_g$ or the one frame between the times $t_g$ and $t_h$).

In this case, first of all, pictures B1 and I3 pertaining to GOP (n) must be displayed beginning at the time $t_a$ with picture B1 at which an edit point has been set as an IN point. Thus, as described earlier, the controller 7 drives a specific one of the seven decoders $4_1$ to $4_7$ to decode pictures I3, P6, P9, P12 and P15 pertaining to GOP (n−1) immediately preceding GOP (n) and, then, pictures I3 and B1 pertaining to GOP (n) in accordance with the schedule shown on the first line of FIG. 7 as shown in a picture-decoding order 282 of FIG. 15. Even though picture I3 pertaining to GOP (n) is not to be displayed, picture I3 is referenced in decoding pictures B1 and B2 pertaining to the same group. Thus, picture I3 pertaining to GOP (n) must also be decoded. The specific decoder is a decoder that is not carrying out a decoding process at the present time. For example, the decoder $4_1$ is selected as the specific decoder.

It is to be noted that, in the process to decode pictures I3 and B1 pertaining to GOP (n), the processing to decode picture B1, at which an edit point has been set as an IN point, must be completed by the display time $t_a$ of picture B1. Thus, the process to decode picture I3 pertaining to GOP (n−1) and leading ahead of picture B1 pertaining to GOP (n) by seven pictures must be started before a time leading ahead of the time $t_a$ by a period of time it takes to display seven pictures. In the picture-decoding order 282 shown in FIG. 15, a time $t_{a-7}$ is determined to be the time to start the process to decode picture I3 pertaining to GOP (n−1). Thus, the process to decode picture I3 pertaining to GOP (n−1) is started at the time $t_{a-7}$ whereas the process to decode picture B1 pertaining to GOP (n) is completed by the time $t_a$. Picture B1 pertaining to GOP (n) is a picture to be decoded last among pictures I3 and B1 pertaining to GOP (n).

After the decoder $4_1$ decodes pictures I3 and B1 pertaining to GOP (n) and displays only picture B1 pertaining to the same group, the time $t_b$ is reached as shown in the picture-displaying order 281 of FIG. 15. Thus, pictures B1 and I3 pertaining to GOP (n+1) must be decoded in order to display picture B1 pertaining to the same group, starting at the display time $t_b$ of picture B1 pertaining to the same group since an edit point has been set at picture B1 as an IN point. Even though picture I3 pertaining to GOP (n+1) is not to be displayed, picture I3 is referenced in decoding picture B1 pertaining to the same group. Thus, picture I3 pertaining to GOP (n+1) must also be decoded.

For the reason described above, as described earlier, the controller 7 drives a specific one of the seven decoders $4_1$ to $4_7$ to decode pictures I3, P6, P9, P12 and P15 pertaining to GOP (n) immediately preceding GOP (n+1) and, then, pictures I3 and B1 pertaining to GOP (n+1) in accordance with the schedule shown on the first line of FIG. 7 as shown in a picture-decoding order 283 of FIG. 15. The specific decoder is a decoder that is not carrying out a decoding process at the present time. For example, the decoder $4_2$ is selected as the specific decoder.

It is to be noted that, in the process to decode pictures I3 and B1 pertaining to GOP (n+1), the processing to decode picture B1, at which an edit point has been set as an IN point, must be completed by the display time $t_b$ of picture B1. Thus, the process to decode picture I3 pertaining to GOP (n) and leading ahead of picture B1 pertaining to GOP (n+1) by seven pictures must be started before a time leading ahead of the time $t_b$ by a period of time it takes to display seven pictures. In the picture-decoding order 284 shown in FIG. 15, a time $t_{b-7}$ is determined to be the time to start the process to decode picture I3 pertaining to GOP (n). Thus, the process to decode picture I3 pertaining to GOP (n) is started at the time $t_{b-7}$ whereas the process to decode picture B1 pertaining to GOP (n+1) is completed by the time $t_b$. Picture B1 pertaining to GOP (n+1) is a picture to be decoded last among pictures I3 and B1 pertaining to GOP (n+1).

After the decoder $4_2$ decodes pictures I3 and B1 pertaining to GOP (n+1) and displays only picture B1 pertaining to the same group, the time $t_c$ is reached as shown in the picture-displaying order 281 of FIG. 15. Thus, pictures B1 and I3 pertaining to GOP (n+2) must be decoded in order to display picture B1 pertaining to the same group, starting at the display time $t_c$ of picture B1 pertaining to the group since an edit point has been set at picture B1 as an IN point. Even though picture I3 pertaining to GOP (n+2) is not to be displayed, picture I3 is referenced in decoding picture B1 pertaining to the same group. Thus, picture I3 pertaining to GOP (n+2) must also be decoded.

For the reason described above, as described earlier, the controller 7 drives a specific one of the seven decoders $4_1$ to $4_7$ to decode pictures I3, P6, P9, P12 and P15 pertaining to GOP (n+1) immediately preceding GOP (n+2) and, then, pictures I3 and B1 pertaining to GOP (n+2) in accordance with the schedule shown on the first line of FIG. 7 as shown in a picture-decoding order 284 of FIG. 15. The specific decoder is a decoder that is not carrying out a decoding process at the present time. For example, the decoder $4_3$ is selected as the specific decoder.

It is to be noted that, in the process to decode pictures I3 and B1 pertaining to GOP (n+2), the processing to decode picture B1, at which an edit point has been set as an IN point, must be completed by the display time $t_c$ of picture B1. Thus, the process to decode picture I3 pertaining to GOP (n+1) and leading ahead of picture B1 pertaining to GOP (n+2) by seven pictures must be started before a time leading ahead of the time $t_c$ by a period of time it takes to display seven pictures. In the picture-decoding order 284 shown in FIG. 15, a time $t_{c-7}$ is determined to be the time to start the process to decode picture I3 pertaining to GOP (n+1). Thus, the process to decode picture I3 pertaining to GOP (n+1) is started at the time $t_{c-7}$ whereas the process to decode picture B1 pertaining to GOP (n+2) is completed by the time $t_c$. Picture B1 pertaining to GOP (n+2) is a picture to be decoded last among pictures I3 and B1 pertaining to GOP (n+2).

After the decoder $4_3$ decodes pictures I3 and B1 pertaining to GOP (n+2) and displays only picture B1 pertaining to the same group, the time $t_d$ is reached as shown in the picture-displaying order 281 of FIG. 15. Thus, pictures B1 and I3 pertaining to GOP (n+3) must be decoded in order to display picture B1 pertaining to the same group, starting at the display time $t_d$ of picture B1 pertaining to the group since an edit point has been set at picture B1 pertaining to GOP (n+3) as an IN point. Even though picture I3 pertaining to GOP (n+3) is not to be displayed, picture I3 is referenced in decoding picture B1 pertaining to the same group. Thus, picture I3 pertaining to GOP (n+3) must also be decoded.

For the reason described above, as described earlier, the controller 7 drives a specific one of the seven decoders $4_1$ to $4_7$ to decode pictures I3, P6, P9, P12 and P15 pertaining to GOP (n+2) immediately preceding GOP (n+3) and, then, pictures I3 and B1 pertaining to GOP (n+3) in accordance with the schedule shown on the first line of FIG. 7 as shown in a picture-decoding order 285 of FIG. 15. The specific decoder is a decoder that is not carrying out a decoding process at the present time. For example, the decoder $4_4$ is selected as the specific decoder.

It is to be noted that, in the process to decode pictures I3 and B1 pertaining to GOP (n+3), the processing to decode picture B1, at which an edit point has been set as an IN point, must be completed by the display time $t_d$ of picture B1. Thus, the process to decode picture I3 pertaining to GOP (n+2) and leading ahead of picture B1 pertaining to GOP (n+3) by seven pictures must be started before a time leading ahead of the time $t_d$ by a period of time it takes to display seven pictures. In the picture-decoding order 285 shown in FIG. 15, a time $t_{d-7}$ is determined to be the time to start the process to decode picture I3 pertaining to GOP (n+2). Thus, the process to decode picture I3 pertaining to GOP (n+2) is started at the time $t_{d-7}$ whereas the process to decode picture B1 pertaining to GOP (n+3) is completed by the time $t_d$. Picture B1 pertaining to GOP (n+3) is a picture to be decoded last among pictures I3 and B1 pertaining to GOP (n+3).

After the decoder $4_4$ decodes pictures I3 and B1 pertaining to GOP (n+3) and displays only picture B1 pertaining to the same group, the time $t_e$ is reached as shown in the picture-displaying order 281 of FIG. 15. Thus, pictures B1 and I3 pertaining to GOP (n+4) must be decoded in order to display picture B1 pertaining to the same group, starting at the display time $t_e$ of picture B1 pertaining to the group since an edit point has been set at picture B1 pertaining to GOP (n+4) as an IN point. Even though picture I3 pertaining to GOP (n+4) is not to be displayed, picture I3 is referenced in decoding picture B1 pertaining to the same group. Thus, picture I3 pertaining to GOP (n+4) must also be decoded.

For the reason described above, as described earlier, the controller 7 drives a specific one of the seven decoders $4_1$ to $4_7$ to decode pictures I3, P6, P9, P12 and P15 pertaining to GOP (n+3) immediately preceding GOP (n+4) and, then, pictures I3 and B1 pertaining to GOP (n+4) in accordance with the schedule shown on the first line of FIG. 7 as shown in a picture-decoding order 286 of FIG. 15. The specific decoder is a decoder that is not carrying out a decoding process at the present time. For example, the decoder $4_5$ is selected as the specific decoder.

It is to be noted that, in the process to decode pictures I3 and B1 pertaining to GOP (n+4), the processing to decode picture B1, at which an edit point has been set as an IN point, must be completed by the display time $t_e$ of picture B1. Thus, the process to decode picture I3 pertaining to GOP (n+3) and leading ahead of picture B1 pertaining to GOP (n+4) by seven pictures must be started before a time leading ahead of the time $t_e$ by a period of time it takes to display seven pictures. In the picture-decoding order 286 shown in FIG. 15, a time $t_{e-7}$ is determined to be the time to start the process to decode picture I3 pertaining to GOP (n+3). Thus, the process to decode picture I3 pertaining to GOP (n+3) is started at the time $t_{e-7}$ whereas the process to decode picture B1 pertaining to GOP (n+4) is completed by the time $t_e$. Picture B1 pertaining to GOP (n+4) is a picture to be decoded last among pictures I3 and B1 pertaining to GOP (n+3).

After the decoder $4_5$ decodes pictures I3 and B1 pertaining to GOP (n+4) and displays only picture B1 pertaining to the same group, the time $t_f$ is reached as shown in the picture-displaying order 281 of FIG. 15. Thus, pictures B1 and I3 pertaining to GOP (n+5) must be decoded in order to display picture B1 pertaining to the same group, starting at the display time $t_f$ of picture B1 pertaining to the group since an edit point has been set at picture B1 pertaining to GOP (n+5) as an IN point. Even though picture I3 pertaining to GOP (n+5) is not to be displayed, picture I3 is referenced in decoding picture B1 pertaining to the same group. Thus, picture I3 pertaining to GOP (n+5) must also be decoded.

For the reason described above, as described earlier, the controller 7 drives a specific one of the seven decoders $4_1$ to $4_7$ to decode pictures I3, P6, P9, P12 and P15 pertaining to GOP (n+4) immediately preceding GOP (n+5) and, then, pictures I3 and B1 pertaining to GOP (n+5) in accordance with the schedule shown on the first line of FIG. 7 as shown in a picture-decoding order 287 of FIG. 15. The specific decoder is a decoder that is not carrying out a decoding process at the present time. For example, the decoder $4_6$ is selected as the specific decoder.

It is to be noted that, in the process to decode pictures I3 and B1 pertaining to GOP (n+5), the processing to decode picture B1, at which an edit point has been set as an IN point, must be completed by the display time $t_f$ of picture B1. Thus, the process to decode picture I3 pertaining to GOP (n+4) and leading ahead of picture B1 pertaining to GOP (n+5) by seven pictures must be started before a time leading ahead of the time $t_f$ by a period of time it takes to display seven pictures. In the picture-decoding order 287 shown in FIG. 15, a time $t_{f-7}$ is determined to be the time to start the process to decode picture I3 pertaining to GOP (n+4). Thus, the process to decode picture I3 pertaining to GOP (n+4) is started at the time $t_{f-7}$ whereas the process to decode picture B1 pertaining to GOP (n+5) is completed by the time $t_f$. Picture B1 pertaining to GOP (n+5) is a picture to be decoded last among pictures I3 and B1 pertaining to GOP (n+5).

After the decoder $4_6$ decodes pictures I3 and B1 pertaining to GOP (n+5) and displays only picture B1 pertaining to the same group, the time $t_g$ is reached as shown in the picture-displaying order 281 of FIG. 15. Thus, pictures B1 and I3 pertaining to GOP (n+6) must be decoded in order to display picture B1 pertaining to the same group, starting at the display time $t_g$ of picture B1 pertaining to the group since an edit point has been set at picture B1 pertaining to GOP (n+6) as an IN point. Even though picture I3 pertaining to GOP (n+6) is not to be displayed, picture I3 is referenced in decoding picture B1 pertaining to the same group. Thus, picture I3 pertaining to GOP (n+6) must also be decoded.

For the reason described above, as described earlier, the controller 7 drives a specific one of the seven decoders $4_1$ to $4_7$ to decode pictures I3, P6, P9, P12 and P15 pertaining to GOP (n+5) immediately preceding GOP (n+6) and, then, pictures I3 and B1 pertaining to GOP (n+6) in accordance with the schedule shown on the first line of FIG. 7 as shown in a picture-decoding order 288 of FIG. 15. The specific decoder is a decoder that is not carrying out a decoding process at the present time. In this case, the only remaining decoder $4_7$ is selected as the specific decoder.

It is to be noted that, in the process to decode pictures I3 and B1 pertaining to GOP (n+6), the processing to decode picture B1, at which an edit point has been set as an IN point, must be completed by the display time $t_g$ of picture B1. Thus, the process to decode picture I3 pertaining to GOP (n+5) and leading ahead of picture B1 pertaining to GOP (n+6) by seven pictures must be started before a time leading ahead of the time $t_g$ by a period of time it takes to display seven pictures. In the picture-decoding order 288 shown in FIG. 15, a time $t_{g-7}$ is determined to be the time to start the process to decode picture I3 pertaining to GOP (n+5). Thus, the process to decode picture I3 pertaining to GOP (n+5) is started at the time $t_{g-7}$ whereas the process to decode picture B1 pertaining to GOP (n+6) is completed by the time $t_g$. Picture B1 pertaining to GOP (n+6) is a picture to be decoded last among pictures I3 and B1 pertaining to GOP (n+6).

After the decoder $4_7$ decodes pictures I3 and B1 pertaining to GOP (n+6) and displays only picture B1 pertaining to the same group, the time $t_h$ is reached as shown in the picture-displaying order 281 of FIG. 15. Thus, pictures B1, B2 and I3 pertaining to GOP (n+7) and subsequent pictures must be decoded, starting at the display time $t_h$ of picture B1 pertaining to the group since an edit point has been set at picture B1 pertaining to GOP (n+7) as an IN point.

For the reason described above, as described earlier, the controller 7 drives a specific one of the seven decoders $4_1$ to $4_7$ to decode pictures I3, P6, P9, P12 and P15 pertaining to GOP (n+6) immediately preceding GOP (n+7) in order to decode picture B1 pertaining to GOP (n+7) in accordance with the schedule shown on the first line of FIG. 7 as shown in the picture-decoding order 282 of FIG. 15. The specific decoder is a decoder that is not carrying out a decoding process at the present time. In this case, the decoder $4_1$ is again selected as the specific decoder for a reason described later.

It is to be noted that, in the process to decode pictures pertaining to GOP (n+7), the processing to decode picture B1, at which an edit point has been set as an IN point, must be completed by the display time $t_h$ of picture B1. Thus, the process to decode picture I3 pertaining to GOP (n+6) and leading ahead of picture B1 pertaining to GOP (n+7) by seven pictures must be started before a time leading ahead of the time $t_h$ by a period of time it takes to display seven pictures. In the picture-decoding order 282 shown in FIG. 15, a time $t_{h-7}$ is determined to be the time to start the process to decode picture I3 pertaining to GOP (n+6).

By the way, with the timing of the time $t_{h-7}$, while the decoders $4_2$ to $4_7$ are each still carrying out a decoding process as is obvious from respectively the picture-decoding orders 283 to 288 shown in FIG. 15, the decoder $4_1$ has completed its decoding process at the time $t_a$ coinciding with the time $t_{h-7}$ as shown in the picture-decoding order 282 of FIG. 15.

Thus, at the time $t_{h-7}$, the decoder $4_1$ is available for a decoding process. For this reason, the controller 7 drives the decoder $4_1$ to decode pictures I3, P6, P9, P12 and P15 pertaining to GOP (n+6) and, then, pictures I3 and B1 pertaining to GOP (n+7) as shown in the picture-decoding order 282 shown in FIG. 15.

As is obvious from the above description, with the decoding unit 4 designed to include seven decoders $4_1$ to $4_7$, there is no case in which the decoders $4_1$ to $4_7$ must decode a plurality of pictures at the same time even if the shortest cut duration is reduced to a period of time it takes to display one frame. Thus, by designing the decoding unit 4 to include the seven decoders $4_1$ to $4_7$, the shortest cut duration can be reduced to a period of time it takes to display one frame. As a result, an editing process can be carried out without restrictions caused by the shortest cut duration.

Figure 16:
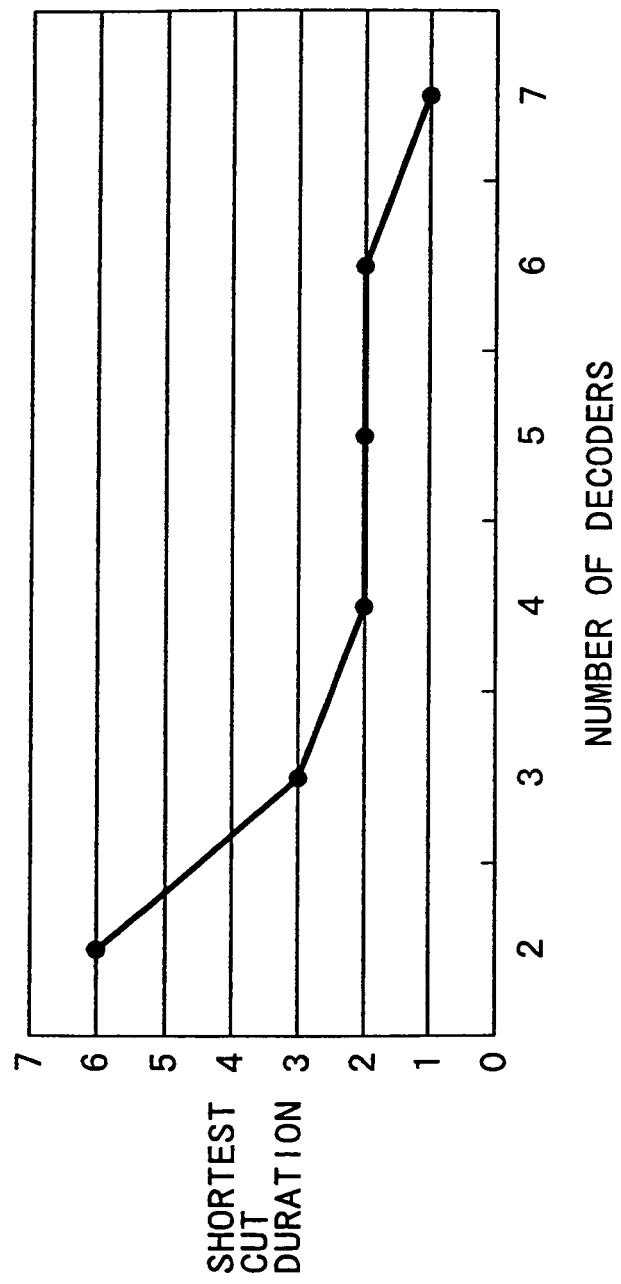
FIG. 16 is a diagram showing a relation between the number of decoders $4_1$ to $4_k$ (K) composing the decoding unit 4 and a shortest cut duration.

FIG. 16 is a diagram showing a relation between the number of decoders $4_1$ to $4_k$ (K) composing the decoding unit 4 and the shortest cut duration. As shown in FIG. 16, if the number of decoders $4_1$ to $4_k$ (K) is set at 2, the shortest cut duration is equal to a period of time it takes to display six frames. If the number of decoders $4_1$ to $4_k$ (K) is set at 3, the shortest cut duration is equal to a period of time it takes to display three frames. If the number of decoders $4_1$ to $4_k$ (K) is set at 3, 4 or 5, the shortest cut duration is equal to a period of time it takes to display two frames. If the number of decoders $4_1$ to $4_k$ (K) is set at 7 or a greater number, the shortest cut duration is equal to a period of time it takes to display one frame.

It is to be noted that the relation shown in FIG. 16 is established between the number of decoders $4_1$ to $4_k$ (K) composing the decoding unit 4 and the shortest cut duration for the decoders $4_1$ to $4_k$ (K) of the decoding unit 4 each having a one-time decoding process speed. If the decoders $4_1$ to $4_k$ composing the decoding unit 4 each have an L-time decoding process speed where L is a positive number), the shortest cut duration can be reduced to a period of time it takes to display one frame by composing the decoding unit 4 of at least 7/L decoders $4_1$, $4_2$ and so on. In this case, an editing process can be carried out without restrictions caused by the shortest cut duration.

Figure 17:
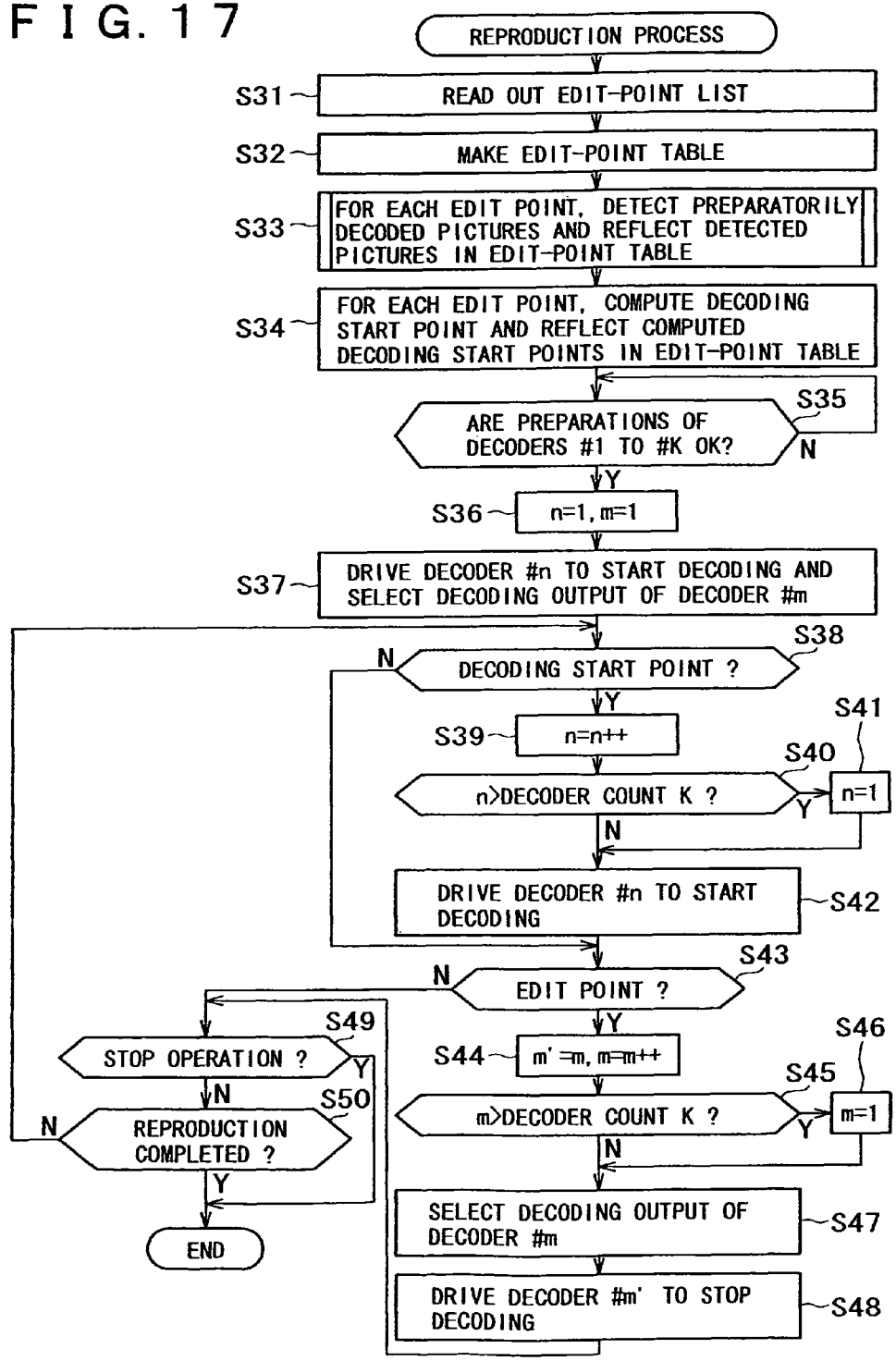
FIG. 17 shows a flowchart to be referred to in explaining a reproduction process carried out by the disc system.

Next, the reproduction process carried out by the disc system shown in FIG. 12 is further explained by referring to a flowchart shown in FIG. 17.

When the user operates the operation unit 8 to start a process to reproduce a result of edit processing of an MPEG stream in accordance with an edit-point list, the operation unit 8 outputs a reproduction-start operation signal, which is an operation signal making a request for a start of a reproduction process, to the controller 7.

When receiving the reproduction-start operation signal from the operation unit 8 at a step S31, the controller 7 issues a request for an edit-point list to the disc drive 2. At this request, the disc drive 2 reads out the edit-point list from the optical disc 1 and then outputs the list to the bus 3. Then, the controller 7 receives the edit-point list from the bus 3. Subsequently, at the next step S32, the controller detects all IN and OUT points included on the edit-point list and makes a table of edit points. The table of edit points is properly referred to hereafter as an edit-point table.

It is to be noted that, in the edit-point table, edit points are described in a display-time order.

Then, at the next step S33, the controller 7 carries out a process to find preparatorily decoded pictures for each of the edit points, which is described in the edit-point table as an IN point. The process to find preparatorily decoded pictures has been explained before by referring to the flowchart shown in FIG. 11. In addition, at the step S33, the controller 7 reflects the preparatorily decoded pictures and a preparatory decoding time, which are found in the process to find preparatorily decoded pictures, in the edit-point table for each IN point. Subsequently, the flow of the reproduction process goes on to a step S34. At the step S34, the controller 7 finds a decoding start time for each of the edit points, which is described in the edit-point table as an IN point, from the preparatory decoding time for the IN point, and reflects the decoding start time in the edit-point table. The decoding start time of an IN point is a time at which a process to decode the preparatorily decoded pictures for the IN time must be started.

It is to be noted that, basically, a decoding start time of an edit point serving as an IN point is set at a time leading ahead of the IN point by at least the preparatory decoding time for the IN point. If picture B1 or B2 has been set at the edit point, however, a decoding start time of the edit point is set at a time leading ahead of the edit point by at least the sum of the preparatory decoding time for the edit point and the decoding time of one frame.

The reason why the decoding time of one frame is added to the preparatory decoding time as described above is explained as follows. Assume that picture B1 or B2 pertaining to GOP (n) is to be decoded. In this case, it is necessary to reference picture P15 pertaining to GOP (n−1) immediately preceding GOP (n) in the display order and picture I3 pertaining to GOP (n). Picture I3 pertaining to GOP (n) is to be displayed after picture B1 and B2. Picture P15 pertaining to GOP (n−1) and picture I3 pertaining to GOP (n) are each called a referenced picture for picture B1 or B2 pertaining to GOP (n), but only picture P15 pertaining to GOP (n−1) immediately preceding GOP (n) in the display order is regarded as one of the preparatorily decoded pictures because picture P15 is not to be displayed after picture B1 or B2 pertaining to GOP (n). Since picture I3 pertaining to GOP (n) is to be displayed after picture B1 or B2 pertaining to the same group, however, picture I3 is not regarded as one of the preparatorily decoded pictures.

Because picture I3 pertaining to GOP (n) is referenced in decoding picture B1 or B2 pertaining to GOP (n), nevertheless, it is necessary to decode picture I3 before decoding picture B1 or B2.

Thus, before decoding picture B1 or B2 pertaining to GOP (n), it is necessary to decode picture I3 pertaining to GOP (n) in addition to the pictures referred to as the preparatorily decoded pictures. For this reason, if picture B1 or B2 has been set at an edit point, a decoding start time of the edit point is set at a time leading ahead of the edit point by at least the sum of the preparatory decoding time it takes to decode the preparatorily decoded pictures for the edit point and the decoding time of one frame, which is picture I3 pertaining to the same group as picture B1 or B2.

Figure 18:
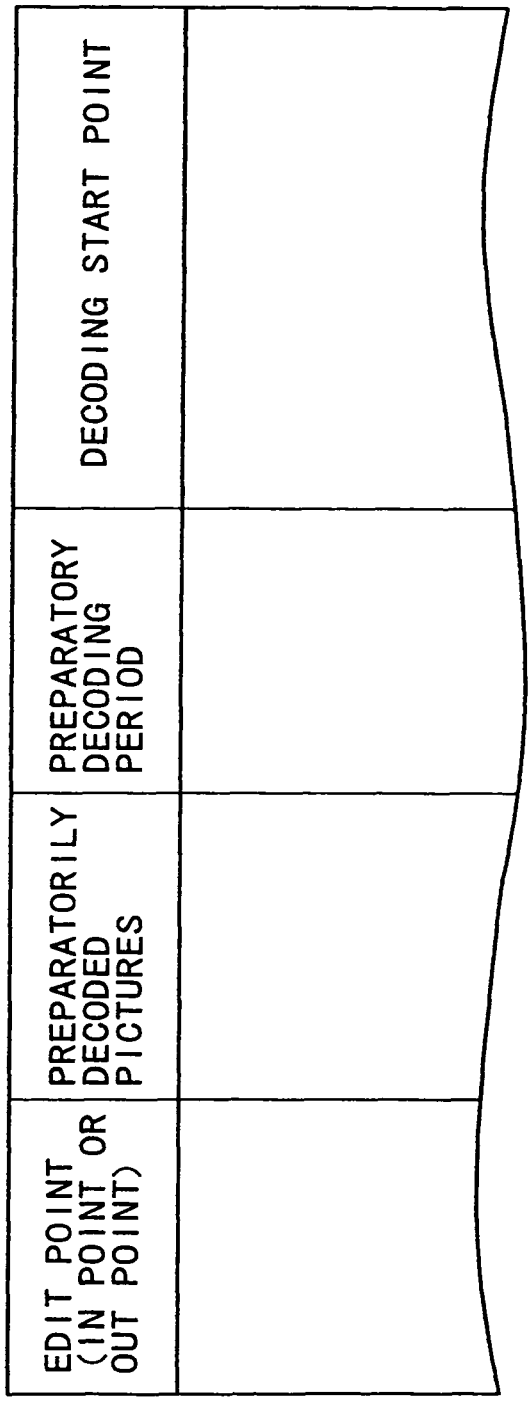
FIG. 18 is a diagram showing an edit-point table.

As is obvious from the above description, for each edit point included on the edit-point list, a created edit-point table shows preparatorily decoded pictures, a preparatory decoding time and a decoding start time, which are associated with the edit point like for example one shown in FIG. 18.

Thus, the pieces of processing carried out at the steps S32 to S34 described above correspond to the scheduling performed at the step S2 of the flowchart shown in FIG. 6.

Then, at the next step S35, the controller 7 forms a judgment as to whether or not the decoders $4_1$ to $4_k$ have completed preparations for decoding operations. The judgment is formed repeatedly at the step S35 till the preparations are completed. As the outcome of the judgment formed at the step S35 indicates that the decoders $4_1$ to $4_k$ have completed the preparations for decoding operations, the flow of the reproduction process goes on to a step S36 at which the controller 7 sets a variable n at an initial value of, for example, 1 and a variable m at an initial value of, for example, 1. The variable n is a variable identifying a decoder $4_n$, which is supposed to start a decoding operation. On the other hand, the variable m is a variable identifying a decoder $4_m$, which is supposed to be selected by the switcher 5. Subsequently, the flow of the reproduction process goes on to a step S37.

At the step S37, the controller 7 drives the decoder $4_n$ to start a decoding operation starting with a picture at which the first IN point described in the edit-point table has been set. In addition, the controller 7 controls the switcher 5 to select a decoding result output by the decoder $4_m$ and output the selected decoding result to the display unit 6. Thus, a picture obtained as a result of a decoding operation carried out by the decoder $4_m$ is displayed on the display unit 6.

Then, at the next step S38, the controller 7 forms a judgment as to whether or not the current timing is a timing for one of decoding start points described in the edit-point table.

If the outcome of the judgment formed at the step S38 indicates that the current timing is not a timing for one of decoding start points described in the edit-point table, the flow of the reproduction process goes on to a step S43, skipping steps S39 to S42.

If the outcome of the judgment formed at the step S38 indicates that the current timing is a timing for one of decoding start points described in the edit-point table, on the other hand, the flow of the reproduction process goes on to the step S39 at which the controller 7 increments the variable n by typically 1. Then, the flow of the reproduction process goes on to a step S40.

A decoding start point judged at the step S38 to coincide with the current timing is appropriately referred to hereafter as an observed decoding start point.

At the step S40, the controller 7 forms a judgment as to whether or not the variable n is greater than the decoder count K of the counters $4_1$ to $4_k$. If the outcome of the judgment formed at the step S40 indicates that the variable n is greater than the decoder count K, the flow of the reproduction process goes on to a step S41 at which the controller 7 initializes the variable n to a value of 1. Then, the flow of the reproduction process goes on to a step S42.

If the outcome of the judgment formed at the step S40 indicates that the variable n is not greater than the decoder count K, on the other hand, the flow of the reproduction process goes on directly to the step S42. At this step, the controller 7 drives the decoder $4_n$ to start an operation to decode preparatorily decoded pictures associated with the observed decoding start point described in the edit-point table. Then, the flow of the reproduction process goes on to the step S43.

At the step S43, the controller 7 forms a judgment as to whether or not a picture to be decoded by a currently operating decoder is an IN-point picture. A currently operating decoder is one of the decoders $4_1$ to $4_k$, which is currently carrying out a decoding operation. An IN-point picture is a picture at which an edit point has been set as an IN point.

If the outcome of the judgment formed at the step S43 indicates that the picture to be decoded by a currently operating decoder is not an IN-point picture, the flow of the reproduction process goes on to a step S49, skipping steps S44 to S48.

If the outcome of the judgment formed at the step S43 indicates that the picture to be decoded by a currently operating decoder is an IN-point picture, on the other hand, the flow of the reproduction process goes on to the step S44 at which the controller 7 copies the value of the variable m to a variable m' and increments the variable m by typically 1. The variable m is a variable identifying a currently operating decoder $4_m$, the decoding output of which is selected by the switcher 5. Then, the flow of the reproduction process goes on to a step S45.

At the step 45, the controller 7 forms a judgment as to whether or not the variable m is greater than the decoder count K of the counters $4_1$ to $4_k$. If the outcome of the judgment formed at the step S45 indicates that the variable m is greater than the decoder count K, the flow of the reproduction process goes on to a step S46 at which the controller 7 initializes the variable m to a value of 1. Then, the flow of the reproduction process goes on to a step S4$_7$.

If the outcome of the judgment formed at the step S45 indicates that the variable m is not greater than the decoder count K, on the other hand, the flow of the reproduction process goes on directly to the step S4$_7$. At this step, the controller 7 controls the switcher 5 to select a decoding result output by the decoder $4_m$ identified by the variable m, which was incremented by 1 at the step S44 or initialized to 1 at the step S46.

As a result, the screen appearing on the display unit 6 is switched from a previous decoded picture to a new decoded picture. The previous decoded picture is a picture obtained as a result of a decoding operation carried out by the decoder $4_m'$ identified by the variable m', which is equal to the variable m before being incremented by 1 at the step S44 and, of course, before being initialized to 1 at the step S46. On the other hand, the new decoded picture is a picture obtained as a result of a decoding operation carried out by the decoder $4_m$ identified by the variable m, which has been incremented by 1 at the step S44 or, has been incremented by 1 at the step S44 and then initialized to 1 at the step S46.

Subsequently, at the next step S48, the controller 7 stops the decoding operation carried out by the decoder $4_m'$ identified by the variable m', which is equal to the variable m before being incremented by 1 at the step S44 and, of course, before being initialized to 1 at the step S46 as described above. Then, the flow of the reproduction process goes on to the step S49.

The pieces of processing carried out at the steps S35 to S48 described above correspond to the control of the decoding unit 4 and the switcher 5. This control is executed at the step S3 of the flowchart shown in FIG. 6.

At the step S49, the controller 7 forms a judgment as to whether or not the user has operated the operation unit 8 to stop the reproduction process much like the step S4 of the flowchart shown in FIG. 6. If the outcome of the judgment formed at the step S49 indicates that the user has operated the operation unit 8 to stop the reproduction process, that is, if the controller 7 has received an operation signal to stop the reproduction process from the operation unit 8, the execution of the reproduction process is ended. The operation signal to stop the reproduction process is properly referred to hereafter as a reproduction stop operation signal.

If the outcome of the judgment formed at the step S49 indicates that the user has not operated the operation unit 8 to stop the reproduction process, on the other hand, the flow of the reproduction process goes on to a step S50 at which the controller 7 forms a judgment as to whether or not the process to reproduce an editing result of the MPEG stream in accordance with the edit-point list read out at the step S31 has been completed much like the step S5 of the flowchart shown in FIG. 6. If the outcome of the judgment formed at the step S50 indicates that the process to reproduce an editing result of the MPEG stream in accordance with the edit-point list has not been completed, the flow of the reproduction process goes back to the step S38 to repeat the same processing. If the outcome of the judgment formed at the step S50 indicates that the process to reproduce an editing result of the MPEG stream in accordance with the edit-point list has been completed, on the other hand, the execution of the reproduction process is ended.

In accordance with the reproduction process represented by the flowchart shown in FIG. 17, decoding operations are carried out in the decoders $4_1$ to $4_k$ in a decoding order of decoders $4_1, 4_2, - - -, 4_k, 4_1, 4_2$ and so on, and the switcher 5 is controlled to select a picture obtained as a result of a decoding operation. It is to be noted, however, that the order of decoders to carry out decoding operations and the order of decoders selected by the switcher 5 are not limited to those indicated by the flowchart.

As described above by referring to the flowchart shown in FIG. 17, in the disc system shown in FIG. 12, the controller 7 reads out the edit-point list from the optical disc 1 and makes an edit-point table from the edit-point list. Since the controller 7 controls the decoders $4_1$ to $4_k$ to carry out decoding operations of the MPEG stream on the basis of information included in the edit-point table, the information included in the edit-point table can be said to be decoding control information for controlling the decoding operations.

The disc system shown in FIG. 12 is capable of making a decoding control list described in accordance with a predetermined format from the decoding control information. In addition, if such a decoding control list already exists, the disc system shown in FIG. 12 is capable of controlling the decoders $4_1$ to $4_k$ to carry out decoding operations of the MPEG stream on the basis of the decoding control list.

Thus, the disc system shown in FIG. 12 has the function of a reproduction apparatus for reproducing information from the optical disc 1 in accordance with an edit-point list. In addition, the disc system shown in FIG. 12 also has the function of a list-making apparatus for making a decoding control list from the edit-point list and the function of a reproduction apparatus for reproducing information from the optical disc 1 in accordance with the decoding control list. It is to be noted that, for an operation to reproduce information from the optical disc 1 in accordance with the decoding control list, the disc system shown in FIG. 12 is capable of reproducing information from the optical disc 1 in accordance with the decoding control list, which is typically stored in advance in the controller 7. As an alternative, the decoding control list is recorded onto the optical disc 1 and, in an operation to reproduce information from the optical disc 1 in accordance with the decoding control list, the decoding control list is first retrieved from the optical disc 1.

The following description explains functions of the disc system shown in FIG. 12 with the disc system working as a list-making apparatus for making a decoding control list as well as a reproduction apparatus for reproducing information from the optical disc 1 in accordance with the decoding control list. The list-making apparatus is virtually an information-processing apparatus for making a decoding control list. It is to be noted that some of the blocks of the disc system shown in FIG. 12 carry out the same operations as those described above. Thus, the explanation of such blocks does not need to be repeated.

The description begins with an explanation of a function executed by the disc system of FIG. 12 as a list-making apparatus for making a decoding control list. It is to be noted that the optical disc 1 shown in FIG. 12 is assumed to be a disc for recording an MPEG stream obtained typically as a result of carrying out an MPEG encoding process on a moving picture. In addition, the optical disc 1 is also used for storing an edit-point list made as a result of carrying out an editing process with an MPEG stream in the optical disc 1 used as a raw editing material.

The controller 7 makes an edit-point list as requested for example by an operation signal generated by the operation unit 8. To put it in detail, when the controller 7 receives an operation signal requesting creation of an edit-point list from the operation unit 8, for example, the controller 7 issues a request for the edit-point list to the disc drive 2. At this request, the disc drive 2 reads out the edit-point list from the optical disc 1 and then outputs the list to the bus 3. Subsequently, the controller 7 receives the edit-point list and then detects edit points from the list. In addition, for each of the edit points detected from the edit-point list, fewest possible pictures are detected. The one or fewest possible pictures are pictures that must be decoded first in order to decode pictures to be displayed at and after the edit point, even though the one or fewest possible pictures themselves are not to be displayed. The controller 7 then finds a decoding start point representing a timing with which an operation to decode the one or fewest possible pictures is started.

The controller 7 further makes a decoding control list describing decoding control information. The decoding control information includes each of edit points detected from the edit-point list and additional data associated with each of the edit points. The additional data includes the number of pictures, which are not to be displayed but must be decoded first in order to decode pictures to be displayed at and after the edit point, and a decoding start point representing a timing to start an operation to decode the pictures, which are not to be displayed but must be decoded. The controller 7 then supplies the decoding control list to the disc drive 2, onto which the list is to be stored, by way of the bus 3. It is to be noted that details of the decoding control list will be explained later by referring to FIG. 22.

Figure 19:
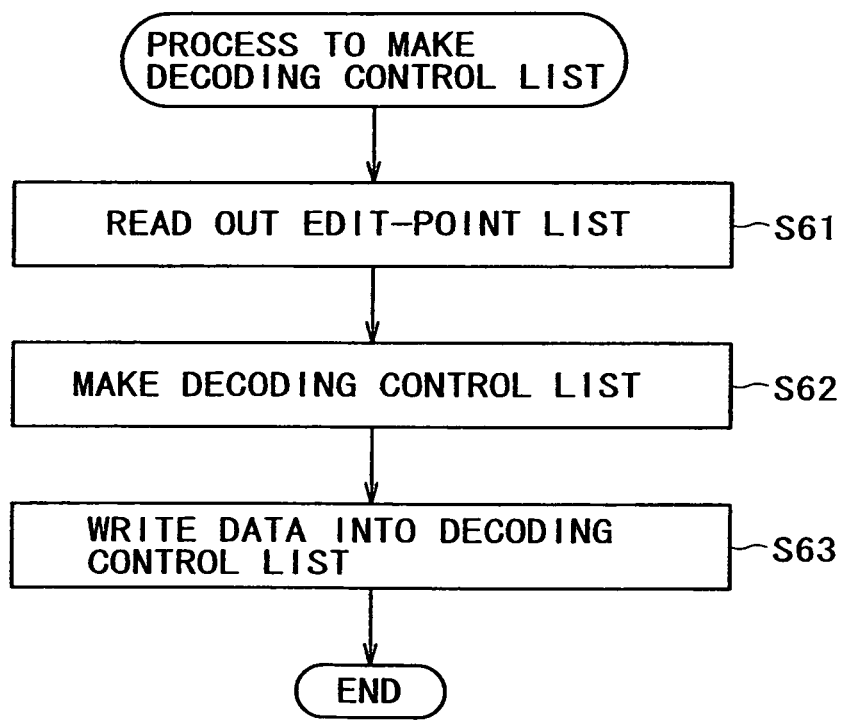
FIG. 19 shows a flowchart to be referred to in explaining a process carried out by the disc system to make a decoding control list.

By referring to a flowchart shown in FIG. 19, the following description explains a decoding control list creation process carried out by the disc system shown in FIG. 12 to make a decoding control list.

When the user operates the operation unit 8 to make a decoding control list from an edit-point list, the operation unit 8 supplies a decoding control list operation signal to the controller 7. The decoding control list operation signal is an operation signal requesting the controller 7 to make a decoding control list.

When receiving the decoding control list operation signal from the operation unit 8 at a step S61, the controller 7 issues a request for an edit-point list to the disc drive 2. At this request, the disc drive 2 reads out the edit-point list from the optical disc 1 and then outputs the list to the bus 3. Subsequently, the controller 7 receives the edit-point list from the bus 3. Then, at the next step S62, the controller detects all edit points described on the edit-point list as IN and OUT points. Subsequently, for each of the detected edit points, the controller 7 finds fewest possible pictures and a decoding start point representing a timing with which an operation to decode the one or fewest possible pictures is started. As described earlier, the one or fewest possible pictures are pictures that must be decoded first in order to decode pictures to be displayed at and after the edit point even though the one or fewest possible pictures themselves are not to be displayed. The controller 7 further makes a decoding control list based on information such as the detected edit points, the number of fewest possible pictures, which are not to be displayed but must be decoded for each of the edit points, and the computed decoding start point for each of the edit points. That is to say, the controller 7 makes a decoding control list showing decoding control information including the detected edit points, the number of fewest possible pictures, which are not to be displayed but to be decoded for each of the edit points, and the computed decoding start point for each of the edit points.

Then, the flow of the list creation process goes on from the step S62 to a step S63 at which the controller 7 outputs the decoding control list made at the step S62 to the bus 3. The disc drive 2 receives the decoding control list from the bus 3 and then stores the list onto the optical disc 1 to end the execution of the list creation process.

As described above, in the decoding control list creation process represented by the flowchart shown in FIG. 19, the disc system shown in FIG. 12 is capable of making a decoding control list based on an edit-point list recorded on the optical disc 1 and storing the decoding control list onto the optical disc 1. By carrying out a reproduction process to be described later with reference to a flowchart shown in FIG. 23, from the optical disc 1, the disc system shown in FIG. 12 or another apparatus including a plurality of decoders is capable of reproducing an MPEG stream including a decoding control list also recorded on the disc 1.

Figure 20:
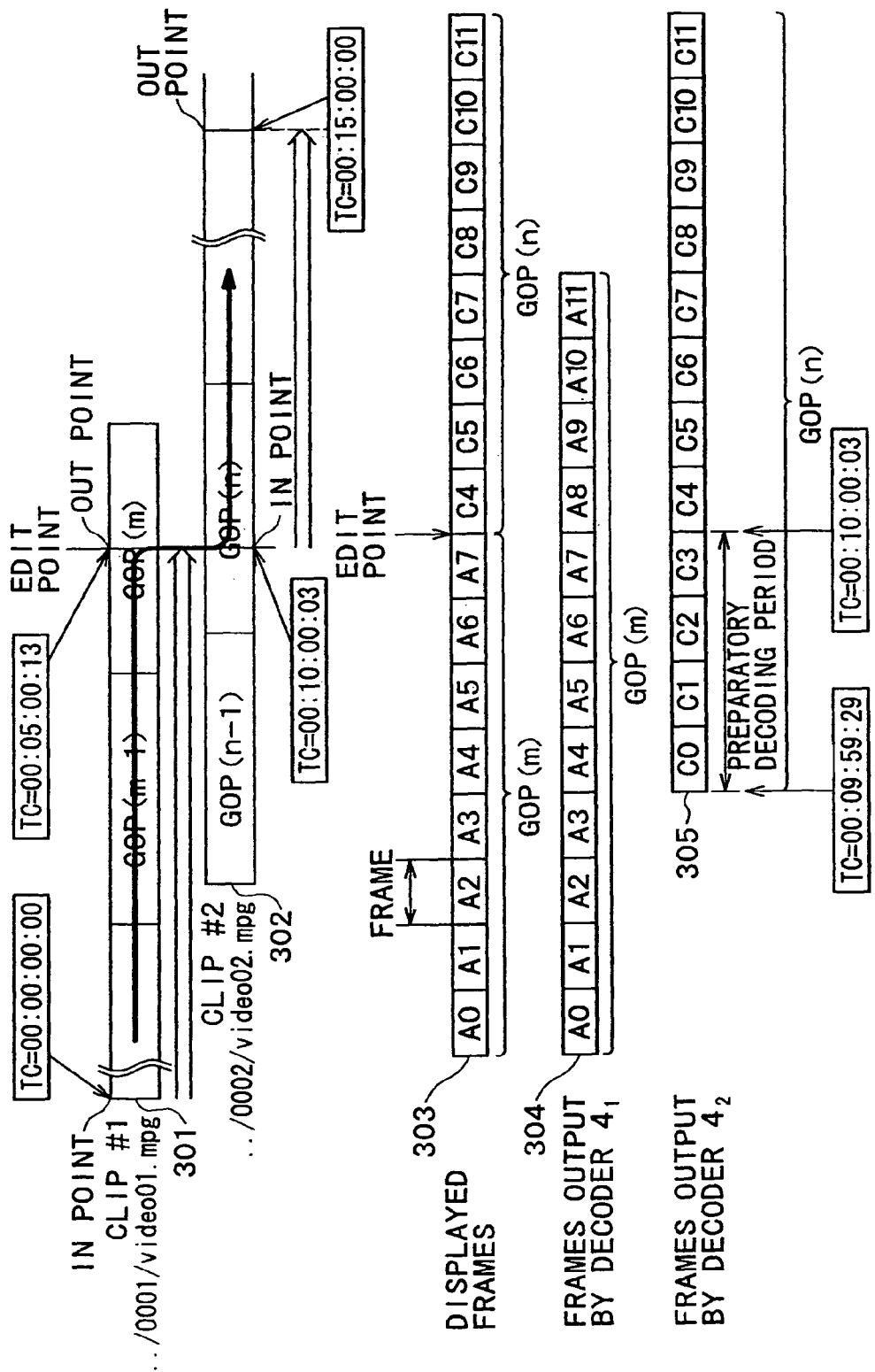
FIG. 20 is an explanatory diagram showing an edit-point list and a decoding control list made on the basis of the edit-point list.

By referring to FIGS. 20 to 22, the following description explains the decoding control list made in the decoding control list creation process represented by the flowchart shown in FIG. 19.

Now, assume that an editing operation like one shown in FIG. 20 has been carried out.

An MPEG-stream portion between an IN point set on an MPEG stream used as a raw editing material and an OUT point for the IN point is referred to as a clip. If a cut editing operation is carried out, the result of the cut editing operation is a sequence of a plurality of clips.

The upper portion of FIG. 20 shows a result of a cut editing operation carried out on raw material data including 2 MPEG streams 301 and 302.

In FIG. 20, the file names of the MPEG streams 301 and 302 are ../0001/video01.mpg and ../0002/video02.mpg respectively. It is to be noted that, strictly speaking, ../0001/of the file name ../0001/video01.mpg is the name of a directory or a folder including a file containing the MPEG stream 301, and video01.mpg is the name of the file. '../' represents a directory at a level immediately above the current directory. This file naming applies to ../0002/video02.mpg as well.

As shown in FIG. 20, a pair of IN and OUT points is set on the MPEG stream 301 to result in clip #1 between the IN and OUT points. By the same token, a pair of IN and OUT points is set on the MPEG stream 302 to result in clip #2 between the IN and OUT points. Thus, clip #1 is a portion of the file ../0001/video01.mpg and clip #2 is a portion of the file ../0002/video02.mpg.

The so-called time code TC is attached to each of frames composing the MPEG streams 301 and 302. Used for representing the display timing of a frame to which the time code is attached, the time code TC has a format of 'Hours:Minutes:Seconds:Frame number'. Each edit point set as an IN or OUT point is represented by a time code.

In FIG. 20, the IN point of clip #1 is represented by a TC of 00:00:00:00 while the OUT point of clip #1 is represented by a TC of 00:05:00:12. On the other hand, the IN point of clip #2 is represented by a TC of 00:10:00:03 while the OUT point of clip #2 is represented by a TC of 00:15:00:00.

Assume that an editing process was carried out to reproduce clip #1 to be followed by clip #2. As shown in displayed frames 303 of FIG. 20, an edit point has been set as an OUT point at picture A7 pertaining to GOP (m) of clip #1 on the MPEG stream 301 and as an IN point at picture C4 pertaining to GOP (m) of clip #2 on the MPEG stream 302. In this case, in an operation to reproduce the post-editing MPEG streams, as shown in output frames 304 of FIG. 20, the decoder $4_1$ is driven to decode and output pictures ending with picture A7 at which an edit point has been set as the OUT point of clip #1 and, as shown in output frames 305 of FIG. 20, the decoder $4_2$ is driven to decode and output pictures starting with picture C4 at which an edit point has been set as the IN point of clip #2.

However, in order for the decoder $4_2$ to decode frames starting with frame C4 at which an edit point has been set as an IN point, specific pictures to be referenced in decoding the frames even though not to be displayed must be decoded first prior to an operation to decode the frame C4 at which an edit point has been set as an IN point. As described earlier, such specific pictures are referred to as preparatorily decoded pictures. As shown in the displayed frames 305 of FIG. 20, four pictures C0, C1, C2 and C3 are the preparatorily decoded pictures of frame C4 and must thus be decoded prior to an operation to decode the frame C4. Since the IN point of clip #2 is represented by a 'TC=00:10:00:03', the decoding start point of clip #2 is a picture represented by a 'TC=00:10:59:29', which is leading ahead of 'TC=00:10:00:03' by a period of time it takes to decode four pictures.

FIG. 21 is a diagram showing a typical edit-point list made as a result of an editing operation explained by referring to FIG. 20. The edit-point list shown in FIG. 21 can be prescribed in a definition using a language such as the XML (eXtensible, Markup Language).

To be more specific, FIG. 21 shows typical codes in a range specified by a <body> tag placed on the first line of the edit-point list to serve as a start tag and a </body> tag placed on the eleventh line to serve as an end tag. It is to be noted that, in the definition of the edit-point list shown in FIG. 21, a number placed at the beginning or each line and a colon ':' following the number are not codes but merely added properly to make the description easy to understand. Lines and colons shown in FIGS. 22 and 24 are added for the same purpose as those shown in FIG. 21.

The edit-point list shown in FIG. 21 is a list of time codes each representing an edit point set in a raw-material data in order to identify a clip and a list of time codes each representing a timing to reproduce a clip represented by data following an edit point. Pieces of information included on the list begin at a <par> tag placed on the second line and end at a </par> tag placed on the tenth line.

'<!--Clip1-->' on the third line indicates that codes described on the fourth and fifth lines are codes of clip #1. It is to be noted that a comment can be described between '<!--' and '-->'.

On the fourth and fifth lines, codes '<ref src="../0001/video01.mpg" begin="smpte=00:00:00:00" clipBegin="smpte=00:00:00:00" clipEnd="00:05:00:12"/>' are described. The code '<ref src="../0001/video01.mpg"' thereof indicates that the '../0001/video01.mpg' is the name of a file containing the MPEG stream of clip #1. The code 'begin="smpte=00:00:00:00"' thereof indicates that an operation to reproduce clip #1 begins at a time code TC of 00:00:00:00 of data following the edit point. The code 'begin="smpte=00:00:00:00"' can be omitted. The code 'clipBegin="smpte=00:00:00:00"' thereof indicates that the IN point of clip #1 is set at the time code TC of 00:00:00:00 of file ../0001/video01.mpg. On the other hand, the code 'clipEnd="smpte=00:05:00:12"' thereof indicates that the OUT point of clip #1 is set at the time code TC of 00:05:00:12 of file ../0001/video01.mpg. It is to be noted that the code 'smpte=' indicates that information following this code is a time code conforming to standards set by the SMPTE (Society of Motion Picture and Television Engineers). It is also worth noting that the afore described format of the time code is no more than a typical format. In actuality, any other format can be adopted as long as the other format indicates time information of an order in which pictures are displayed.

'<!--Clip2-->' on the seventh line indicates that codes described on the eighth and ninth lines are codes of clip #2.

On the eighth and ninth lines, codes '<ref src="../0002/video02.mpg" begin="smpte=00:05:00:12" clipBegin="smpte=00:10:00:03" clipEnd="00:15:00:00"/>' are described. The code '<ref src="../0002/video02.mpg"' thereof indicates that the '../0002/video02.mpg' is the name of a file containing the MPEG stream of clip #2. The code 'begin="smpte=00:05:00:13"' thereof indicates that an operation to reproduce clip #2 begins at a time code TC=00:05:00:13 of data following the edit point. This is because the MPEG stream of clip #2 is reproduced after the MPEG stream of clip #1 as explained earlier by referring to FIG. 20. Since the reproduction period of time for the MPEG stream of clip #1 is '00:05:00:12' between the time code TC=00:00:00:00 of file ../0001/video01.mpg and the time code TC=00:05:00:12 of file ../0001/video01.mpg as described on the fifth line, the operation to reproduce clip #2 begins at a time code TC=00: 05:00:13. The code 'clipBegin="smpte=00:10:00:03"' thereof indicates that the IN point of clip #2 is set at the time code TC=00:10:00:03 of file ../0002/video02.mpg. On the other hand, the code 'clipEnd="smpte=00:15:00:00"' thereof indicates that the OUT point of clip #2 is set at the time code TC=00:15:00:00 of file ../0002/video02.mpg.

FIG. 22 is a diagram showing a typical decoding control list made by carrying out the process to make a decoding control list in accordance with the flowchart shown in FIG. 19 from the edit-point list shown in FIG. 21. As described before, the edit-point list shown in FIG. 21 is made as a result of an editing operation explained earlier by referring to FIG. 20. It is to be noted that, much like the edit-point list shown in FIG. 21, the decoding control list shown in FIG. 22 can be prescribed in a definition using a language such as the XML.

The decoding control list shown in FIG. 22 is made by adding preDecBegin and preDecDur to the edit-point list shown in FIG. 21. preDecBegin is attributive information representing a decoding start point, which is a point of time to start an operation to decode pictures not to be displayed. On the other hand, preDecDur is attributive information representing the number of I and P pictures, which must be decoded first before decoding a picture at which an edit point has been set as an IN point.

To put it concretely, a code of 'preDecBegin="smpte=00: 09:59:29"' on the tenth line is information specifying that an operation to decode clip #2 specified by codes described on the eighth and ninth lines is started at a time code TC=00:09: 59:29 set for file ../0002/video02.mpg. A code of 'preDecDur="4"' is information indicating that the number of I and P pictures, which must be decoded first before decoding a picture to be displayed at a TC of 00:10:00:03 is 4. In the decoding control list shown in FIG. 22, the picture to be displayed at a TC of 00:10:00:03 is picture C4 shown in FIG. 20. On the other hand, the I and P pictures, which must be decoded first before decoding picture C4, are pictures C0 to C3 shown in FIG. 20.

By starting the operation to decode the four pictures, namely, C0 to C3 specified by preDecDur at the time code TC=00:09:59:29 specified by preDecBegin, the disc system shown in FIG. 12 is capable of seamlessly reproducing C4, which is the first picture of clip #2 to be displayed when a TC of 00:10:00:03 is reached.

It is to be noted that the operation to decode the four pictures, which starts at the time code TC=00:09:59:29 specified by preDecBegin, is carried out by a decoder different from a decoder used so far for carrying out an operation to decode clip #1 specified by codes described on the fourth and fifth lines.

In the decoding control list shown in FIG. 20, preDecBegin is described to specify a time code for file ./0002/video02.mpg containing clip #2. However, preDecBegin can also be described for specifying another time code such as a time code of post-editing data. In this case, preDecBegin is described as 'TC=00:05:00:08', which leads ahead of 'TC=00:05:00:12' by a period of time it takes to decode four frames.

As described above, the disc system shown in FIG. 12 makes a decoding control list and then stores the list onto the optical disc 1 also shown in FIG. 12.

The following description explains the disc system of FIG. 12, which functions as a reproduction apparatus reproducing an MPEG stream from the optical disc 1 in accordance with a decoding control list.

It is to be noted that the optical disc 1 shown in FIG. 12 is assumed to contain an MPEG stream obtained typically as a result of carrying out an MPEG encoding process on a moving picture and contain a decoding control list made from an edit-point list.

The controller 7 controls the disc drive 2, the decoding unit 4 and the switcher 5 typically in accordance with operation signals received from the operation unit 8. When receiving an operation signal, which requests an operation to reproduce an MPEG stream from the optical disc 1, from the operation unit 8, for example, the controller 7 issues a request for a decoding control list to the disc drive 2. At this request, the disc drive 2 reads out a decoding control list from the optical disc 1 and then outputs the list to the bus 3. Then, the controller 7 receives the decoding control list from the bus 3.

Subsequently, the controller 7 controls the decoders $4_1$ to $4_k$ in picture units to carry out operations to decode encoded data on the basis of the decoding control list. To put it in detail, the controller 7 controls the decoders $4_1$ to $4_k$ in picture units to carry out operations to decode an MPEG stream on the basis of edit points described on the decoding control list as decoding control information, the number of fewest possible pictures for each of the edit points and a start point representing a timing to start an operation to decode the one or fewest possible pictures. As described before, the one or fewest possible pictures are pictures to be decoded first before decoding the picture displayed at and after the edit point. However, the one or fewest possible pictures themselves are not to be displayed. In addition, the controller 7 also controls the switcher 5 on the basis of the decoding control list so that the switcher 5 correctly selects a decoded picture output by one of the decoders $4_1$ to $4_k$.

By referring to a flowchart shown in FIG. 23, the following description explains a reproduction process carried out by the disc system shown in FIG. 12 on the basis of a decoding control list such as the one shown in FIG. 22.

When the user operates the operation unit 8 to start a process to reproduce a result of edit processing of an MPEG stream in accordance with an edit-point list, the operation unit 8 outputs a reproduction-start operation signal, which is an operation signal making a request for a start of a reproduction process, to the controller 7.

When receiving an operation signal to start a reproduction process from the operation unit 8 at a step S71, the controller 7 issues a request for a decoding control list to the disc drive 2. At this request, the disc drive 2 reads out the decoding control list from the optical disc 1 and then outputs the list to the bus 3. The controller 7 then receives the decoding control list from the bus 3. Subsequently, the flow of the reproduction process goes on to a step S72.

At the step S72, the controller 7 forms a judgment as to whether or not the decoders $4_1$ to $4_k$ have completed preparations for decoding operations. If the preparations for decoding operations have not been completed, the formation of the judgment at the step S72 is repeated. The judgment is formed at this step repeatedly till the outcome of the judgment indicates that the decoders $4_1$ to $4_k$ have completed the preparations for decoding operations. As the outcome of the judgment indicates that the decoders $4_1$ to $4_k$ have completed the preparations for decoding operations, the flow of the reproduction process goes on to a step S73 at which the controller 7 sets a variable n at an initial value of, for example, 1 and a variable m at an initial value of, for example, 1. The variable n is a variable identifying a decoder $4_n$, which is supposed to start a decoding operation. On the other hand, the variable m is a variable identifying a decoder $4_m$, which is supposed to be selected by the switcher 5. Subsequently, the flow of the reproduction process goes on to a step S74.

At the step S74, the controller 7 drives the decoder $4_n$ to start a decoding operation starting with a picture at which an IN point described on the decoding control list has been set. The IN point is described for the clip to be reproduced first. In addition, the controller 7 controls the switcher 5 to select a decoding result output by the decoder $4_m$ and output the selected decoding result to the display unit 6. Thus, a picture obtained as a result of a decoding operation carried out by the decoder $4_m$ is displayed on the display unit 6.

Then, at the next step S75, the controller 7 forms a judgment as to whether or not the current timing is a timing for one of decoding start points described on the decoding control list, that is, whether or not the current timing is a timing for a time code specified by preDecBegin.

If the outcome of the judgment formed at the step S75 indicates that the current timing is not a timing for one of decoding start points described on the decoding control list, that is, the outcome indicates the current timing is not a timing for a time code specified by preDecBegin, the flow of the reproduction process goes on to a step S80, skipping steps S76 to S79.

If the outcome of the judgment formed at the step S75 indicates that the current timing is a timing for one of decoding start points described on the decoding control list, that is, the outcome indicates the current timing is a timing for a time code specified by preDecBegin, on the other hand, the flow of the reproduction process goes on to the step S76 at which the controller 7 increments the variable n by typically 1. Then, the flow of the reproduction process goes on to a step S77.

preDecBegin specifying a time code, whose timing is judged at the step S75 to coincide with the current timing, is appropriately referred to hereafter as observed preDecBegin.

At the step S77, the controller 7 forms a judgment as to whether or not the variable n is greater than the decoder count K of the counters $4_1$ to $4_k$. If the outcome of the judgment formed at the step S77 indicates that the variable n is greater than the decoder count K, the flow of the reproduction process goes on to a step S78 at which the controller 7 initializes the variable n to a value of 1. Then, the flow of the reproduction process goes on to a step S79.

If the outcome of the judgment formed at the step S77 indicates that the variable n is not greater than the decoder count K, on the other hand, the flow of the reproduction process goes on directly to the step S79. At this step, the controller 7 drives the decoder $4_n$ to start an operation to decode preparatorily decoded pictures, the number of which is specified by preDecDur described on the decoding control list, being associated with observed preDecBegin. Then, the flow of the reproduction process goes on to a step S80.

At the step S80, the controller 7 forms a judgment as to whether or not a picture to be decoded by a currently operating decoder is an IN-point picture. A currently operating decoder is one of the decoders $4_1$ to $4_k$, which is currently carrying out a decoding operation. An IN-point picture is a picture at which an edit point has been set as an IN point, that is, a picture with the time code thereof specified by any one of clipBegin codes on the decoding control list.

If the outcome of the judgment formed at the step S80 indicates that the picture to be decoded by a currently operating decoder is not a picture with the time code thereof specified by clipBegin, the flow of the reproduction process goes on to a step S86, skipping steps S81 to S85.

If the outcome of the judgment formed at the step S80 indicates that the picture to be decoded by a currently operating decoder is a picture with the time code thereof specified by clipBegin, on the other hand, the flow of the reproduction process goes on to the step S81 at which the controller 7 copies the value of the variable m to a variable m' and increments the variable m by typically 1. The variable m is a variable identifying a currently operating decoder $4_m$, the decoding output of which is selected by the switcher 5. Then, the flow of the reproduction process goes on to a step S82.

At the step S82, the controller 7 forms a judgment as to whether or not the variable m is greater than the decoder count K of the counters $4_1$ to $4_k$. If the outcome of the judgment formed at the step S82 indicates that the variable m is greater than the decoder count K, the flow of the reproduction process goes on to a step S83 at which the controller 7 initializes the variable m to a value of 1. Then, the flow of the reproduction process goes on to a step S84.

If the outcome of the judgment formed at the step S82 indicates that the variable m is not greater than the decoder count K, on the other hand, the flow of the reproduction process goes on directly to the step S84. At this step, the controller 7 controls the switcher 5 to select a decoding result output by the decoder $4_m$ identified by the variable m, which was incremented by 1 at the step S81 or initialized to 1 at the step S83.

As a result, the screen appearing on the display unit 6 is switched from a previous decoded picture to a new decoded picture. The previous decoded picture is a picture obtained as a result of a decoding operation carried out by the decoder $4_{m'}$ identified by the variable m', which is equal to the variable m before being incremented by 1 at the step S81 and, of course, before being initialized to 1 at the step S83. On the other hand, the new decoded picture is a picture obtained as a result of a decoding operation carried out by the decoder $4_m$ identified by the variable m, which has been incremented by 1 at the step S81 or, has been incremented by 1 at the step S81 and then initialized to 1 at the step S83.

Subsequently, at the next step S85, the controller 7 stops the decoding operation carried out by the decoder $4_{m'}$ identified by the variable m', which is equal to the variable m before being incremented by 1 at the step S81 and, of course, before being initialized to 1 at the step S83 as described above. Then, the flow of the reproduction process goes on to the step S86.

At the step S86, the controller 7 forms a judgment as to whether or not the user has operated the operation unit 8 to stop the reproduction. If the outcome of the judgment formed at the step S86 indicates that the user has operated the operation unit 8 to stop the reproduction process, that is, if the controller 7 has received an operation signal to stop the reproduction process from the operation unit 8, the execution of the reproduction process is ended. The operation signal to stop the reproduction process is properly referred to hereafter as a reproduction stop operation signal.

If the outcome of the judgment formed at the step S86 indicates that the user has not operated the operation unit 8 to stop the reproduction process, on the other hand, the flow of the reproduction process goes on to a step S87 at which the controller 7 forms a judgment as to whether or not the process to reproduce an editing result of the MPEG stream in accordance with the decoding control list read out at the step S71 has been completed. If the outcome of the judgment formed at the step S87 indicates that the process to reproduce an editing result of the MPEG stream in accordance with the decoding control list has not been completed, the flow of the reproduction process goes back to the step S75 to repeat the same processing. If the outcome of the judgment formed at the step S87 indicates that the process to reproduce an editing result of the MPEG stream in accordance with the decoding control list has been completed, on the other hand, the execution of the reproduction process is ended.

As described above, in accordance with the reproduction process represented by the flowchart shown in FIG. 23, the disc system shown in FIG. 12 is capable of reading out a decoding control list recorded on the optical disc 1 and then reproducing an MPEG stream from the optical disc 1 in accordance with the decoding control list.

Thus, by carrying out the reproduction process represented by the flowchart shown in FIG. 23, the disc system shown in FIG. 12 is capable of reproducing an MPEG stream from the optical disc 1, on which a decoding control list has been recorded in a process to make the decoding control list in accordance with the flowchart shown in FIG. 19. In addition, the disc system shown in FIG. 12 is capable of reproducing an MPEG stream from the optical disc 1, on which a decoding control list made by another apparatus has been recorded by the other apparatus.

In accordance with the reproduction process represented by the flowchart shown in FIG. 23, the disc system shown in FIG. 12 is capable reproducing an MPEG stream from the optical disc 1 in accordance with a decoding control list provided that the decoding control list has been stored in the optical disc 1 even if an edit-point list has not been recorded on the optical disc 1.

FIG. 24 is a diagram showing another typical decoding control list.

The decoding control list shown in FIG. 24 is identical with that shown in FIG. 22 except that, in the case of the decoding control list shown in FIG. 24, descriptions each specifying a decoder are added to the list on the sixth and eleventh lines.

It is to be noted that, in the decoding control list shown in FIG. 24, a description of 'decoder="0"' specifying a decoder indicates that a decoder $4_p$ is a decoder for decoding clip #1 to which the description is added. The decoder $4_p$ is one of the K decoders $4_1$ to $4_k$ employed in the disc system shown in FIG. 12. By the same token, a description of 'decoder="1"' specifying a decoder indicates that a decoder $4_q$ is a decoder for decoding clip #2 to which the description is added. The decoder $4_q$ is also one of the K decoders $4_1$ to $4_k$. In this case, p≠q. In addition, p and q are each an integer in the range 1 to K.

To be more specific, the description of 'decoder="0"' on the sixth line of the decoding control list shown in FIG. 24 specifies that the decoder $4_p$ is a decoder for decoding clip #1 specified by codes described on the fourth and fifth lines as a clip of file ../0001/video01.mpg from a TC of 00:00:00:00 to a TC of 00:05:00:12.

On the other hand, the description of 'decoder="1"' on the eleventh line of the decoding control list shown in FIG. 24 specifies that the decoder $4_q$ is a decoder for decoding I and P pictures, which must be decoded first during a decoding period of time starting at a TC of 00:09:59:29 in order to decode a first picture of clip #2 specified by codes described on the ninth and tenth lines as a clip of file ../0002/video02.mpg from a TC of 00:10:00:03 to a TC of 00:15:00:00 so as to display the first picture at the TC of 00:10:00:03.

As described above, the decoding control list can be made as a list including informative descriptions each specifying a decoder. In this case, the controller 7 employed in the disc system shown in FIG. 12 selects a decoder specified on the decoding control list and drives the selected decoder to decode an MPEG stream.

That is to say, in the reproduction process carried out in accordance with the flowchart shown in FIG. 23 on the basis of a decoding control list specifying no decoders, the variable n identifying a decoder $4_n$ among the K decoders $4_1$ to $4_k$ as a decoder to carry out a decoding operation and the variable m identifying a decoder $4_m$ among the K decoders $4_1$ to $4_k$ as a decoder to be selected by the switcher 5 are set initially at 1 and then incremented sequentially thereafter. In a reproduction process carried out on the basis of a decoding control list specifying decoders as shown in FIG. 24, on the other hand, the disc system shown in FIG. 12 recognizes a decoder specified on the decoding control list and then drives the recognized decoder to start a decoding operation with a timing of a time code specified by preDecBegin on the same list. Then, as a picture at a time code specified by clipBegin becomes an object of decoding, a decoding-result output by the recognized decoder is selected.

Figure 25:
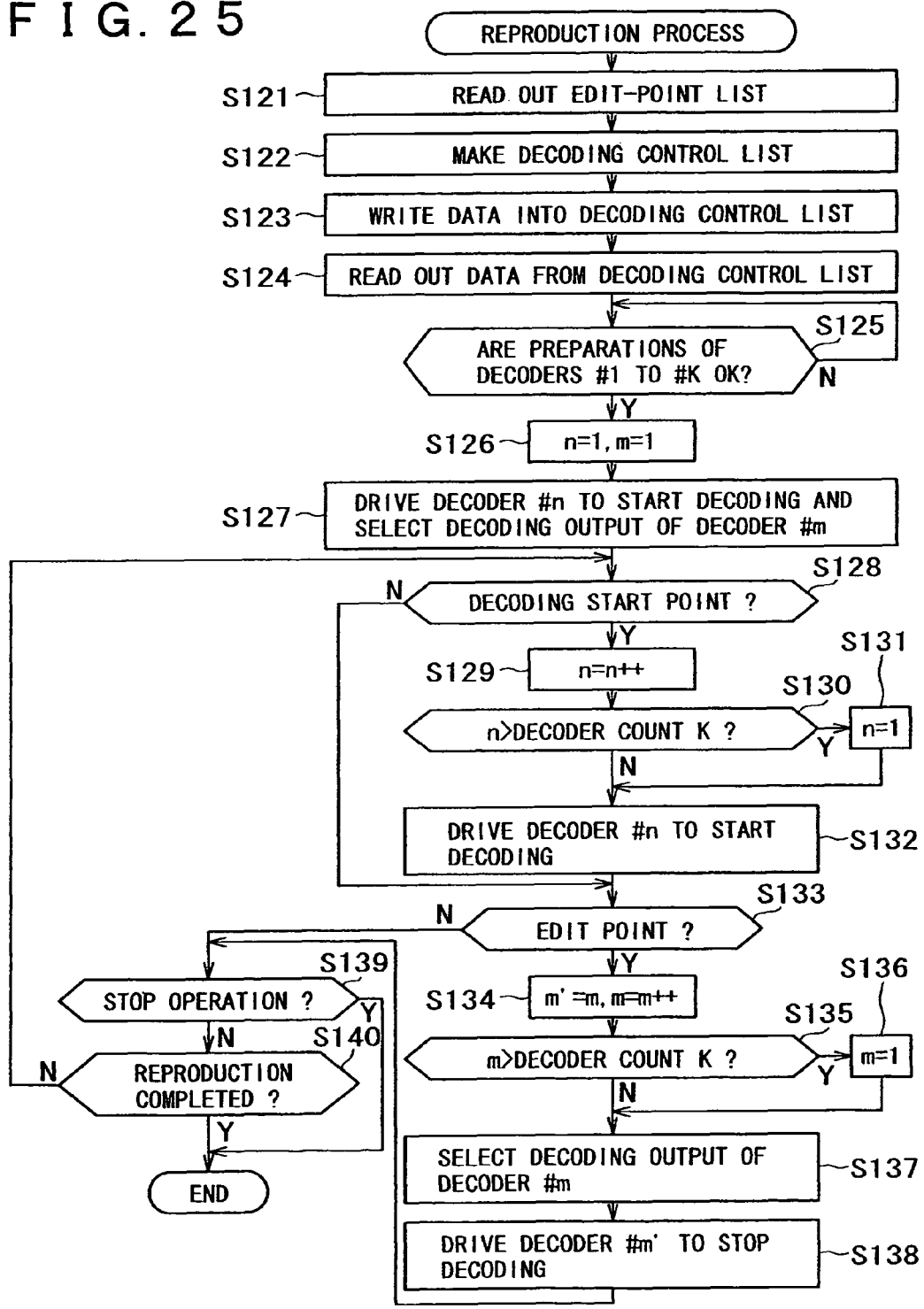
FIG. 25 shows a flowchart to be referred to in explaining a reproduction process carried out by the disc system.

By referring to a flowchart shown in FIG. 25, the following description explains a reproduction process carried out by the disc system shown in FIG. 12 to make a decoding control list like for example the one shown in FIG. 22 from an edit-point list stored in the optical disc 1 and reproduce an MPEG stream on the basis of the decoding control list.

Steps S121 to S123 are executed for the same purpose as respectively steps S61 to S63 of the flowchart shown in FIG. 19. As described earlier, at the steps S61 to S63, the disc system shown in FIG. 12 makes a decoding control list based on an edit-point list stored in the optical disc 1 and stores the decoding control list onto the optical disc 1.

Steps S124 to S140 are executed for the same purpose as respectively steps S71 to S87 of the flowchart shown in FIG. 23. As described earlier, at the steps S71 to S87, the disc system shown in FIG. 12 reads out the decoding control list from the optical disc 1, and reproduces an MPEG stream from the optical disc 1 on the basis of the decoding control list.

It is to be noted that, by saving the decoding control list made at the step S122 in the controller 7, for example, the pieces of processing carried out at the steps S123 and S124 can be eliminated.

As described above, the series of the operations is carried out by the controller 7, which can be implemented by hardware or software. If a controller 7 implemented by software is used for carrying out the series of operations described above, a program composing the software is installed into typically a general-purpose computer implementing the controller 7.

Figure 26:
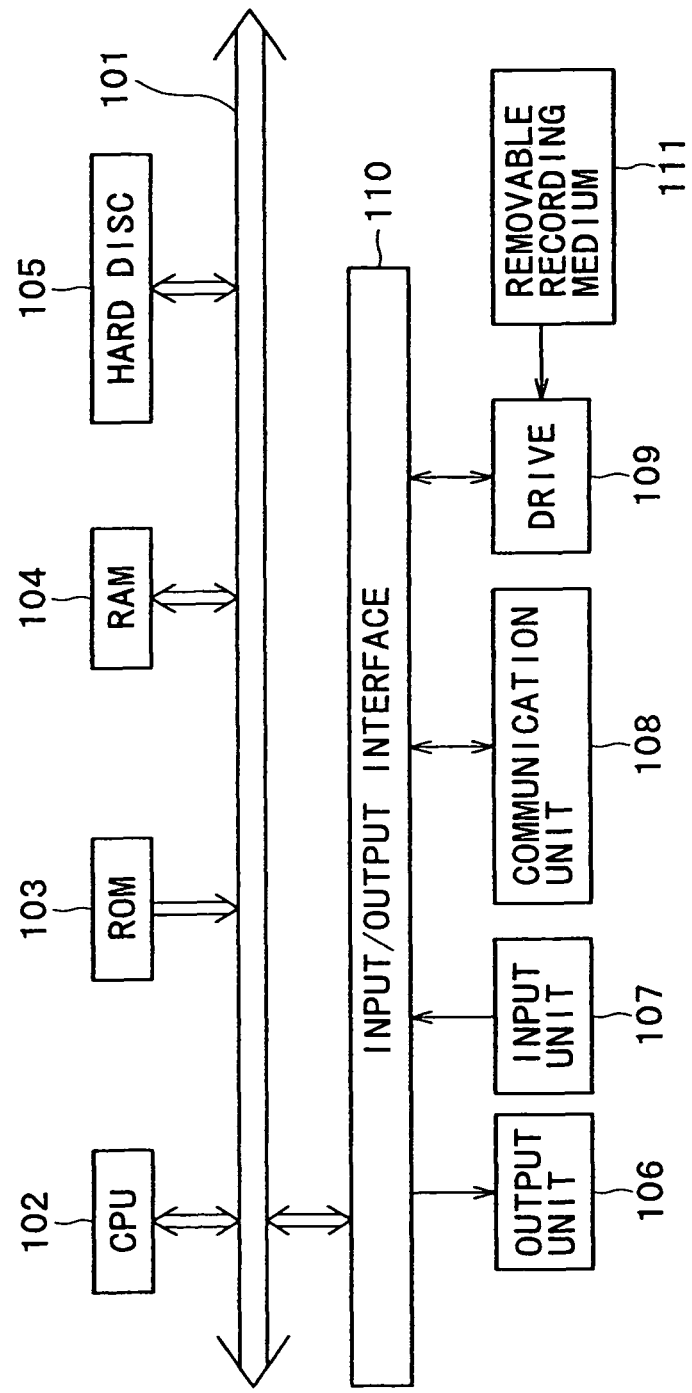
FIG. 26 is a diagram showing a typical configuration of an embodiment implementing a computer to which the present invention is applied.

FIG. 26 is a diagram showing a typical configuration of an embodiment implementing a computer, into which a program composing the software to be executed to carry out the series of operations described above is installed.

The program is installed in a hard disc 105 or stored in advance in a ROM 103. The hard disc 105 and the ROM 103 each serve as a recording medium embedded in the computer.

In order to install the program into the hard disc 105, the program is first temporarily or permanently stored in advance in a removable recording medium 111 such as a flexible disc, a CD-ROM (Compact Disc Read Only Memory), an MO (Magneto Optical) disc, a DVD (Digital Versatile Disc), a magnetic disc or a semiconductor memory. The program stored in the removable recording medium 111 can then be presented to the user as package software. Then, the program is installed into the hard disc 105 employed in the computer from the removable recording medium 111 described above.

It is to be noted that, as an alternative to the installation of the program from the removable recording medium 111, the program is downloaded to the computer from a download source through a radio communication using an artificial satellite for digital satellite broadcasting or by way of a wire communication means such as a LAN (Local Area Network) or the Internet. A communication unit 108 employed in the computer receives the program downloaded as such and then finally installs the program into the embedded hard disc 105.

The computer also has an embedded CPU (Central Processing Unit) 102. The CPU 102 is connected to an input/output interface 110 by using a bus 101. The user enters a command to the computer by operating one of a keyboard, a mouse, a mike and another input means, which compose an input unit 107. The input unit 107 then passes on the command to the CPU 102 by way of the input/output interface 110. The program stored in advance in the ROM (Read Only Memory) 103 is executed in accordance with the command. Instead of being stored in the ROM 103, the program to be executed is installed in the hard disc 105 as described above. In this case, the program is loaded into a RAM 104 from the hard disc 105. As explained before, the program has been installed in the hard disc 105 from a removable recording medium 111 mounted on a drive 109 or from a download source by way of a satellite or a network to be received by the communication unit 108. By execution of the program, the CPU 102 carries out the processes according to the flowcharts described above in any of the configurations shown in the block diagrams explained earlier. Then, if necessary, the CPU 102 typically outputs results of the processes to an output unit 106 including an LCD (Liquid Crystal Display), a speaker and other components by way of the input/output interface 110, transmits the results to the satellite or the network by way of the communication unit 108 or records the results onto the hard disc 105.

In this specification, processing steps prescribing the program to be executed by the computer to implement a variety of operations do not necessarily have to be carried out sequentially along the time axis in accordance with a predetermined order represented by a flowchart. Instead, the steps may include operations to be carried out concurrently or individually.

In addition, the program can be executed by using a computer or a plurality of computers in a distributed processing system. Furthermore, the program can also be transmitted to a remote computer for execution.

As described above, the embodiments reproduce an edited MPEG stream. It is to be noted, however, that the present invention can also be applied to reproduction of encoded data other than an MPEG stream. An example of such encoded data is data obtained as a result of a predictive encoding process carried out by referring to other pictures.

In addition, in the embodiments, an edit-point list is recorded on the optical disc 1 in advance and the controller 7 acquires the edit-point list from the optical disc 1. However, the edit-point list can also for example be recorded in a recording medium other than the optical disc 1 or acquired from transmission media such as the Internet. The decoding control list can be acquired in the same way as the edit-point list.

Furthermore, in the embodiments, a GOP is a sequence of pictures B1, B2, I3, B4, B5, P6, B7, B8, P9, B10, B11, P12, B13, B14, P15. However, the present invention can also be applied to a GOP of a different sequence of pictures. For example, the present invention can be applied to a GOP including no B and/or P pictures. Moreover, the present invention can also be applied to a closed or open GOP.

It is to be noted that, if the GOP is a GOP of a different sequence of pictures, preparatorily decoded pictures will be different from those found by carrying out the process represented by the flowchart shown in FIG. 11.

In addition, in the embodiments, the optical disc 1 is a recording medium for storing an MPEG stream to be reproduced. However, the present invention can also be applied to reproduction of an MPEG stream from a recording medium other than the optical disc 1. Examples of the other recording medium are a magnetic disc, a magnetic tape and a semiconductor memory. The present invention can also be applied to reproduction of an MPEG stream downloaded from transmission media such as the Internet or a satellite.

As described above, FIGS. 8 and 13 to 15 each show an example with picture B1 always taken as a picture at which an edit point is set as an IN point. As explained earlier by referring to FIG. 11, however, a case in which an edit point is set at picture B1 or B2 is a case having a largest number of preparatorily decoded pictures. Thus, if a seamless reproduction process can be carried out with an edit point set at picture B1 or B2, naturally, a seamless reproduction process can also be carried out with an edit point set at a picture other than picture B1 or B2.

Furthermore, in the embodiments, the controller 7 detects edit points set on an MPEG stream from an edit-point list. However, the user is also allowed to supply an edit point set on an MPEG stream to the controller 7 by, for example, operating the operation unit 8. As another alternative, an external means is used for detecting an edit point set on an MPEG stream and supplying the edit point to the controller 7. That is to say, there is specially no restriction on the method to supply an edit point set on an MPEG stream to the controller 7.

Moreover, in the embodiments, the same apparatus functions as an apparatus for making a decoding control list from an edit-point list and an apparatus for executing decoding control based on the decoding control list. However, the present invention is not limited to this scheme. For example, the apparatus for making a decoding control list from an edit-point list can be an apparatus different from the apparatus for executing decoding control based on the decoding control list.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A decoding control apparatus for controlling a process to decode encoded data obtained as a result of a predictive encoding process, said decoding control apparatus comprising:
   a picture detector for determining one or fewest possible pictures, which are not to be displayed but must be decoded first before decoding a picture to be displayed after an edit point set in said encoded data;
   a start-point finder for finding a start point representing a timing to start a process to decode said one or fewest possible pictures determined by said picture detector even though said one or fewest possible pictures are not to be displayed;
   a decoding controller for controlling processes carried out by a plurality of decoders for decoding said encoded data in order to decode said encoded data, in picture units, on the basis of said edit point and including a decoding control list maker for making a decoding control list describing at least the edit point and the start point as decoding control information for controlling the processes carried out by the plurality of decoders; and
   a selector for selecting one of pictures, which are obtained as results of said processes carried out by said decoders, on the basis of said edit point and for outputting said selected picture.

2. The decoding control apparatus according to claim 1, wherein, if said encoded data is encoded at an L-time decoding speed, where L is a positive number, the number of said decoders is at least 7/L.

3. The decoding control apparatus according to claim 1, wherein said start-point finder determines a timing leading ahead of a timing to start a process to decode a picture at said edit point by at least a period of time it takes to decode all of said one or fewest possible pictures, which are determined by said picture detector, for said edit point, as pictures not to be displayed, as said start point.

4. The decoding control apparatus according to claim 1, wherein: each of said pictures includes: an Intra (I) picture encoded without referencing other pictures; a Predictive (P) picture encoded by referencing a picture displayed previously; or a Bidirectionally predictive (B) picture encoded by referencing both a picture displayed previously and a picture to be displayed later, or by referencing either of the picture displayed previously or the picture to be displayed later; said one or fewest possible pictures, which are identified by said picture detector but not to be displayed, are I or P pictures.

5. The decoding control apparatus according to claim 1, wherein said decoding controller: drives one of said decoders, which is currently not carrying out a decoding process, to start a process to decode said encoded data with a timing of a new start point; and drives said one of decoders, which has been carrying out said process to decode said encoded data by starting said process with said timing of said new start point, to stop said process to decode said encoded data with a timing of an edit point appearing next to said new start point.

6. The decoding control apparatus according to claim 1, further comprising a reader for reading out said encoded data from a recording medium, on which said encoded data has been stored.

* * * * *